(12) United States Patent
Saitoh

(10) Patent No.: US 8,059,240 B2
(45) Date of Patent: Nov. 15, 2011

(54) LIQUID CRYSTAL DISPLAY DEVICE

(75) Inventor: Yukito Saitoh, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 741 days.

(21) Appl. No.: 11/663,270

(22) PCT Filed: Sep. 22, 2005

(86) PCT No.: PCT/JP2005/018046
§ 371 (c)(1),
(2), (4) Date: Mar. 17, 2008

(87) PCT Pub. No.: WO2006/033463
PCT Pub. Date: Mar. 30, 2006

(65) Prior Publication Data
US 2009/0033851 A1     Feb. 5, 2009

(30) Foreign Application Priority Data

Sep. 22, 2004  (JP) ................................. 2004-274770

(51) Int. Cl.
*G02F 1/1335*  (2006.01)
(52) U.S. Cl. ........................................ 349/119; 349/117
(58) Field of Classification Search .................. 349/117, 349/119
See application file for complete search history.

(56) References Cited

U.S. PATENT DOCUMENTS 6,081,312 A     6/2000  Aminaka et al.

FOREIGN PATENT DOCUMENTS

| JP | 10-312166 A | 11/1998 |
| JP | 2004-37837 A | 2/2004 |
| JP | 2004-062023 A | 2/2004 |
| JP | 2004-133171 A | 4/2004 |

OTHER PUBLICATIONS

International Preliminary Report on Patentability dated Mar. 27, 2007 in English.
International Search Reported for PCT/JP2005/018046 dated Nov. 8, 2005.

*Primary Examiner* — Michael Caley
(74) *Attorney, Agent, or Firm* — Buchanan Ingersoll & Rooney PC

(57) ABSTRACT

A novel liquid crystal display device is disclosed. the device comprises a liquid crystal cell comprising a pair of substrates disposed facing each other, at least one of said pair of substrates having an electrode thereon, and a liquid crystal layer held between said pair of substrates, comprising a nematic liquid crystal material, molecules of which being oriented nearly normal to the surfaces of said pair of substrates in a black state, a first and a second polarizing films disposed while placing said liquid crystal cell in between; and at least two optically anisotropic films, each of them disposed respectively between said liquid crystal layer and each of said first and said second polarizing films, wherein, assuming thickness of said liquid crystal layer as d (nm), refractive index anisotropy of said liquid crystal layer at wavelength λ (nm) as Δn (λ), and in-plane retardation of said optical compensation film at wavelength λ as Re(λ), relations (I) to (IV) below are satisfied at least at two different wavelengths in a wavelength range from 380 nm to 780 nm:

$200 \leq \Delta n(\lambda) \times d \leq 1000$ (I)

$Rth(\lambda)/\lambda = A \times \Delta n(\lambda) \times d/\lambda + B;$ (II)

$Re(\lambda)/\lambda = C \times \lambda/\{\Delta n(\lambda) \times d\} + D;$ and (III)

$0.488 \leq A \leq 0.56$, $B = -0.0567$, $-0.041 \leq C \leq 0.016$; and $D = 0.0939$. (IV)

10 Claims, 9 Drawing Sheets

RELATED ART

RELATED ART

LIQUID CRYSTAL DISPLAY DEVICE

TECHNICAL FIELD

The present invention relates to a liquid crystal display device improved in the viewing angle characteristics.

BACKGROUND ART

Liquid crystal display device comprises a liquid crystal cell and polarizing plates. The polarizing plate usually has protective films and a polarizing film, and is obtained typically by dying the polarizing film composed of a polyvinyl alcohol film with iodine, stretching, and being stacked on both surfaces thereof with the protective films. A transmissive liquid crystal display device usually comprises polarizing plates on both sides of the liquid crystal cell, and occasionally comprises one or more optical compensation films. A reflective liquid crystal display device usually comprises a reflector plate, the liquid crystal cell, one or more optical compensation films, and a polarizing plate in this order. The liquid crystal cell comprises liquid-crystalline molecules, two substrates encapsulating the liquid-crystalline molecules, and electrode layers applying voltage to the liquid-crystalline molecules. The liquid crystal cell switches ON and OFF displays depending on variation in orientation state of the liquid-crystalline molecules, and is applicable both to transmission type and reflective type, of which display modes ever proposed include TN (twisted nematic), IPS (in-plane switching), OCB (optically compensatory bend) and VA (vertically aligned), and ECB (electrically controlled birefringence).

Of these LCDs, most widely used for application in need of high definition display is 90° twisted nematic liquid crystal display (referred to as "TN mode", hereinafter) using nematic liquid crystal molecules having a positive dielectric anisotropy, driven by thin-film transistors. The TN mode has viewing angle characteristics such as ensuring excellent display characteristics in the front view, but as being degraded in the display characteristics in an oblique view, such as causing lowered contrast, or grayscale inversion which is inversion of brightness in a grayscale image, which are strongly desired to be improved.

In recent years, there has been proposed a vertically-aligned nematic liquid crystal display device (referred to as "VA mode", hereinafter) as a mode of LCD capable of improving the viewing angle characteristics, in which nematic liquid crystal molecules having a negative dielectric anisotropy is used, wherein the liquid crystal molecules are oriented so as to direct the long axes thereof nearly normal to the substrate under no applied voltage, and are driven by thin-film transistors (see Japanese Laid-Open Patent Publication "Tokkai" No. hei 2-176625). The VA mode is not only excellent in the display characteristics in the front view similarly to the TN mode, but can exhibit wider viewing angle characteristics through adoption of a retardation film for viewing angle compensation. The VA mode is successful in obtaining wider viewing angle characteristics by using two negative uniaxial retardation films, having the optical axes normal to the film surface, on the upper and lower sides of a liquid crystal cell, and it is also known that further more wider viewing angle characteristics can be obtained by additionally applying an uniaxial orientation retardation film having an in-plane retardation value of 50 nm and a positive refractive index anisotropy (see SID 97 DIGEST, p. 845-848).

Use of two retardation films (SID 97 DIGEST, p. 845-848), however, results not only in increase in the cost, but also in degradation in the yield ratio due to need of bonding a number of films, wherein use of a plurality of films raises a problem of increase in the thickness, which is disadvantageous for thinning of the device. An adhesive layer used for stacking stretched films may shrink under varied temperature and humidity, and may cause failures such as separation or warping of the films. Disclosed methods of improving these drawbacks include a method of reducing the number of retardation films (Japanese Laid-Open Patent Publication "Tokkai" No. hei 11-95208) and a method of using cholesteric liquid crystal layer (Japanese Laid-Open Patent Publication "Tokkai" No. 2003-15134, ditto "Tokkai" No. hei 11-95208). These methods were, however, still in need of bonding a plurality of films, and were insufficient in terms of thinning and cost reduction. Another problem resided in that light leakage from the polarizing plate in the oblique view in a black state could not completely be suppressed in the visible light region, and this consequently failed in fully improving the viewing angle. And it was also difficult to completely compensate the visible light, obliquely incident on the polarizing plate, over the entire wavelength of visible light thereof in a black state, and, consequently, color shifts depending on the viewing angle. A proposal has been made also on control of wavelength dispersion of retardation of the retardation film so as to reduce the light leakage (Japanese Laid-Open Patent Publication "Tokkai" No. 2002-221622), but this resulted in only an insufficient effect of reducing the light leakage. Still another problem was that influences given by changes in birefringence index of the liquid crystal layer were not fully considered, so that the device remained unsuccessful in obtaining a sufficient effect depending on birefringence of the liquid crystal layer.

SUMMARY OF THE INVENTION

One object of the present invention is to provide a liquid crystal display device, in particular a VA-mode liquid crystal display device, wherein the liquid crystal cell is correctly compensated optically, having a high contrast. More particularly, one object of the present invention is to provide a liquid crystal display device, in particular VA-mode liquid crystal display device, generating no or small light leakage of an oblique incident light in a black state, and improved in viewing-angle-contrast.

The first embodiment of the present invention relates to a liquid crystal display device comprising:

a liquid crystal cell comprising a pair of substrates disposed facing each other, at least one of said pair of substrates having an electrode thereon, and a liquid crystal layer held between said pair of substrates, comprising a nematic liquid crystal material, molecules of which being oriented nearly normal to the surfaces of said pair of substrates in a black state, a first and a second polarizing films disposed while placing said liquid crystal cell in between; and at least two optically anisotropic films, each of them disposed respectively between said liquid crystal layer and each of said first and said second polarizing films, wherein, assuming thickness of said liquid crystal layer as d (nm), refractive index anisotropy of said liquid crystal layer at wavelength λ (nm) as Δn(λ), and in-plane retardation of said optical compensation film at wavelength λ as Re (λ), relations (I) to (IV) below are satisfied at least at two different wavelengths in a wavelength range from 380 nm to 780 nm:

$$200 \leq \Delta n(\lambda) \times d \leq 1000; \quad \text{(I)}$$

$$Rth(\lambda)/\lambda = A \times \Delta n(\lambda) \times d/\lambda + B; \quad \text{(II)}$$

$$Re(\lambda)/\lambda = C \times \lambda/\{\Delta n(\lambda) \times d\} + D; \text{ and} \quad \text{(III)}$$

$$0.488 \leq A \leq -0.56, B = -0.0567, -0.041 \leq C \leq 0.016; \text{ and}$$
$$D = 0.0939. \quad \text{(IV)}$$

It is preferred that an in-plane slow axis of said optical compensation film and a transmission axis of either of said first and said second polarizing films disposed more closer to said optical compensation film are substantially parallel to each other.

The relations (I) to (IV) are preferably satisfied at least at two wavelengths of which difference is 50 nm or more, and more preferably satisfied at all wavelengths of 450 nm, 550 nm and 650 nm.

The second embodiment of the present invention relates to a liquid crystal display device comprising:

a liquid crystal cell comprising a pair of substrates disposed facing each other, at least one of said pair of substrates having an electrode thereon, and a liquid crystal layer held between said pair of substrates, comprising a nematic liquid crystal material, molecules of which being oriented nearly normal to the surfaces of said pair of substrates in a black state, a first and a second polarizing films disposed while placing said liquid crystal cell in between; and an optically anisotropic film disposed between said liquid crystal layer and one of said first and said second polarizing films, wherein, assuming thickness of said liquid crystal layer as d (nm), refractive index anisotropy at wavelength λ (nm) as Δn (λ), and in-plane retardation of said optical compensation film at wavelength λ as Re(λ), the relations (V) to (VIII) below are satisfied at least at two different wavelengths in a wavelength range from 380 nm to 780 nm:

$$200 \leq \Delta n(\lambda) \times d \leq 1000, \quad \text{(V)}$$

$$Rth(\lambda)/\lambda = E \times \Delta n(\lambda) \times d/\lambda, \quad \text{(VI)}$$

$$Re(\lambda)/\lambda = F \times \lambda/\{\Delta n(\lambda) \times d\} + G; \text{ and} \quad \text{(VII)}$$

$$0.726 \leq E \leq 0.958, 0.0207 \leq F \leq 0.0716; \text{ and } G = 0.032. \quad \text{(VIII)}$$

The device of the second embodiment may further comprise a transparent film between one of the first and second polarizing film not adjacent to said optical compensation film and said liquid crystal cell. The transparent film desirably has a retardation Rth in the thickness-wise direction of 0 nm≦Rth≦60 nm.

For the second embodiment, tt is preferred that an in-plane slow axis of said optical compensation film and a transmission axis of either of said first and said second polarizing films disposed more closer to said optical compensation film are substantially parallel to each other.

For the second embodiment, the relations (V) to (VIII) are preferably satisfied at least at two wavelengths of which difference is 50 nm or more, and more preferably satisfied at all wavelengths of 450 nm, 550 nm and 650 nm.

It is to be noted that "parallel", "orthogonal" and "perpendicular" in the context of this specification allow a tolerance of less than ±5° with respect to the precise angles. Difference from the precise angles is preferably less than 4°, and more preferably less than 3°. With respect to the angles, "+" corresponds to the clockwise direction, and "−" corresponds to the counter-clockwise direction. The "slow axis" means the direction in which the refractive index becomes maximum. The "visible light region" means a wavelength range from 380 nm to 780 nm. The measurement wavelength for the refractive index is λ=550 nm in the visible light region, unless otherwise specifically noted.

In the specification, the terms of "polarizing plate" means not only polarizing plates having a proper size to be employed in a liquid-crystal but also long polarizing plates before being cut. And in the specification, the terms of "polarizing film" is distinct from the term "polarizing plate", and the term of "polarizing plate" is used for any laminated body comprising a "polarizing film" and at least one protective film thereon.

In the specification, Re(λ) and Rth(λ) of a polymer film respectively mean an in-plane retardation and a retardation in a thickness-direction at wavelength λ. The Re(λ) is measured by using KOBRA-21ADH (manufactured by Oji Scientific Instruments) for an incoming light of a wavelength nm in a direction normal to a film-surface. The Rth(λ) is calculated by using KOBRA-21ADH based on three retardation values; first one of which is the Re(λ) obtained above, second one of which is a retardation which is measured for an incoming light of a wavelength λnm in a direction rotated by +40° with respect to the normal direction of the film around an in-plane slow axis, which is decided by KOBRA 21ADH, as an a tilt axis (a rotation axis), and third one of which is a retardation which is measured for an incoming light of a wavelength λnm in a direction rotated by −40° with respect to the normal direction of the film around an in-plane slow axis as an a inclining axis (a rotation axis); a hypothetical mean refractive index and an entered thickness value of the film. The mean refractive indexes of various materials are described in published documents such as "POLYMER HANDBOOK" (JOHN WILEY & SONS, INC) and catalogs. If the values are unknown, the values may be measured with an abbe refractometer or the like. The mean refractive indexes of major optical films are exemplified below:

cellulose acylate (1.48), cyclo-olefin polymer (1.52), polycarbonate (1.59), polymethyl methacrylate (1.49), polystyrene (1.59).

When the hypothetical mean refractive index and a thickness value are put into KOBRA 21ADH, nx, ny and nz are calculated. And Nz, which is equal to (nx-nz)/(nx-ny), is calculated based on the calculated nx, ny and nz.

According to the present invention, the in-plane retardation and the thickness-wise retardation of the optical compensation film are respectively adjusted within the optimum range by appropriately selecting materials or methods for producing the film. And, thus, such optical compensation film can compensate viewing angle of, in particular, a VA-mode liquid crystal cell in a black state, over the entire range of the visible light region. The liquid crystal display device of the present invention generates no or small light leakage of oblique incident light in a black state, and is remarkably improved in the viewing-angle-contrast, at an arbitrary wavelength. The liquid crystal display device of the present invention also generates no or small light leakage of an oblique incident light in a black state at an arbitrary wavelength in the visible light region, even for the case with birefringence of the liquid crystal layer is variable.

Figure 1:
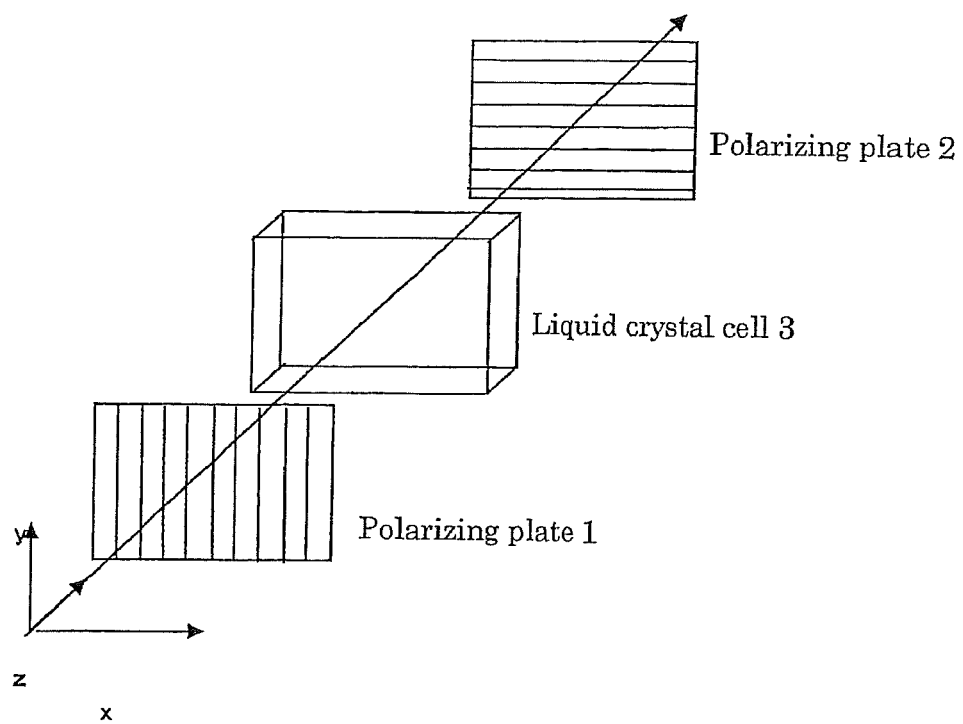
FIG. 1 is a schematic drawing explaining an exemplary configuration of a conventional VA-mode liquid crystal display device.

REFERENCE NUMERALS USED IN THE DRAWINGS ARE AS FOLLOWS 1 polarizing plate;
2 polarizing plate;
3 liquid crystal cell;
4, 5, 6 optical compensation film;
11, 101 polarizing film;
12, 102 absorption axis;
13, 103 protective film;
13a, 103a in-plane slow axis;
15, 19 optical compensation film;
15a, 19a in-plane slow axis;
16, 18 substrate; and
17 liquid-crystalline molecule.

DETAILED DESCRIPTION OF THE INVENTION

The following paragraphs will describe operations of the present invention, referring to the attached drawings.

FIG. 1 is a schematic drawing showing a configuration of a general VA-mode liquid crystal display device. The VA-mode liquid crystal display device comprises a liquid crystal cell 3 having a liquid crystal layer in which liquid crystal molecules orient normal to the surfaces of the substrates under no applied voltage, or in a black state, and a polarizing plate 1 and a polarizing plate 2 disposed so as to hold the liquid crystal cell 3 in between, and having the respective transmission axes (indicated by stripes in FIG. 1) perpendicular to each other. FIG. 1 is expressed so as to allow an incident light to come from the polarizing plate 1 side. Under no applied voltage, a normal incident light, or an incident light in the direction along with the z-axis, passes through the polarizing plate 1 and the liquid crystal cell 3 while keeping its linear polarization state unchanged, and is completely blocked by the polarizing plate 2. A high contrast image can thus be displayed.

Figure 2:
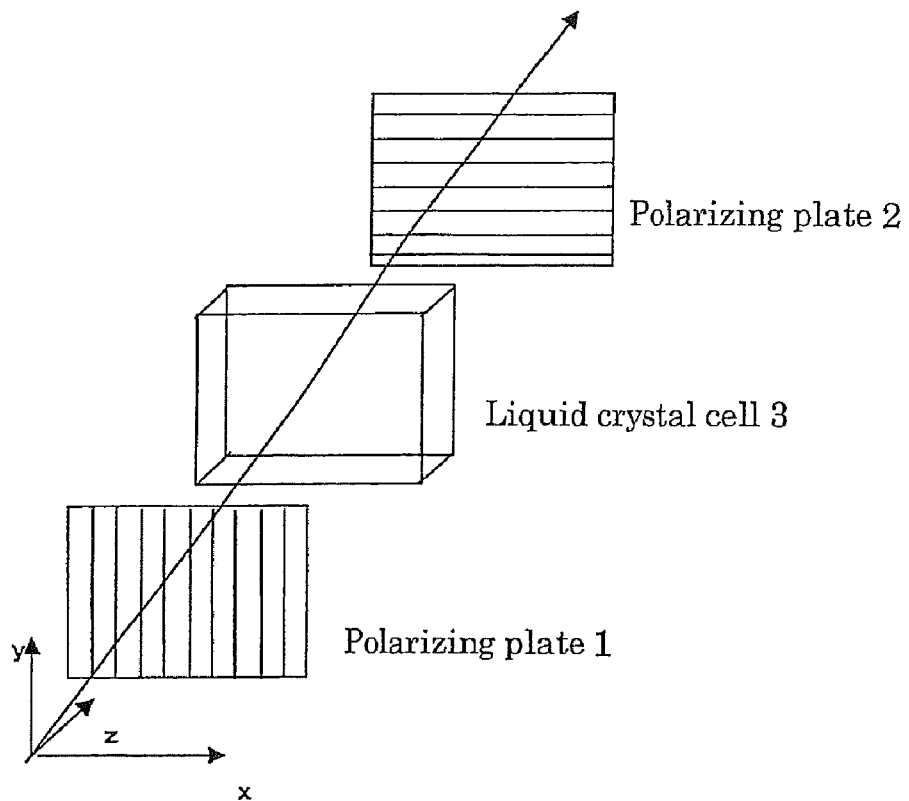
FIG. 2 is a schematic drawing explaining an exemplary configuration of a conventional VA-mode liquid crystal display device.

The situation will, however, be different for an oblique incident light as shown in FIG. 2. When the light, coming from a direction other than the direction of the z-axis, that is, from a direction inclined away from the direction of polarization by the polarizing plates 1 and 2 (so-called, off-axis direction), goes through the vertically-aligned liquid crystal layer of the liquid crystal cell 3, the light is affected by retardation of the oblique direction, and varies its polarization state. In addition, apparent transmission axes of the polarizing plate 1 and the polarizing plate 2 shift from the perpendicular arrangement. Because of two these factors, the off-axis incident light cannot completely be blocked by the polarizing plate 2, and thereby causes light leakage and lowered contrast.

Polar angle and azimuth will now be defined. Polar angle is an angle of inclination away from the direction of the normal line on the film surface, that is, the z-axis shown in FIG. 1 and FIG. 2, so that the direction of the normal line on the film surface, for example, lies in the direction of polar angle=0°. Azimuth expresses a bearing rotated counter-clockwisely with reference to the positive direction of the x-axis, wherein, for example, the positive direction of the x-axis can be expressed by azimuth=0°, and the positive direction of the y-axis can be expressed by azimuth=90°. Oblique directions in the above-described, off-axis state mainly refer to directions expressed by the polar angle of not 0° and azimuth=45°, 135°, 225° and 315°.

Figure 3:
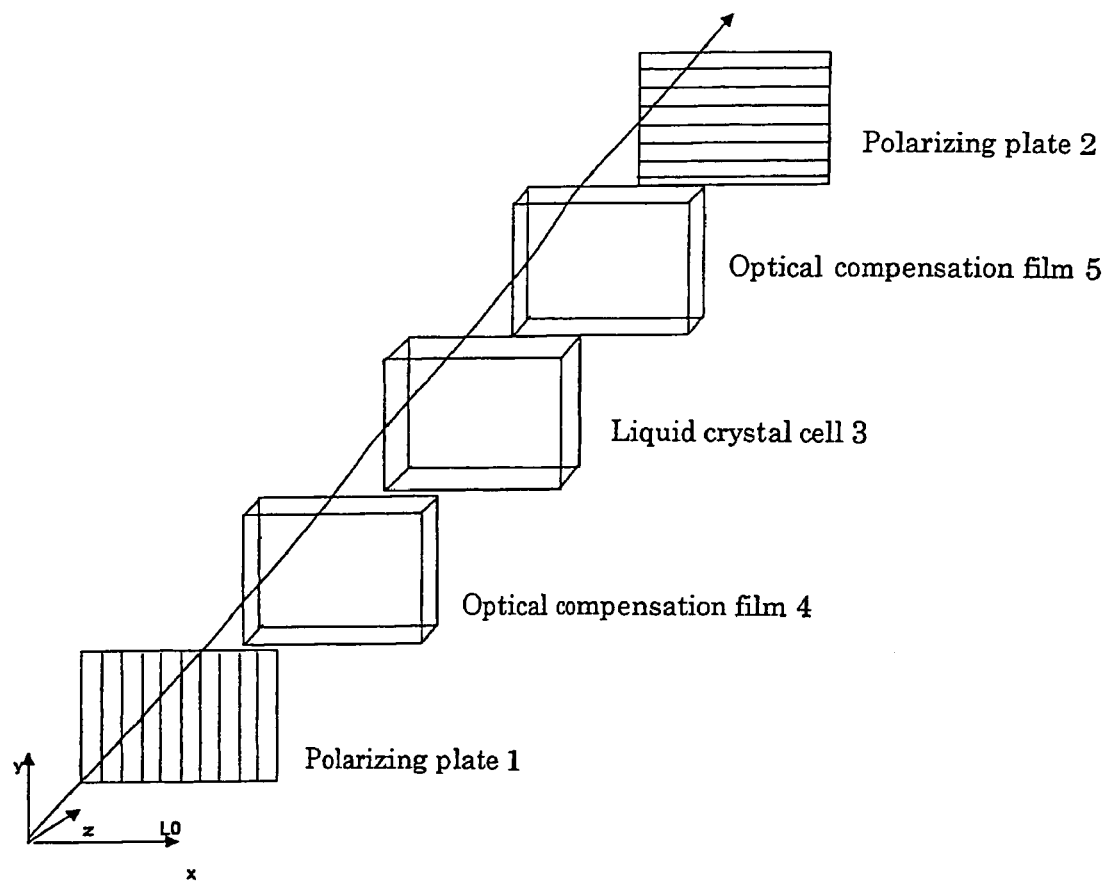
FIG. 3 is a schematic drawing explaining an exemplary configuration of a VA-mode liquid crystal display device according to one embodiment of the present invention.

FIG. 3 shows a schematic drawing of an exemplary configuration for explaining operations of one embodiment of the present invention. The liquid crystal display device shown in FIG. 3 further comprises, in addition to the configuration shown in FIG. 1, an optical compensation film 4 disposed between the liquid crystal cell 3 and the polarizing plate 1, and an optical compensation film 5 disposed between the liquid crystal cell 3 and the polarizing plate 2. In the liquid crystal display device of this embodiment, having thickness d (in "nm", the same will apply hereinafter) and refractive index anisotropy $\Delta n$ ($\lambda$) at wavelength $\lambda$ (in "nm", the same will apply hereinafter) of the liquid crystal layer of the liquid crystal cell, in-plane retardation $Re(\lambda)$ and thickness-wise retardation $Rth(\lambda)$ at wavelength $\lambda$ of the optical compensation films 4 and 5 satisfy the relations (I) to (IV) below, at least at two different wavelengths in a wavelength range from 380 nm to 780 nm:

$$200 \leq \Delta n(\lambda) \times d \leq 1000;$$

$$Rth(\lambda)/\lambda = A \times \Delta n(\lambda) \times d/\lambda + B; \quad \text{(II)}$$

$$Re(\lambda)/\lambda = C \times \lambda / \{\Delta n(\lambda) \times d\} + D; \text{ and} \quad \text{(III)}$$

$$0.488 \leq A \leq 0.56, B = -0.0567, -0.041 \leq C \leq 0.016 \text{ and } D = 0.0939. \quad \text{(IV)}$$

Figure 4:
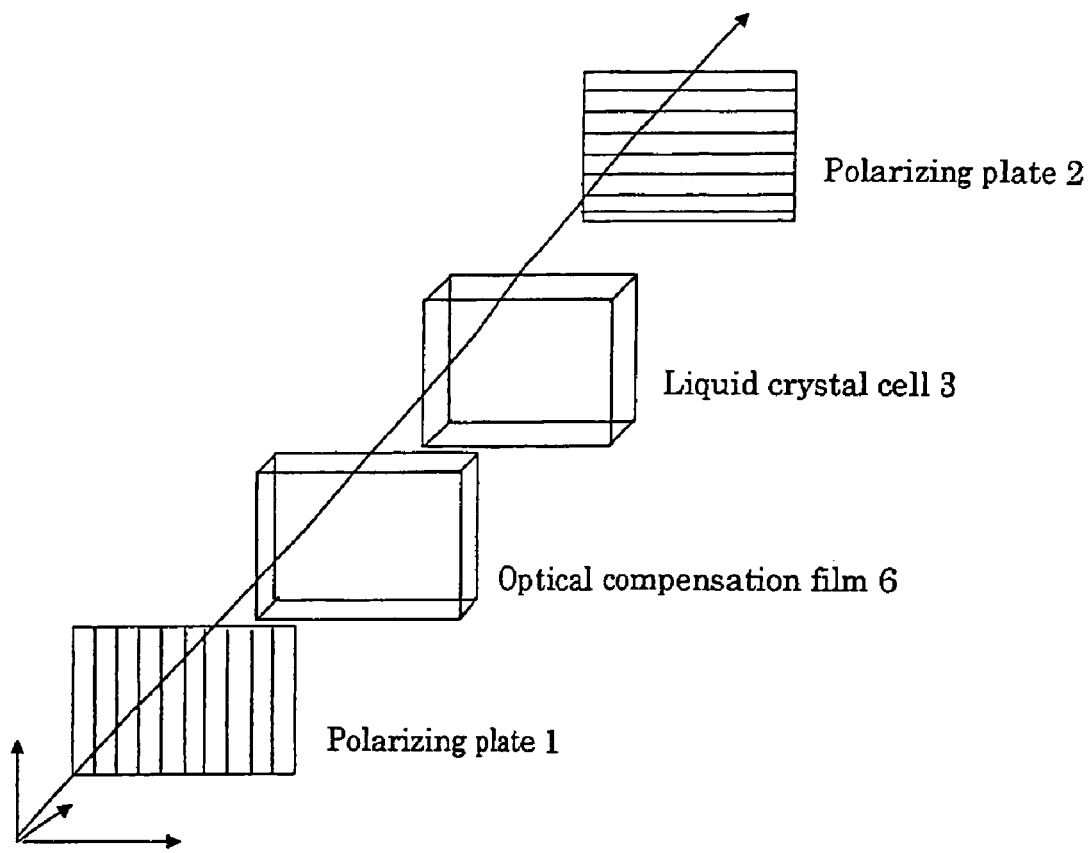
FIG. 4 is a schematic drawing explaining an exemplary configuration of a VA-mode liquid crystal display device according to another embodiment of the present invention.

FIG. 4 shows a schematic drawing of an exemplary configuration for explaining operations of another embodiment of the present invention. The liquid crystal display device shown in FIG. 4 further comprises, in addition to the configuration shown in FIG. 1, an optical compensation film 6 disposed between the liquid crystal cell 3 and the polarizing plate 1. The optical compensation film may be disposed between the liquid crystal cell 3 and the polarizing plate 2. In the liquid crystal display device of this embodiment, having thickness d (in "nm", the same will apply hereinafter) and refractive index anisotropy $\Delta n(\lambda)$ at wavelength $\lambda$ (in "nm", the same will apply hereinafter) of the liquid crystal layer of the liquid crystal cell, in-plane retardation $Re(\lambda)$ and thickness-wise retardation $Rth(\lambda)$ at wavelength $\lambda$ of the optical compensation film satisfy the relations (V) to (VIII) below, at least at two different wavelengths in a wavelength range from 380 nm to 780 nm:

$$200 \leq \Delta n(\lambda) \times d \leq 1000, \quad (V)$$

$$Rth(\lambda)/\lambda = E \times \Delta n(\lambda) \times d/\lambda, \quad (VI)$$

$$Re(\lambda)/\lambda = F \times \lambda/\{\Delta n(\lambda) \times d\} + G; \text{ and} \quad (VII)$$

$$0.726 \leq E \leq 0.958, 0.0207 \leq F \leq 0.0716 \text{ and } G=0.032. \quad (VIII)$$

In the present invention, combination of the liquid crystal layer and the optical compensation film(s) satisfying either set of relations (I) to (IV), or relations (V) to (VIII) makes it possible to effect optical compensation based on the slow axis and retardation adapted to light having a predetermined wavelength in the visible light region, even if the light comes from oblique directions. It is therefore made possible to distinctively improve the visual contrast in a black state as compared with the conventional liquid crystal display device, and also to distinctively moderate viewing-angle-coloration in a black state. The liquid crystal display device satisfies the relations (I) to (IV), or the relations (V) to (VIII), at least at two wavelengths. It is preferable that the relations (I) to (IV), or the relations (V) to (VIII), are satisfied at least at two wavelengths of which difference is 50 nm or more. At which wavelength the above-described relations are satisfied will vary depending on purpose of use of the liquid crystal display device, wherein wavelength and wavelength range most largely affect the display characteristics will be selected. In general, the liquid crystal display device preferably satisfies the relations (I) to (IV), or relations (V) to (VIII) at wavelength 650 nm, 550 nm and 450 nm, which are wavelengths corresponded to three principal colors of red (R), green (G) and blue (B). Wavelengths for R, G and B are not always represented by the above-described wavelengths, but are considered as appropriate wavelengths for specifying the optical characteristics exhibiting the effects of the present invention.

Next paragraphs will detail a principle of compensation in the present invention.

Figure 5:
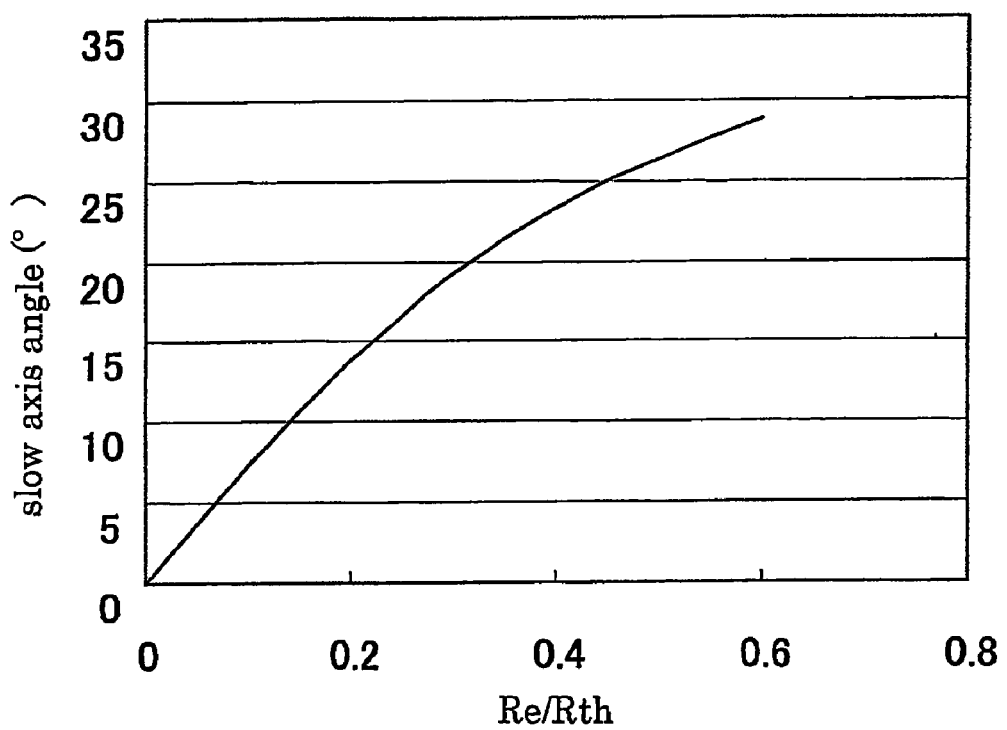
FIG. 5 is a graph showing optical characteristics of an exemplary optical compensation film used in the present invention.

One feature of the present invention resides in the ranges of $Re/\lambda$ and $Rth/\lambda$, which are ratios of retardations and wavelength. The $Re/\lambda$ and $Rth/\lambda$ express magnitude of birefringence index, and are important parameters determining phase in transition of polarization states. In addition, ratio $Re/Rth$ of $Re/\lambda$ and $Rth/\lambda$ determines two axes of intrinsic polarization of light obliquely propagating through a biaxial birefringent medium. FIG. 5 shows an exemplary result of relation between an angle of one of two intrinsic polarization axes and $Re/Rth$, calculated for the case where the light is obliquely incident on the biaxial birefringent medium. The direction of propagation of the light was assumed as having azimuth=45° and polar angle=34°. It is found from the result shown in FIG. 5 that one axis of intrinsic polarization is automatically determined if $Re/Rth$ is given. $Re/\lambda$ and $Rth/\lambda$ also function as varying phase of two intrinsic polarizations.

In the prior art, wavelength dispersion of a film compensating the VA-mode cell has been determined by Re, Rth and Re/Rth. Whereas the present invention is based on a newly-found principle that the VA-mode cell can be compensated at wavelength $\lambda$ by bringing $Re/\lambda$ and $Rth/\lambda$ into focus so as to non-dimensionalize the parameters, in place of using values such as Re, Rth and Re/Rth. The present inventors also took account of wavelength dispersion in birefringence $\Delta nd$ of the liquid crystal layer to be compensated, and extensively investigated into relation between the wavelength dispersion of Re and Rth of the optical compensation film and the wavelength dispersion of birefringence $\Delta nd$ of the liquid crystal layer to be compensated, and found that the viewing angle characteristics of the liquid crystal display device can distinctively be improved when the relations (I) to (IV), or relations (V) to (VIII) are satisfied. The liquid crystal display device of the present invention, satisfying the relations (I) to (IV), or the relations (V) to (VIII), can ensure correct optical compensation of the liquid crystal cell and can avoid lowering in the contrast, even under two factors that the light comes from an oblique direction and is consequently affected by the retardation of the oblique direction of the liquid crystal layer, and that the apparent transmission axes of a pair of upper and lower polarizing plates are off-aligned.

The VA-mode cell comprises the liquid crystal molecules vertically aligned therein under no applied voltage, or in a black state, so that in view of preventing polarization state of light coming from the direction of normal line in a black state from being affected by the retardation of the optical compensation film, it is preferable that the in-plane slow axis of the optical compensation film is perpendicular or parallel to the transmission axis of the polarization plate disposed more closer to the optical compensation film.

Figure 6:
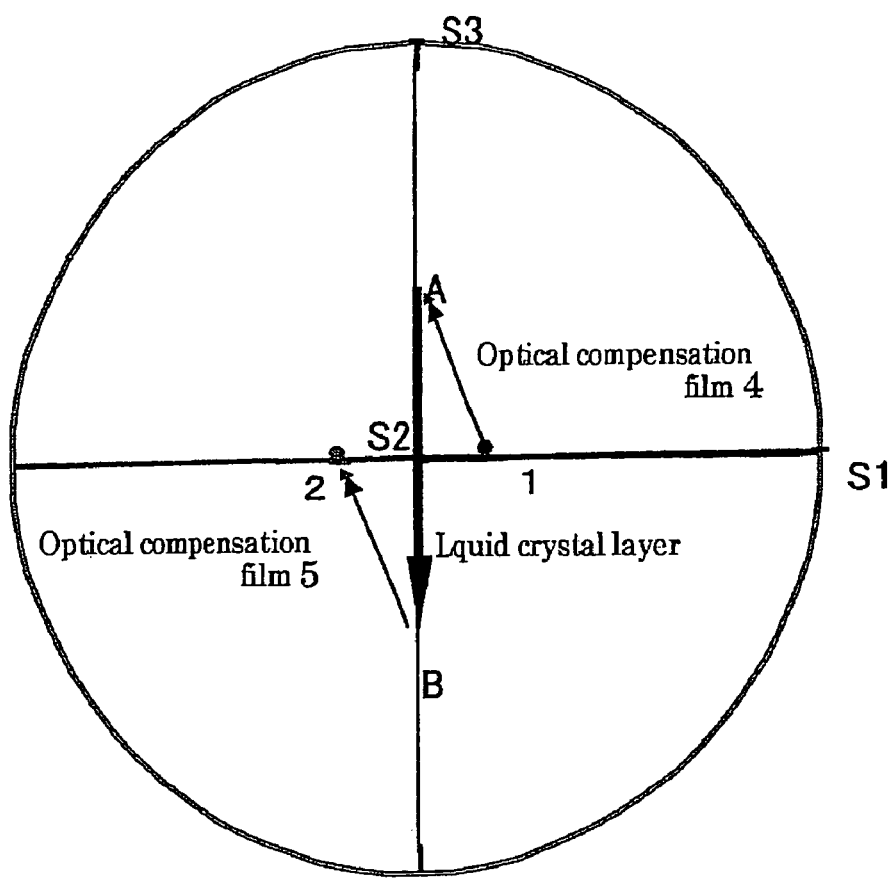
FIG. 6 is a schematic drawing of the Poincare sphere used for explaining polarization states of an incident light in an exemplary liquid crystal display device of the present invention.

FIG. 6 shows a drawing explaining a compensation mechanism in the embodiment shown in FIG. 3, using the Poincare sphere. Direction of propagation of light herein is expressed by azimuth=45° and polar angle=34°. In FIG. 6, axis S2 normally penetrates the sheet from this side to the back behind, and FIG. 6 is a view from the positive direction of axis S2. Although FIG. 6 in a two-dimensional expression indicates displacement of points before and after each change in the polarization state using a straight arrow in the drawing, any actual changes in the polarization state of the light caused by passage through the liquid crystal layer or the optical compensation films can be expressed on the Poincare sphere by rotation by a specific angle around a specific axis determined corresponding to the individual optical characteristics.

Polarization state of the incident light passed through the polarizing plate 1 shown in FIG. 3 corresponds to point 1 in FIG. 6, and polarization state of the light blocked by the absorption axis of the polarizing plate 2 shown in FIG. 3 corresponds to point 2 in FIG. 6. In a VA-mode liquid crystal display device, the off-axis light leakage in oblique directions is ascribable to such disagreement between point 1 and point 2. The optical compensation film is generally used for causing a change in the polarization state of the incident light from point 1 to point 2, including changes in polarization state of the liquid crystal layer. The liquid crystal layer of the liquid crystal cell 3 has a positive refractive index anisotropy and employs a vertical orientation, and, thus, a change in the polarization state of the incident light caused by the passage through the liquid crystal layer is expressed by a descending arrow on the Poincare sphere as shown in FIG. 6, which indicates rotation around axis S2 (rotation from point A to point B). The angle of rotation herein is proportional to a value $\Delta n'd'/\lambda$ obtained by dividing, by wavelength, an effective retardation of the liquid crystal layer in an oblique direction at wavelength $\lambda$. To compensate the liquid crystal layer, the present embodiment adopts the optical compensation films 4 and 5. Lengths of ascending arrows related to the optical compensation films 4 and 5 (length of an arrow from point 1 towards point A, and length of an arrow from point B towards point 2 in the drawing), or angle of rotation, are nearly proportional to each $Rth/\lambda$ of the optical compensation films 4 and 5, and the axes of rotation of the arrows are determined by $Re/Rth$ as described in the above. It is understandable from FIG. 6 that, for a successful optical compensation of the VA-mode liquid crystal cell comprising a liquid crystal layer having a large $\Delta n'd'/\lambda$ with the aid of the optical compensation films 4 and 5, it is necessary to increase $Rth/\lambda$ of the optical compensation films 4 and 5 so as to increase the length of the arrow from point 1 to point A, and the length of the arrow from point B to point 2, and it is necessary to reduce Re/Rth of the optical compensation films 4 and 5, in other words to reduce Re/λ, in order to make the obliquely ascending arrow from point 1 towards point A and the obliquely ascending arrow from point B towards point 2 rise more steeply. In this embodiment, Re/λ and Rth/λ of the optical compensation films are determined depending on Δn'd'/λ of the liquid crystal layer, while conditionally satisfying the relations (I) to (IV), so as to ensure a correct optical compensation. In this embodiment, Δn'd'/λ is determined if Δnd at wavelength λ of the liquid crystal layer to be compensated and wavelength λ are given, and this allows use of the optical compensation films showing Re/λ and Rth/λ satisfying the above-described relations. The embodiment shown in FIG. 3 employs total two optical compensation films, one on the upper side and the other on the lower side. In a special case where the upper and lower optical films have the same characteristics, it is understood, based on the symmetry, that the descending arrow for the liquid crystal layer transits over S1=0 on the Poincare sphere, and that the start point and the end point of the descending arrow for the liquid crystal layer symmetrically reside in the upper hemisphere and lower hemisphere of the Poincare sphere while placing the equator in between.

Figure 7:
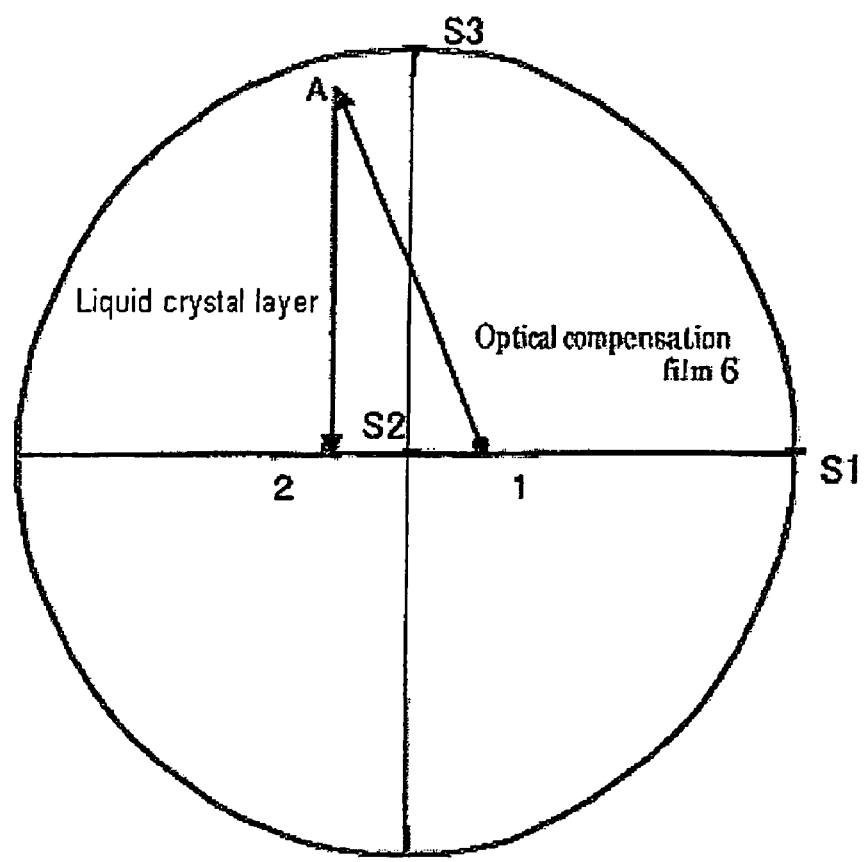
FIG. 7 is a schematic drawing of the Poincare sphere used for explaining polarization states of an incident light in another exemplary liquid crystal display device of the present invention.

FIG. 7 is a drawing explaining a compensation mechanism of the embodiment shown in FIG. 4, using the Poincare sphere. The points and the axes given with the same reference numerals as those in FIG. 6 are the same as described in the above, allowing omission of detailed explanation. It is understadable from FIG. 7 that, for a successful optical compensation of the VA-mode liquid crystal cell comprising a liquid crystal layer having a large Δn'd'/λ) with the aid of the optical compensation film 6, it is necessary to increase Rth/λ of the optical compensation film 6 so as to increase the length of the arrow from point 1 to point A, and it is necessary to reduce Re/Rth of the optical compensation film 6, in other words to reduce Re/λ, in order to make the obliquely ascending arrow from point 1 towards point A rise more steeply. In this embodiment, Re/λ and Rth/λ of the optical compensation film are determined depending on Δn'd'/λ of the liquid crystal layer, while conditionally satisfying the relations (V) to (VIII), so as to ensure a correct optical compensation. In this embodiment, Δn'd'/λ is determined if Δnd at wavelength λ of the liquid crystal layer to be compensated and wavelength λ are given, and this allows use of the optical compensation film showing Re/λ and Rth/λ satisfying the above-described relations.

Figure 8:
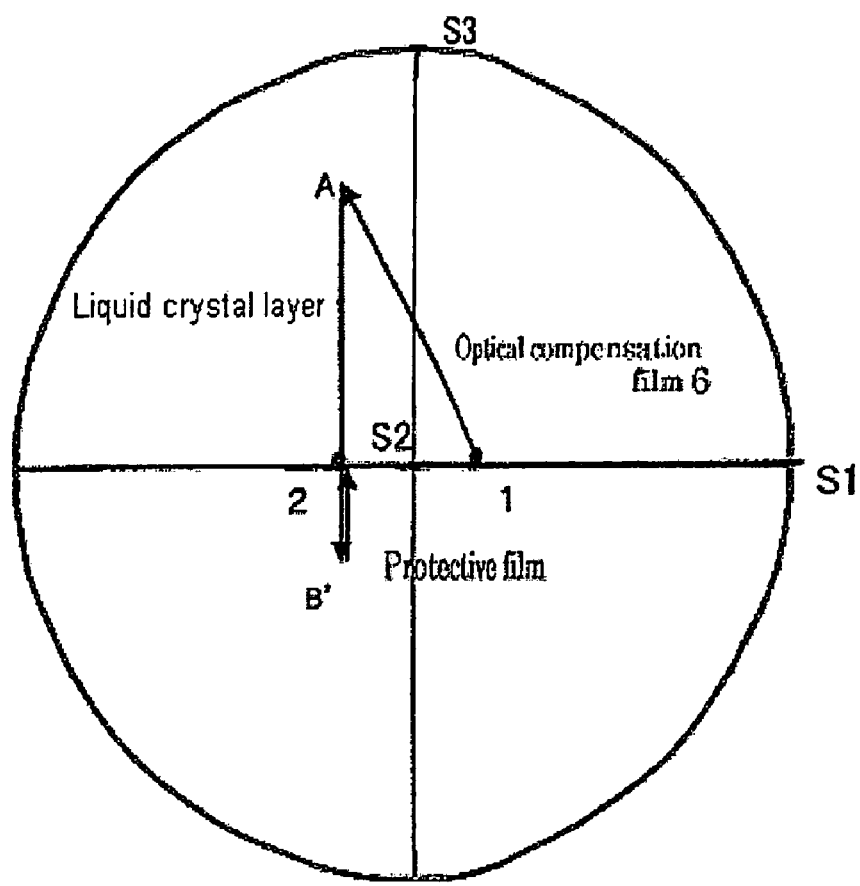
FIG. 8 is a schematic drawing of the Poincare sphere used for explaining polarization states of an incident light in another exemplary liquid crystal display device of the present invention.

The configuration shown in FIG. 7 pays no attention to optical characteristics of the protective film for the polarizing film composing the polarizing plate 2, whereas also a predetermined retardation Rth in the thickness-wise direction, shown by any polymer film or the like used as the protective film for the polarizing film, may affect the optical compensation. FIG. 8 shows an optical compensation mechanism in which the protective film (protective film disposed on the liquid crystal cell 3 side) of the polarizing plate 2 in the embodiment shown in FIG. 4 has a retardation of Rth=38 nm in the thickness-wise direction. A correct optical compensation is ensured by combining the liquid crystal cell 3 and the optical compensation film 6 which satisfy the relations (V) to (VIII), considering a downward rotation (rotation from point B' to point 2) indicating transition of the polarization state ascribable to passage through the protective film. In this embodiment, retardation Rth in the thickness-wise direction of the protective film disposed on the liquid crystal cell side of the polarizing plate 2, which is a polarizing plate not adjacent to the optical compensation film, is preferably 0 to 60 nm, and more preferably 0 to 30 nm.

As has been described in the above, the present invention optimizes the relation between so-called birefringence index Δnd/λ of the VA-mode liquid crystal layer, and Re/λ and Rth/λ of the optical film compensating it, depending on a spectral range and spectral distribution of a light source to be adopted. The present invention is, however, different from the prior art related to optical compensation of VA-mode cells, in that the optimum ranges thereof are theoretically discussed and clarified. Combination of the liquid crystal layer and the optical compensation film so as to satisfy the relations (I) to (VI), or the relations (V) to (VIII) makes it possible to compensate the wavelength dispersion of the liquid crystal layer with the wavelength dispersion of the optical compensation film. Viewing-angle dependence of the contrast of VA-mode panels can consequently be moderated to a large extent. It is also made possible to suppress light leakage in a black state over an arbitrary wavelength range, and this means reduction in viewing-angle-dependent color shifting caused by light leakage in a specific wavelength range.

In the present invention, optimum values of the film are expressed by the above relations, and effects are confirmed by relevant Examples described later. Ranges ensuring effects of the present invention were specified by a set of parameters A, B, C and D, or a set of parameters E, F and G in the above-described relations. As a matter of convenience, B and D, or G are set constant at values most suitable for expressing the effective ranges of the film, and only A and C, or E and F are given with certain ranges so as to express the ranges in which the effects of the present invention will be obtained.

The present invention is to provide an optical compensation film capable of reducing the viewing-angle-dependence of contrast and viewing-angle-dependent color shifting of VA-mode panels to a large extent, under an arbitrary birefringent index and wavelength dispersion of liquid crystal, and at the same time, the present invention is applicable also to liquid crystal cells using different wavelengths of R, G and B. For example, the optical compensation based on the above-described relations is effective also in the case where the film of the present invention is applied to a projection-type liquid crystal cell having different liquid crystal cells for R, G and B, and this consequently expands viewing angle ensuring a desirable contrast. Even for a liquid crystal panel using a general light source having a number of wavelengths mixed therein, it is made possible to obtain an effect of expanding viewing angle ensuring a desirable contrast, by representing characteristics of a liquid crystal panel with wavelength for G, and by using the optical compensation film conforming to the relations of the present invention.

Scope of the present invention is not limited to display mode of the liquid crystal layer, and is applicable to liquid crystal display devices employing any other display modes including VA mode, IPS mode, ECB mode, TN mode and OCB mode.

Next paragraphs will further detail optical characteristics, source materials, methods of production and so forth of the optical compensation film applicable to the present invention.

[Optical Compensation Film]

The optical compensation film applicable to the present invention contributes to improving the viewing angle ensuring a desirable contrast, and to reducing color shifting depending on viewing angle of liquid crystal display devices, in particular VA-mode liquid crystal display devices. In the present invention, the optical compensation film may be disposed between the polarizing plate and the liquid crystal cell on the observer's side, or between the polarizing plate and the liquid crystal cell on the back side, or on both sides. It is also allowable to incorporate the film as an independent component into the liquid crystal display device, or to impart optical characteristics to the protective film protecting the polarizing film so as to functionalize itself as the optical compensation film, and to incorporate the film as one component of the polarizing plate into the liquid crystal display device.

As described in the above, the optical compensation film has desirable ranges for Re/λ and Rth/λ at arbitrary wavelength λ of a light source or such as being used on the observer's side, out of visible light wavelength region, varied depending on modes of embodiment of the liquid crystal layer and wavelength λ. In an exemplary case where the film is used for optical compensation of a VA-mode liquid crystal cell at wavelength λ=550 nm (e.g., a VA-mode liquid crystal cell comprising a liquid crystal layer having a product Δn·d of the thickness d (μm) and refractive index anisotropy Δn of 0.2 to 1.0 μm), Re/λ falls preferably in a range from 0.04 to 0.13, more preferably from 0.05 to 0.1, and still more preferably from 0.06 to 0.09. The Rth/λ falls preferably in a range from 0.05 to 1.1, more preferably from 0.1 to 1.0, and still more preferably from 0.13 to 0.91.

The optical compensation film has three mean refractive indices nx, ny and nz respectively in directions of the x-, y- and z-axes orthogonal to each other. Three these values are intrinsic refractive indices of the optical compensation film, and Rth and Re are determined by these values and the thickness of the film $d_1$. The optical compensation film satisfying the above-described optical characteristics can be produced by appropriately selecting source materials, amount of compounding of the materials and conditions for production, so as to adjust these values into desired ranges. The values nx, ny and nz differ by wavelength, so that also Rth and Re differ by wavelength. The optical compensation film can be produced making use of this feature.

In the present invention, there are no special limitations on the materials used for producing the optical compensation film. For example, the film may be either of a stretched birefringent polymer film and an optically anisotropic layer formed by fixing liquid-crystalline compound molecules to a predetermined orientation. The optical compensation film is not limited to that having a single-layered structure, but may have a stacked structure comprising a plurality of films stacked therein. Materials composing the individual layers of the stacked structure are not necessarily the same, and may typically be a stack comprising a polymer film and an optically anisotropic layer formed of a composition comprising a liquid-crystalline compound. In an embodiment of the stacked structure, a stacked structure of coated type, comprising a layer formed by coating, is more preferable than a stack comprising a plurality of polymer stretched films, taking the thickness into consideration.

Liquid crystalline molecules can be aligned in various modes alignment states, and, thus, for the case where a liquid-crystalline compound is used for producing the optical compensation film, the optically anisotropic layer thereof produced by fixing the liquid-crystalline molecules in an alignment state, in a form of single layer or stack of a plurality of layer, can exhibit desired optical characteristics. The optical compensation film may be embodied as comprising a support and one or more optically anisotropic layers formed on the support. Overall retardation of thus-embodied optical compensation film can be adjusted by optical anisotropy of the optically anisotropic layer. The liquid-crystalline compound can be classified based on their molecular shapes into rod-like liquid crystal compound and discotic liquid crystal compound. Each of the liquid crystal compounds further includes low-molecular type and high-molecular type. When the optical compensation film is produced using the liquid crystal compound, it is preferable to use the rod-like liquid crystal compound or the discotic liquid crystal compound, and it is more preferably to use the rod-like liquid crystal compound having polymerizable groups or the discotic liquid crystal compound having polymerizable groups.

The optical compensation film may be composed of a polymer film. The polymer film may be a stretched polymer film or may be a combination of a coated polymer layer and a polymer film. Materials generally used for composing the polymer include synthetic polymers (e.g., polycarbonate, polysulfone, polyether sulfone, polyacrylate, polymethacrylate, norbornene resin and triacetyl cellulose). Also cellulose acylate-base film is preferably used, wherein the film is made of a composition containing cellulose acylate and an aromatic-ring-containing, rod-like compound (more specifically, an aromatic compound having two aromatic rings) added thereto. A polymer film having desired optical characteristics can be produced by adjusting species of the aromatic compound, amount of addition of the compound, and conditions of stretching of the film.

《 Cellulose Acylate Film 》

The cellulose acylate film applicable to the present invention will further be detailed.

Proper adjustment of species of aromatic compound having aromatic rings (more specifically, an aromatic compound having two aromatic rings), amount of addition thereof and conditions for the production (e.g., conditions for film stretching) makes it possible to fabricate the cellulose acylate film capable of satisfying the optical characteristics of the transparent film of the present invention. It is to be noted that a protective film for the polarizing plate is generally composed of a cellulose acylate film. Use of the above-described cellulose acylate film as one of protective films for the polarizing plate makes it possible to add the polarizing plate with an optical compensation function, without increasing the number of constituents of the polarizing plate.

Combined use of two or more species of rod-formed compounds respectively having a maximum absorption wavelength (λmax) in UV spectra at 250 nm or shorter is successful in obtaining Re/Rth differed by wavelengths.

Source cottons for cellulose acylate may be those publicly known (see JIII Journal of Technical Disclosure No. 2001-1745, for example). Synthesis of cellulose acylate may also be carried out according to the publicly-known methods (see "Mokuzai Kagaku (Wood Chemistry)", edited by Migita et al., p. 180-190, published by Kyoritsu Shuppan Co., Ltd., 1968). Viscosity mean degree of polymerization of cellulose acylate preferably falls within a range from 200 to 700, more preferably from 250 to 500, and most preferably from 250 to 350. Cellulose ester used for the present invention preferably has a narrow molecular weight distribution in terms of Mw/Mn measured by gel permeation chromatography (Mw is weight average molecular weight, and Mn is number average molecular weight). A specific value of Mw/Mn is preferably 1.5 to 5.0, more preferably 2.0 to 4.5, and most preferably 3.0 to 4.0.

There is no special limitation on the acyl group in the cellulose acylate film, wherein preferable examples include acetyl group and propionyl group, and acetyl group is particularly preferable. Substitution degree of the entire acyl group is preferably 2.7 to 3.0, and more preferably 2.8 to 2.95. The substitution degree of acyl group described in this patent specification refers to a value calculated conforming to ASTM D817. The acyl group is most preferably acetyl group. For the case where the cellulose acetate having acetyl group as the acyl group thereof is used, the degree of acetylation preferably falls within a range from and 59.0 to 62.5%, and more preferably from 59.0 to 61.5%. The degree of acetylation regulated within these ranges is successful in preventing Re from increasing beyond a desired value due to transfer tension during the cast spreading, in reducing in-plane variation thereof, and in suppressing variations in the retardation value depending on temperature and humidity. In view of suppressing the variations in Re and Rth, the substitution degree by an acyl group at the 6-position is preferably adjusted to 0.9 or above.

It is also possible to adjust the wavelength dispersion characteristics, based on a fact that mixed use of two species of cellulose acetate differing in the degree of acetylation within a predetermined range makes it possible to adjust the wavelength dispersion characteristics of the retardation. In this method, as detailed in Japanese Laid-Open Patent Publication "Tokkai" No. 2001-253971, it is preferable to adjust difference (Ac1−Ac2) in the degree of acetylation between cellulose acetate having a maximum degree of acetylation (Ac1) and cellulose acetate having a minimum degree of acetylation (Ac2) within a range from 2.0 to 6.0% (2.0%≦Ac1−Ac2≦−6.0%). Mean degree of acetylation of the whole mixture preferably falls within a range from 55.0 to 61.5%. Ratio (P1/P2) of maximum viscosity mean degree of polymerization (P1) and minimum viscosity mean degree of polymerization (P2) of cellulose acetate is preferably 1 or more and less than 2 (1≦P1/P2<2). Viscosity mean degree of polymerization of the whole mixture preferably falls within a range from 250 to 500, and more preferably from 250 to 400.

《 Retardation Control Agent 》

The cellulose acylate film preferably contains a rod-like compound having at least two aromatic rings as a retardation control agent. The rod-like compound preferably has a straight linear molecular structure. The straight linear molecular structure herein means that the rod-like compound shows a straight linear molecular structure as a thermodynamically most stable structure. The thermodynamically most stable structure can be determined by crystallographic analysis or molecular orbital calculation. It is possible, for example, to determine a crystal structure which minimizes heat of formation of the compound, through molecular orbital calculation using a molecular orbital calculation software (e.g., WinMOPAC2000, product of FUJITSU). The linear molecular structure means that the principal chain in the molecular structure forms an angle of 140° or larger, in thus-calculated thermodynamically most stable structure.

The rod-like compounds having at least two aromatic rings are preferably those represented by the formula (1) below:

Formula (1)

In the above formula (1), each of $Ar^1$ and $Ar^2$ independently represents an aromatic group, and $L^1$ represents a divalent linking group selected from alkylene group, alkenylene group, alkynylene group, —O—, —CO— and any combinations thereof.

In this specification, the term of "aromatic group" is used for any aryl groups (aromatic hydrocarbon groups), any substituted aryl groups, any aromatic heterocyclic groups, or any substituted aromatic heterocyclic groups.

The aryl group and substituted aryl group are more preferable than aromatic heterocyclic group and substituted aromatic heterocyclic group. Heterocycle of the aromatic heterocyclic group is generally unsaturated. The aromatic heterocycle is preferably a five-membered ring, six-membered ring, or seven-membered ring, and is more preferably five-membered ring or six-membered ring. The aromatic heterocycle generally has a largest number of double bonds. The heteroatom is preferably a nitrogen atom, oxygen atom or sulfur atom, and more preferably a nitrogen atom or sulfur atom. Examples of the aromatic heterocycle include furan ring, thiophene ring, pyrrole ring, oxazole ring, isooxazole ring, thiazole ring, isothiazole ring, imidazole ring, pyrazole ring, furazan ring, triazole ring, pyran ring, pyridine ring, pyridazine ring, pyrimidine ring, pyrazine ring, and 1,3,5-triazine ring.

The aromatic ring in the aromatic group is preferably a benzene ring, furan ring, thiophene ring, pyrrole ring, oxazole ring, thiazole ring, imidazole ring, triazole ring, pyridine ring, pyrimidine ring or pyrazine ring, wherein benzene ring is particularly preferable.

Examples of the substituent group in the substituted aryl group and substituted aromatic heterocyclic group include halogen atom (F, Cl, Br, I), hydroxyl, carboxyl, cyano, amino, alkylamino group (e.g., methylamino, ethylamino, butylamino, dimethylamino), nitro, sulfo, carbamoyl, alkylcarbamoyl group (e.g., N-methylcarbamoyl, N-ethylcarbamoyl, N,N-dimethylcarbamoyl), sulfamoyl, alkylsulfamoyl group (e.g., N-methylsulfamoyl, N-ethylsulfamoyl, N,N-dimethylsulfamoyl), ureido, alkylureido group (e.g., N-methylureido, N,N-dimethylureido, N,N,N'-trimethylureido), alkyl group (e.g., methyl, ethyl, propyl, butyl, pentyl, heptyl, octyl, iso-propyl, s-butyl, t-amyl, cyclohexyl, cyclopentyl), alkenyl group (e.g., vinyl, aryl, hexenyl), alkynyl group (e.g., ethynyl, butinyl), acyl group (e.g., formyl, acetyl, butylyl, hexanoyl, lauryl), acyloxy group (e.g., acetoxy, butylyloxy, hexanoyloxy, lauryloxy), alkoxy group (e.g., methoxy, ethoxy, propoxy, butoxy, pentyloxy, heptyloxy, octyloxy), aryloxy group (e.g., phenoxy), alkoxycarbonyl group (e.g., methoxycarbonyl, ethoxycarbonyl, propoxycarbonyl, butoxycarbonyl, pentyloxycarbonyl, heptyloxycarbonyl), aryloxycarbonyl group (e.g., phenoxycarbonyl), alkoxycarbonylamino group (e.g., butoxycarbonylamino, hexyloxycarbonylamino), alkylthio group (e.g., methylthio, ethylthio, propylthio, butylthio, pentylthio, heptylthio, octylthio), arylthio group (e.g., phenylthio), alkylsulfonyl group (e.g., methylsulfonyl, ethylsulfonyl, propylsulfonyl, butylsulfonyl, pentylsulfonyl, heptylsulfonyl, octylsulfonyl), amide group (e.g., actamide, butylamide group, hexylamide, laurylamide) and non-aromatic heterocyclic group (e.g., morpholyl, pyrazinyl).

The substituent group in the substituted aryl group and substituted aromatic heterocyclic group is preferably a halogen atom, cyano, carboxyl, hydroxyl, amino, alkylsubstituted amino group, acyl group, acyloxy group, amide group, alkoxycarbonyl group, alkoxy group, alkylthio group or alkyl group.

The alkyl portions and alkyl groups in the alkylamino group, alkoxycarbonyl group, alkoxy group and alkylthio group may further include a substituent group. Examples of the substituent group for the alkyl portion and alkyl group include halogen atom, hydroxyl, carboxyl, cyano, amino, alkylamino group, nitro, sulfo, carbamoyl, alkylcarbamoyl group, sulfamoyl, alkylsulfamoyl group, ureido, alkylureido group, alkenyl group, alkynyl group, acyl group, acyloxy group, alkoxy group, aryloxy group, alkoxycarbonyl group, aryloxycarbonyl group, alkoxycarbonylamino group, alkylthio group, arylthio group, alkylsulfonyl group, amide group and non-aromatic heterocyclic group. The substituent group for the alkyl portion and alkyl group is preferably a halogen atom, hydroxyl, amino, alkylamino group, acyl group, acyloxy group, acylamino group, alkoxycarbonyl group or alkoxy group.

$L^1$ represents a divalent linking group selected from alkylene group, alkenylene group, alkynylene group, —O—, —CO— and groups based on any combinations thereof.

The alkylene group may have a cyclic structure. The cyclic alkylene group is preferably cyclohexylene, and particularly preferably 1,4-cyclohexylene. As the chain-formed alkylene group, straight-chain alkylene group is more preferable than the branched alkylene group.

The number of carbon atoms of the alkylene group is preferably 1 to 20, more preferably 1 to 15, still more preferably 1 to 10, further more preferably 1 to 8, and most preferably 1 to 6.

The alkenylene group and alkynylene group preferably has a linear structure rather than a cyclic structure, and preferably has a straight-chain structure rather than a branched structure. The number of carbon atoms of the alkenylene group and alkynylene group is preferably 2 to 10, more preferably 2 to 8, still more preferably 2 to 6, further more preferably 2 to 4, and most preferably 2 (vinylene or ethynylene). The arylene group preferably has the number of carbon atoms of 6 to 20, more preferably 6 to 16, and still more preferably 6 to 12.

Examples of the divalent linking groups based on the combination are listed below:

L-1: —O—CO-alkylene group-CO—O—
L-2: —CO—O-alkylene group-O—CO—
L-3: —O—CO-alkenylene group-CO—
L-4: —CO—O-alkenylene group-O—CO—
L-5: —O—CO-alkynylene group-CO—O—
L-6: —CO—O-alkynylene group-O—CO—
L-7: —O—CO-arylene group-CO—O—
L-8: —CO—O-arylene group-O—CO—
L-9: —O—CO-arylene group-CO—O—
L-10: —CO—O-arylene group-O—CO—

In the molecular structure represented by the formula (1), an angle formed between $Ar^1$ and $Ar^2$, while placing $L^1$ in between, is preferably 140° or larger. As the rod-like compound, those represented by the formula (2) below are more preferable:

In the molecular structure represented by the formula (1), an angle formed between $Ar^1$ and $Ar^2$, while placing $L^1$ in between, is preferably 140° or larger. As the rod-like compound, those represented by the formula (2) below are more preferable:

$$Ar^1-L^2-X-L^3-Ar^2 \quad \text{formula (2)}$$

In the above formula (2), each of $Ar^1$ and $Ar^2$ independently represents an aromatic group. The definition and examples of the aromatic group are same as those for $Ar^1$ and $Ar^2$ in the formula (1).

In the formula (2), each of $L^2$ and $L^3$ independently represents a divalent linking group selected from alkylene group, —O—, —CO— and any combinations thereof. The alkylene group preferably has a chain-formed structure rather than a cyclic structure, and more preferably has a straight-chain structure rather than a branched structure.

The number of carbon atoms of the alkylene group is preferably 1 to 10, more preferably 1 to 8, still more preferably 1 to 6, still more preferably 1 to 4, and most preferably 1 or 2 (methylene or ethylene). It is particularly preferable that $L^2$ and $L^3$ express —O—CO— or —CO—O—.

In the formula (2), X represents 1,4-cyclohexylene, vinylene or ethynylene.

Specific examples of the compounds represented by the formula (1) will be shown below.

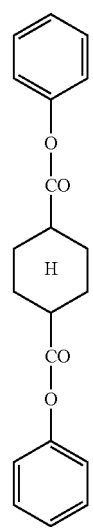

(1)

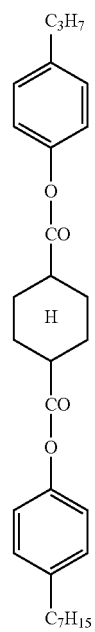

(2)

(3)
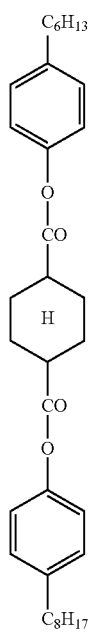
(4)
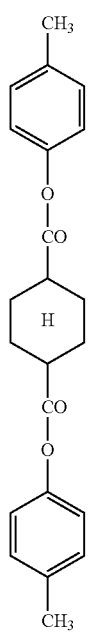
(5)
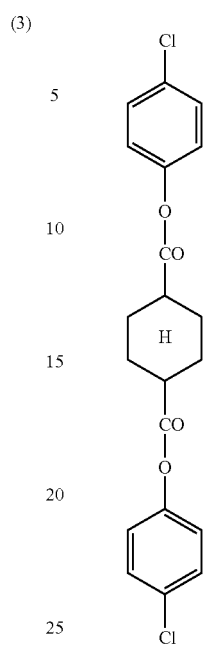
(6)
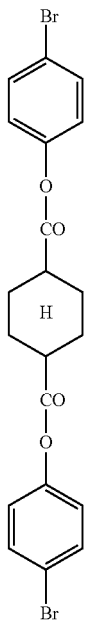

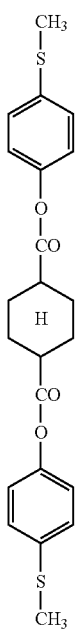 (7)
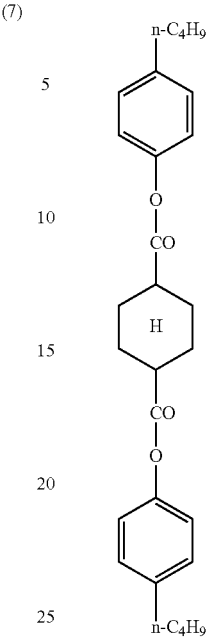 (9)
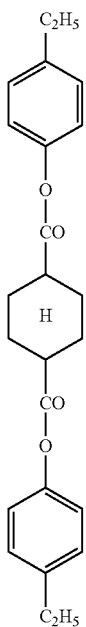 (8)
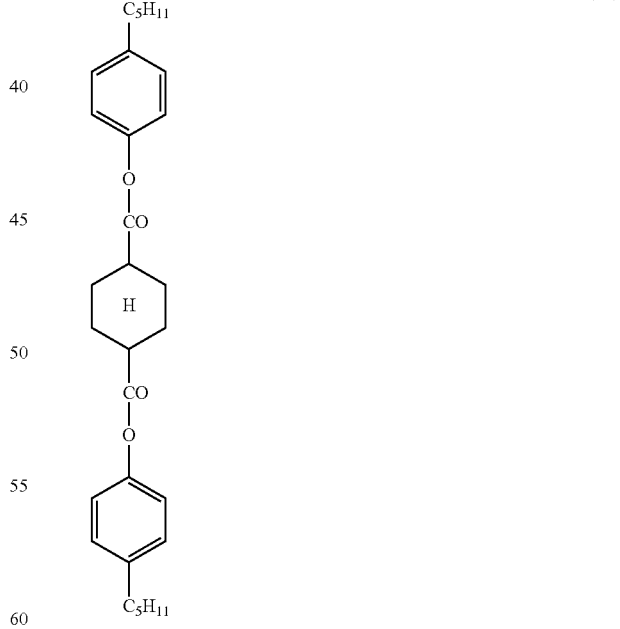 (10)

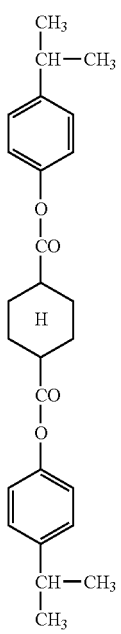
(11)
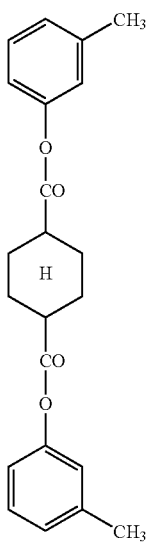
(12)
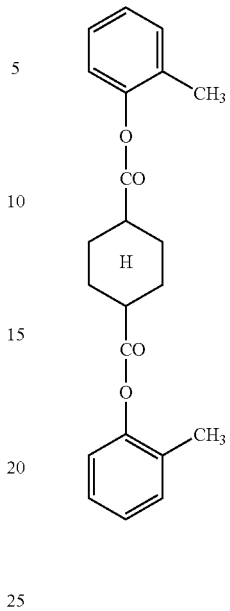
(13)
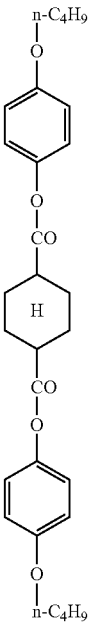
(14)

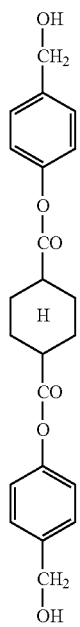 (15)
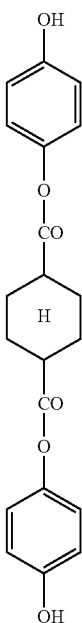 (17)
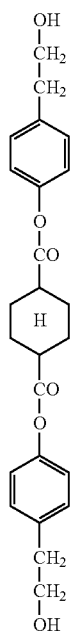 (16)
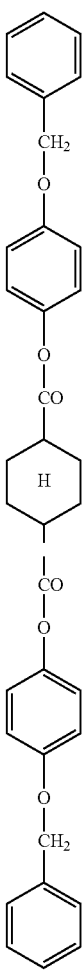 (18)

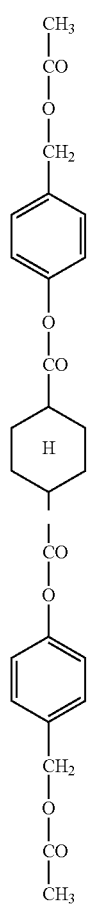
(19)
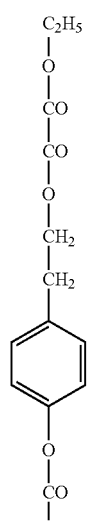
(20)
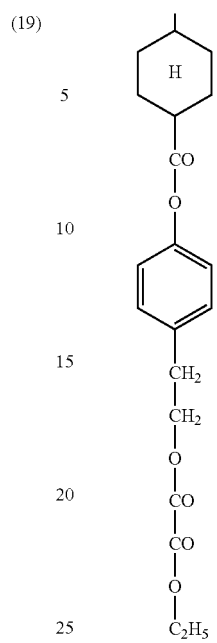
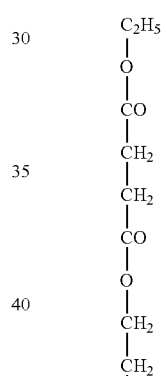
(21)
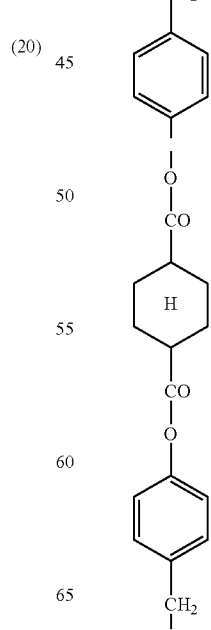

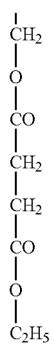
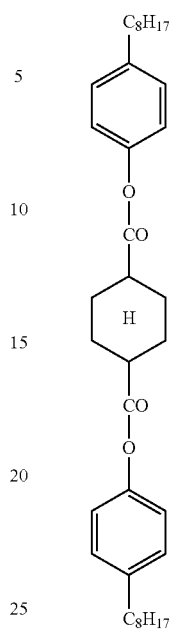
(22)
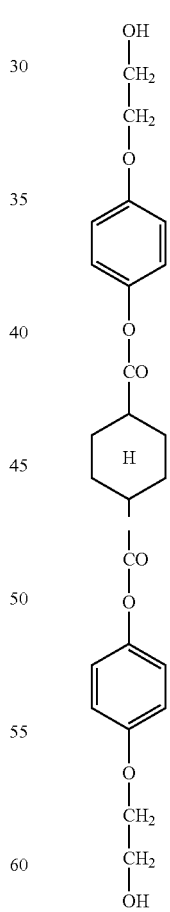
(23)
(24)

(25)
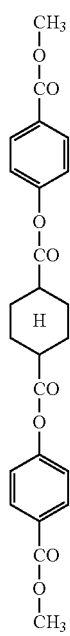
(26)
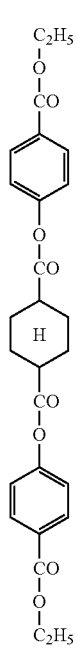
(27)
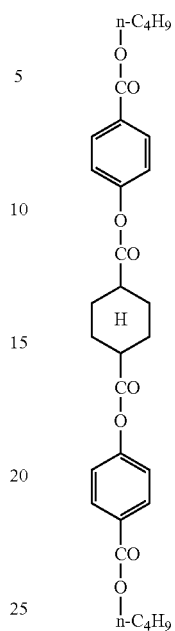
(28)
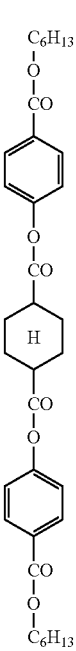

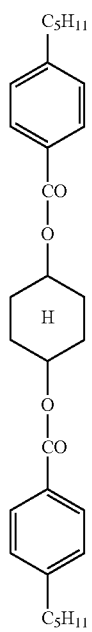
(29)
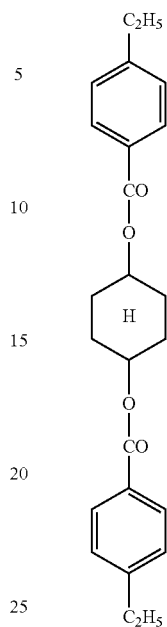
(31)
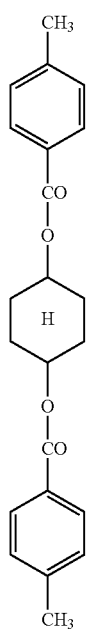
(30)
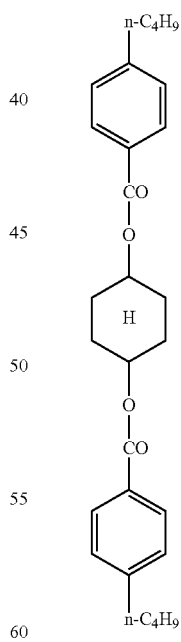
(32)

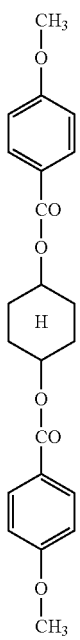
(33)
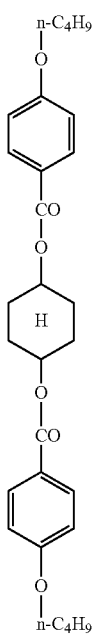
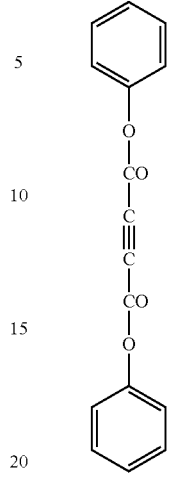
(35)
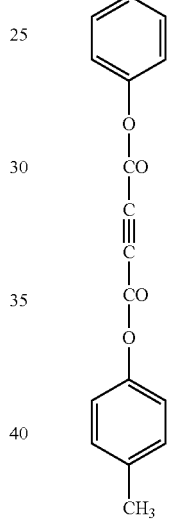
(36)
(34)
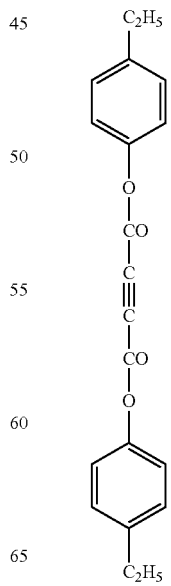
(37)

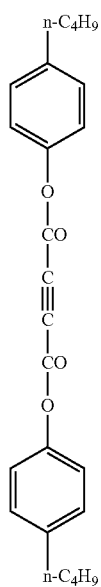 (38)
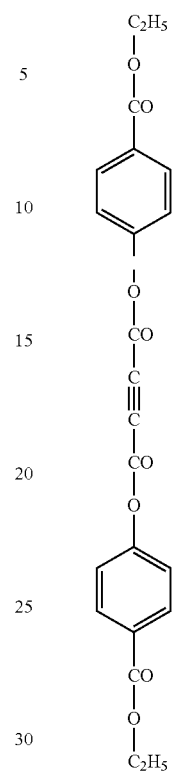 (40)
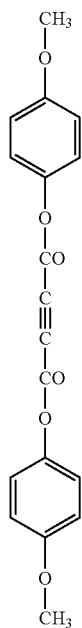 (39)
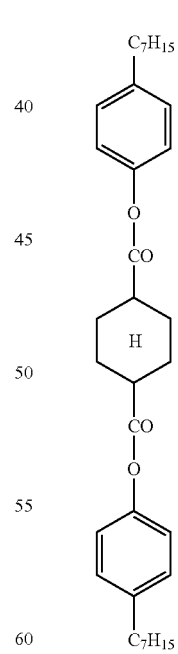 (41)

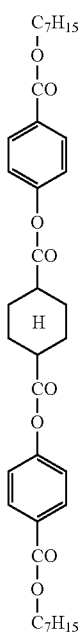 (42)

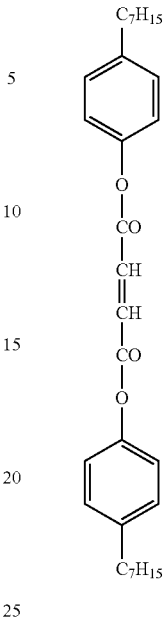 (44)

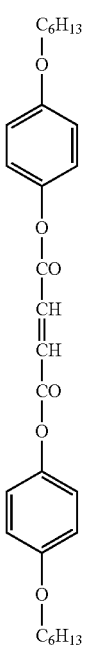 (43)

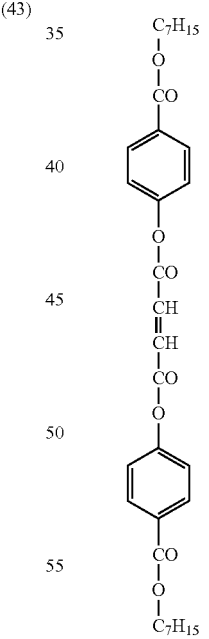 (45)

Specific examples (1) to (34), (41), (42) have two asymmetric carbon atoms at the 1-position and 4-position of cyclohexane ring. It is to be noted that the specific examples (1), (4) to (34), (41), (42), having symmetric meso-form molecular structure, have no isomers (optically inactive), and can exist only in forms of geometric isomers (trans-form and cis-form). Trans-form (1-trans) and cis-form (1-cis) isomers of the specific example (1) are listed below.

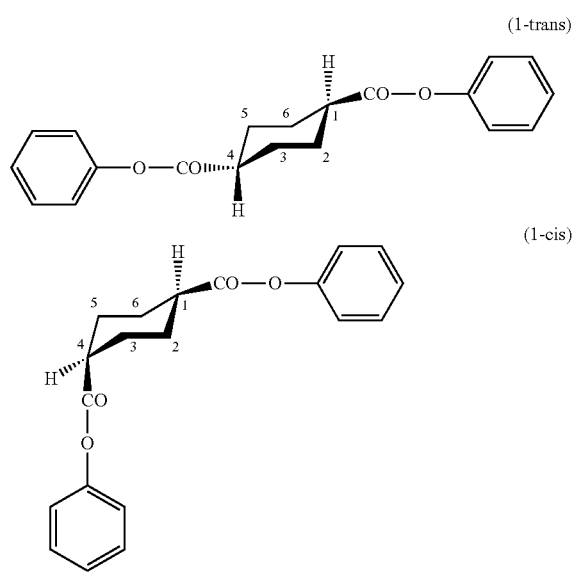

(1-trans)

(1-cis)

As described in the above, the rod-like compound preferably has a linear molecular structure. For this reason, the trans-form is more preferable than the cis-form. The specific examples (2) and (3) have optical isomers (total 4 isomers), in addition to geometric isomers. As for the geometric isomers, the trans-form is more preferable than the cis-form, similarly to as described in the above. There is no specific priority as for the optical isomers, wherein any of D-, L- and racemic compounds are allowable. The specific examples (43) to (45) have the trans-form and cis-form ascribable to the center vinylene bond, wherein the trans-form is more preferable than the cis-form based on the reason described in the above.

Other preferable compounds applicable to the retardation control agent are listed below:

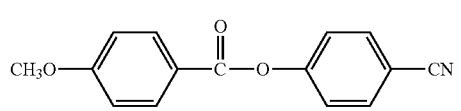

(46) (47)

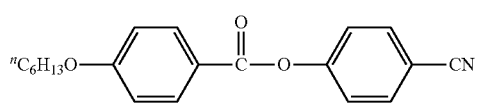

(48) (49)

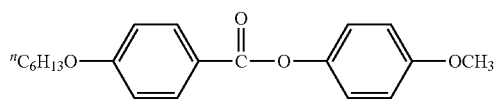

(50) (51)

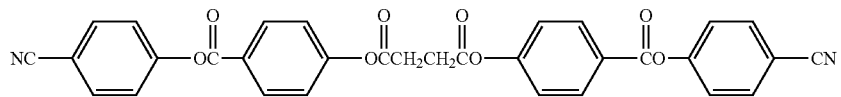

(52)

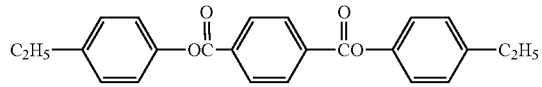

(53) (54)

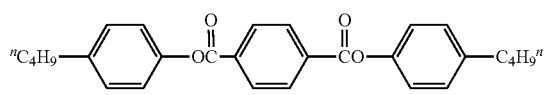

(55) (56)

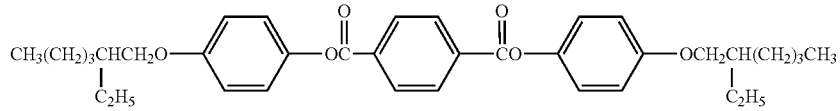

(57)

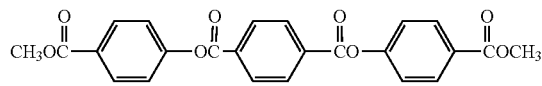

(58) (59)

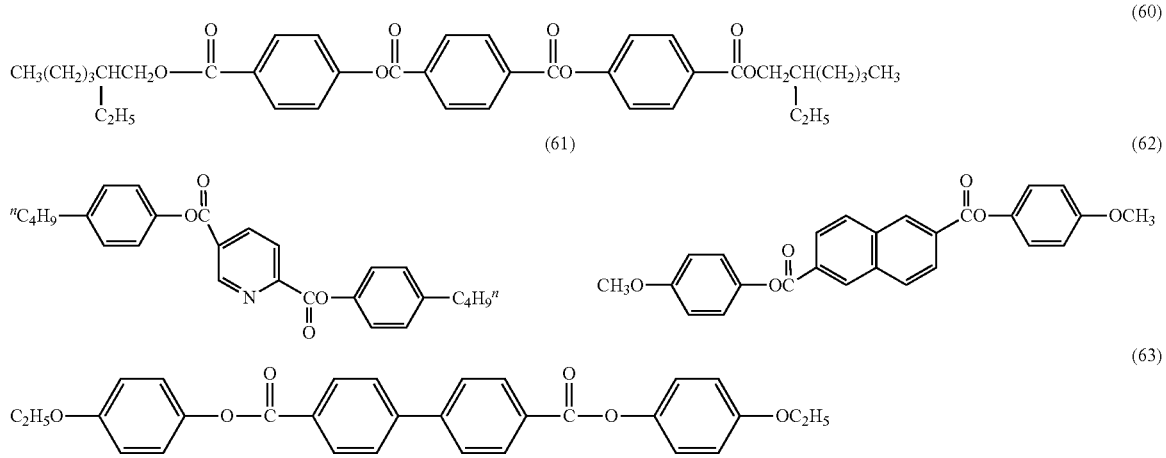

As the retardation control agent, it is preferable to use two or more species of the rod-like compounds in combination, a solution sample of each of which showing a maximum absorption wavelength (λmax) of shorter than 250 nm in ultraviolet absorption spectrometry. The rod-like compound can be synthesized according to methods described elsewhere in literatures. The literatures include Mol. Cryst. Liq. Cryst., Vol. 53, p. 229 (1979), ditto Vol. 89, p. 93 (1982), ditto Vol. 145, p. 111 (1987), ditto Vol. 170, p. 43 (1989), J. Am. Chem. Soc., Vol. 113, p. 1349 (1991), ditto Vol. 118, p. 5346 (1996), ditto Vol. 92, p. 1582 (1970), J. Org. Chem., Vol. 40, p. 420 (1975), and Tetrahedron, Vol. 48, No. 16, p. 3437 (1992).

Amount of addition of the retardation control agent is preferably 0.1 to 30 weight % of amount of the polymer, and more preferably 0.5 to 20 weight %.

The aromatic compound is used within a range from 0.01 to 20 weight parts per 100 weight parts of cellulose acylate. The aromatic compound is preferably used in an amount of 0.05 to 15 weight parts per 100 weight parts of cellulose acylate, and more preferably in an amount of 0.1 to 10 weight parts. Mixed use of two or more species of the compounds is also allowable.

[Wavelength Dispersion Adjusting Agent]

Next, compounds capable of controlling wavelength dispersion of cellulose acylate films will be described. The wavelength dispersion of the cellulose acylate film can be adjusted within a preferred range by various methods. For example, the wavelength dispersion of the cellulose acylate film may be adjusted within a preferred range by adding a compound having absorption at UV range of 200 to 400 nm. The amount of the above-described compound may be decided depending on types of the compound or adjusting degrees.

Values of Re and Rth of the cellulose acylate film generally show wavelength dispersion characteristics such as being increased on the longer wavelength side than on the shorter wavelength side. It is therefore necessary to smoothen the wavelength dispersion by increasing relatively small values of Re and Rth on the shorter wavelength side. On the other hand, the compound having an absorption in the ultraviolet region from 200 to 400 nm shows wavelength dispersion characteristics such as having larger absorbance on the longer wavelength side than on the shorter wavelength side. If the compound per se can isotropically distribute in the cellulose acylate film, birefringence of the compound per se, and consequently the wavelength dispersions of Re and Rth, are supposed to be larger on the shorter wavelength side, similarly to the wavelength dispersion of the absorbance.

It is therefore made possible to adjust the wavelength dispersion of Re and Rth of the cellulose acylate film, by using the above-described compound having absorption in the ultraviolet region from 200 to 400 nm, and having the wavelength dispersions of Re and Rth of the compound per se supposed to be larger on the shorter wavelength side. The absorption band of this sort of compound in the ultraviolet region preferably resides in a range from 200 to 400 nm, more preferably from 220 to 395 nm, and still more preferably 240 to 390 nm. It is also necessary that the compound used for adjusting the wavelength dispersion is fully compatible with cellulose acylate.

In these years, there are demands on higher luminance with fewer power consumption of the liquid crystal display for television set, notebook-type personal computer and mobile terminal and so forth, and this consequently demands a higher transmittance of optical materials used for the liquid crystal display. From this point of view, the compounds added to the cellulose acylate film must be excellent in the spectral transmittance. The cellulose acylate film preferably has a spectral transmittance at 380 nm of 45% to 95%, both ends inclusive, and a spectral transmittance at 350 nm of 10% or less.

From the viewpoint of volatility, the wavelength dispersion adjusting agent preferably has a molecular weight of 250 to 1000, more preferably 260 to 800, still more preferably 270 to 800, and particularly preferably 300 to 800. The agent may have a monomer structure, or may have an oligomer structure or a polymer structure composed of a plurality of such monomer units bonded to each other, so far as the molecular weight thereof falls within the above-described ranges.

For the case where the cellulose acylate film is produced by a method involving heating process, such as a solvent cast process, it is preferable that the wavelength dispersion adjusting agent is not volatile in the process of cast spreading of a dope, drying and so forth.

The amount of the wavelength dispersion adjusting agent is preferably 0.01 to 30% by weight of the cellulose acylate, more preferably 0.1 to 30% by weight, still more preferably 0.1 to 20% by weight, and particularly preferably 0.2 to 10% by weight.

The wavelength dispersion adjusting agent may be used independently, or in a mixed manner based on an arbitrary ratio of mixing of two or more compounds.

When the wavelength dispersion adjusting agent should be added is not specifically limited. For the case where the cellulose acylate film is produced by the solvent cast method, the agent may be added during the dope preparation process, or at the end of the dope preparation process.

Specific examples of the wavelength dispersion adjusting agent preferably used in the present invention include benzotriazole-base compounds, benzophenone-base compounds, cyano-group-containing compounds, oxybenzophenone-base compounds, salicilic-acid-ester-base compounds and nickel complex salt-base compounds, wherein the present invention is by no means limited to these compounds.

Preferable examples of the wavelength dispersion adjusting agent are those represented by the formula (3) below:

formula (3)

where, $Q^1$ represents a nitrogen-containing aromatic heterocycle, and $Q^2$ represents an aromatic ring.

The nitrogen-containing aromatic heterocycle represented by $Q^1$ is preferably a five-to-seven-membered, nitrogen-containing aromatic heterocycle, and more preferably five- or six-membered, nitrogen-containing aromatic heterocycle, wherein examples thereof include imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthooxazole, azabenzimidazole, purine, pyridine, pyrazine, pyrimidine, pyridazine, triazine, triazaindene and tetrazaindene. Among others, the five-membered, nitrogen-containing aromatic heterocycle is preferable, wherein specific examples thereof include imidazole, pyrazole, triazole, tetrazole, thiazole, oxazole, benzotriazole, benzothiazole, benzoxazole, thiadiazole, and oxadiazole. Benzotriazole is particularly preferable. The nitrogen-containing aromatic heterocycle represented by $Q^1$ may further has a substituent group, wherein substituent group T described later is applicable as the substituent group. For the case of having a plurality of substituent groups, the individual substituent groups may bond to each other to thereby form condensed rings.

The aromatic ring represented by $Q^2$ may be an aromatic hydrocarbon ring or may be an aromatic heterocycle. The aromatic ring may be monocycle, or may further form a condensed ring with other ring. The aromatic hydrocarbon ring is preferably a monocyclic or bicyclic aromatic hydrocarbon ring having the number of carbon atoms of 6 to 30 (e.g., benzene ring, naphthalene ring), more preferably an aromatic hydrocarbon ring having the number of carbon atoms of 6 to 20, still more preferably an aromatic hydrocarbon ring having the number of carbon atoms of 6 to 12, and further more preferably a benzene ring.

The aromatic heterocycle is preferably a nitrogen-atom-containing or sulfur-atom-containing aromatic heterocycle. Specific examples of the aromatic heterocycle include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzthiazole, benzotriazole and tetrazaindene. The aromatic heterocycle is preferably pyridine, triazine or quinoline.

$Q^2$ preferably represents an aromatic hydrocarbon ring, more preferably represents a naphthalene ring or benzene ring, and particularly preferably represents a benzene ring.

Each of $Q^1$ and $Q^2$ may further have a substituent group which is preferably selected from the substituent group T listed below. Substituent Group T:

an alkyl group (desirably $C_{1-20}$, more desirably $C_{1-12}$ and much more desirably $C_{1-8}$ alkyl group) such as methyl, ethyl, isopropyl, tert-butyl, n-octyl, n-decyl, n-hexadecyl, cyclopropyl, cyclopentyl or cyclohexyl; an alkenyl group (desirably $C_{2-20}$, more desirably $C_{2-12}$ and much more desirably $C_{2-8}$ alkenyl group) such as vinyl, allyl, 2-butenyl or 3-pentenyl; an alkynyl group (desirably $C_{2-20}$, more desirably $C_{2-12}$ and much more desirably $C_{2-8}$ alkynyl group) such as propargyl or 3-pentynyl; an aryl group (desirably $C_{6-30}$, more desirably $C_{6-20}$ and much more desirably $C_{6-12}$ aryl group) such as phenyl, p-methylphenyl or naphthyl; an aralkyl group (desirably $C_{7-30}$, more desirably $C_{7-20}$ and much more desirably $C_{7-12}$ aralkyl group) such as benzyl, phenethyl or 3-phenylpropyl; a substituted or unsubstituted amino group (desirably $C_{0-20}$, more desirably $C_{0-10}$ and much more desirably $C_{0-6}$ amino group) such as unsubstituted amino, methylamino, dimethylamino, diethylamino or anilino; an alkoxy group (desirably $C_{1-20}$, more desirably $C_{1-16}$ and much more desirably $C_{1-10}$ alkoxy group) such as methoxy, ethoxy or butoxy; an alkoxycarbonyl group (desirably $C_{2-20}$, more desirably $C_{2-16}$ and much more desirably $C_{2-10}$ alkoxy carbonyl group) such as methoxycarbonyl or ethoxycarbonyl; an acyloxy group (desirably $C_{2-20}$, more desirably $C_{2-16}$ and much more desirably $C_{2-10}$ acyloxy group) such as acetoxy or benzoyloxy; an acylamino group (desirably $C_{2-20}$, more desirably $C_{2-16}$ and much more desirably $C_{2-10}$ acylamino group) such as acetylamino or benzoylamino; an alkoxycarbonylamino group (desirably $C_{2-20}$, more desirably $C_{2-16}$ and much more desirably $C_{2-12}$ alkoxycarbonylamino group) such as methoxycarbonyl amino; an aryloxycarbonylamino group (desirably $C_{7-20}$, more desirably $C_{7-16}$ and much more desirably $C_{7-12}$ aryloxycarbonylamino group) such as phenyloxycarbonyl amino group; a sulfonylamino group (desirably $C_{1-20}$, more desirably $C_{1-16}$ and much more desirably $C_{1-12}$ sulfonylamino group) such as methylsulfonylamino group or benzenesulfonylamino group; a sulfamoyl group (desirably $C_{0-20}$, more desirably $C_{0-16}$ and much more desirably $C_{0-12}$ sulfamoyl group) such as unsubstituted sulfamoyl, methylsulfamoyl, dimethylsulfamoyl or phenylsulfamoyl; a carbamoyl group (desirably $C_{1-20}$, more desirably $C_{1-16}$ and much more desirably $C_{1-12}$ carbamoyl group) such as unsubstituted carbamoyl, methylcarbamoyl, diethylcarbamoyl or phenylcarbamoyl; an alkylthio group (desirably $C_{1-20}$, more desirably $C_{1-16}$ and much more desirably $C_{1-12}$ alkylthio group) such as methylthio or ethylthio; an arylthio group (desirably $C_{6-20}$, more desirably $C_{6-16}$ and much more desirably $C_{6-12}$ arylthio group) such as phenylthio; a sulfonyl group (desirably $C_{1-20}$, more desirably $C_{1-16}$ and much more desirably $C_{1-12}$ sulfonyl group) such as mesyl or tosyl; a sulfinyl group (desirably $C_{1-20}$, more desirably $C_{1-16}$ and much more desirably $C_{1-12}$ sulfinyl group) such as methane sulfinyl or benzenesulfinyl; an ureido group (desirably $C_{1-20}$, more desirably $C_{1-16}$ and much more desirably $C_{1-12}$ ureido group) such as unsubstituted ureido, methylureido or phenylureido; a phosphoric amide (desirably $C_{1-20}$, more desirably $C_{1-16}$ and much more desirably $C_{1-12}$ phosphoric amide) such as diethylphosphoric amide or phenylphosphoric amide; a hydroxy group, a mercapto group, a halogen atom such as fluorine, chlorine, bromine or iodine; a cyano group, a sulfo group, a carboxyl group, a nitro group, a hydroxamic acid group, a sulfino group, a hydrazino group, an imino group, a hetero cyclic group (desirably $C_{1-30}$ and more desirably $C_{1-12}$ heterocyclic group comprising at least one hetero atom such as nitrogen, oxygen or sulfur) such as imidazolyl, pyridyl, quinolyl, furyl, piperidyl, morpholino, benzoxazolyl, benzimidazolyl or benzthiazolyl; and a silyl group (desirably $C_{3-40}$, more desirably $C_{3-30}$ and much more desirably $C_{3-24}$ silyl group) such as trimethylsilyl or triphenylsilyl.

These substituents may be substituted with at least one substituent selected from these. When two substituents are selected, they may be same or different each other. Two or more may, if possible, bond each other to form a ring.

Among the compounds represented by the formula (3), triazole compounds represented by a formula (3-A) are preferred.

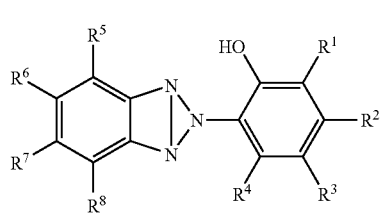

Formula (3-A)

In the formula, $R^1$, $R^2$, $R^3$, $R^4$, $R^5$, $R^6$, $R^7$ and $R^8$ respectively represent a hydrogen atom or a substituent group.

The substituent represented by $R^1$, $R^2$, $R^3$, $R^4$, $R^5$, $R^6$, $R^7$ or $R^8$ is selected from Substituent Group T described above. The substituent may be substituted with at least one substituent group or form a condensed ring by bonding each other.

It is preferred that $R^1$ and $R^3$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^1$ and $R^3$ respectively represent a hydrogen atom, an alkyl group, an aryl group, an alkoxy group, an aryloxy group or a halogen atom; it is much more preferred that $R^1$ and $R^3$ respectively represent a hydrogen atom or a $C_{1-12}$ alkyl group; and it is further much more preferred that $R^1$ and $R^3$ respectively represent a $C_{1-12}$ (preferably $C_{4-12}$) alkyl group.

It is preferred that $R^2$ and $R^4$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^2$ and $R^4$ respectively represent a hydrogen atom, an alkyl group, an aryl group, an alkoxy group, an aryloxy group or a halogen atom; it is much more preferred that $R^2$ and $R^4$ respectively represent a hydrogen atom or a $C_{1-12}$ alkyl group; it is further much more preferred that $R^2$ and $R^4$ respectively represent a hydrogen atom or methyl; and it is most preferred that $R^2$ and $R^4$ respectively represent a hydrogen atom.

It is preferred that $R^5$ and $R^8$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^5$ and $R^8$ respectively represent a hydrogen atom, an alkyl group, an aryl group, an alkoxy group, an aryloxy group or a halogen atom; it is much more preferred that $R^5$ and $R^8$ respectively represent a hydrogen atom or a $C_{1-12}$ alkyl group; it is further much more preferred that $R^5$ and $R^8$ respectively represent a hydrogen atom or methyl; and it is most preferred that $R^5$ and $R^8$ respectively represent a hydrogen atom.

It is preferred that $R^6$ and $R^7$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^6$ and $R^7$ respectively represent a hydrogen atom, an alkyl group, an aryl group, an alkoxy group, an aryloxy group or a halogen atom; it is much more preferred that $R^6$ and $R^7$ respectively represent a hydrogen atom or a halogen atom; and it is further much more preferred that $R^6$ and $R^7$ respectively represent a hydrogen atom or a chlorine.

Among the compounds represented by the formula (3), the compounds represented by a formula (3-B) are more preferred.

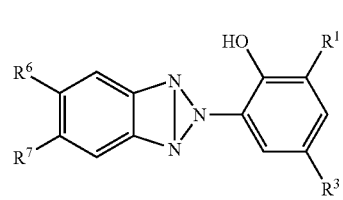

Formula (3-B)

In the formula, $R^1$, $R^3$, $R^6$ and $R^7$ are respectively same as those in the formula (3-A), and the preferred scopes of them are also same.

Examples of the compound represented by the formula (3) include, however not to be limited to, those shown below.

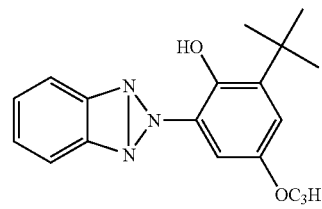

UV-1

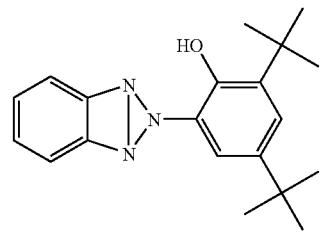

UV-2

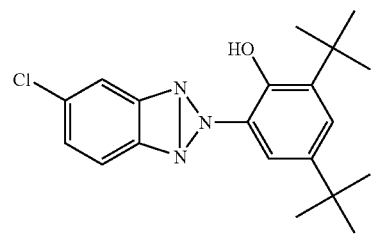

UV-3

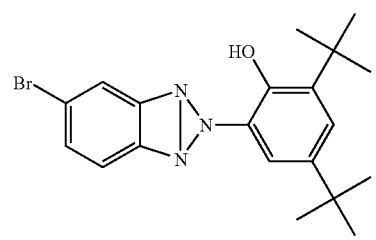

UV-4

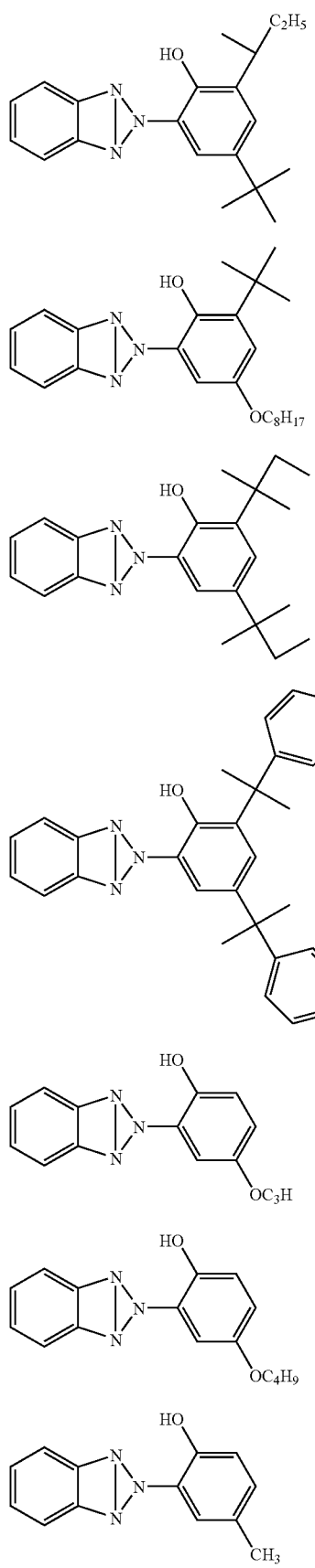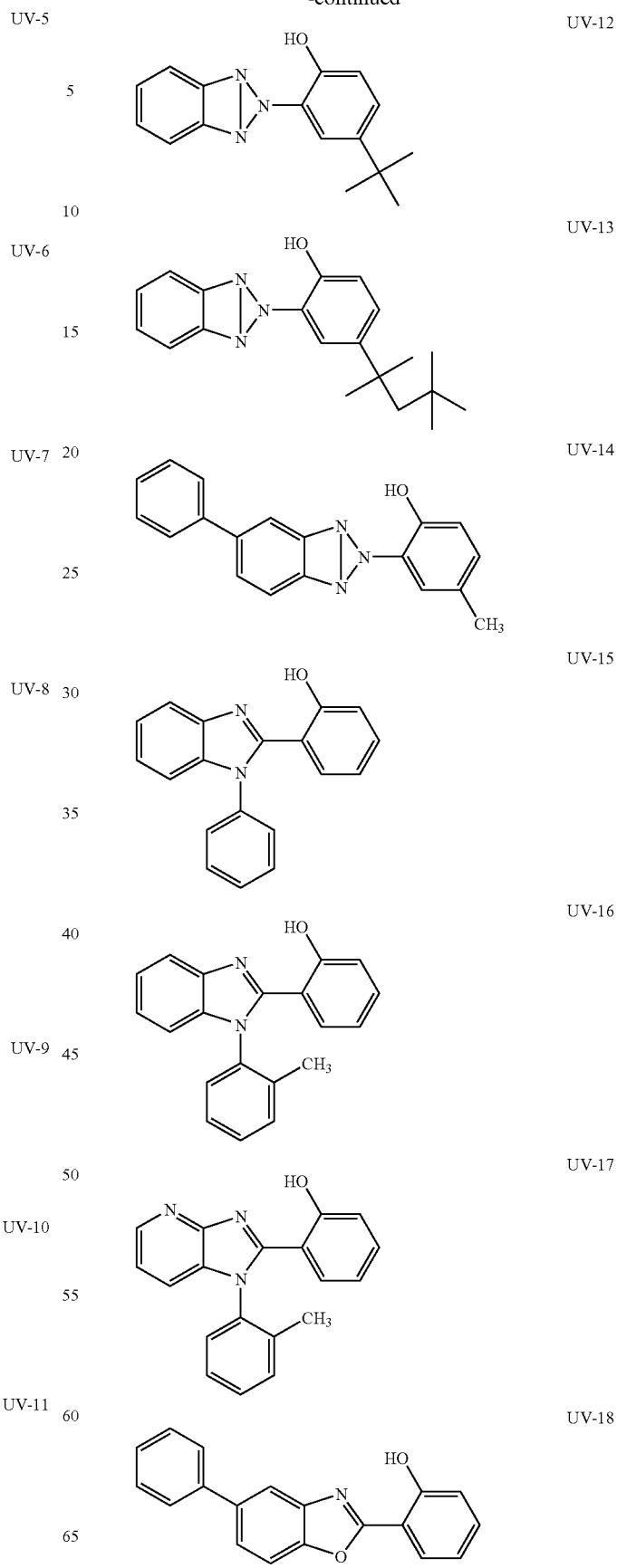

UV-19

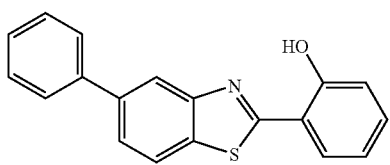

UV-20

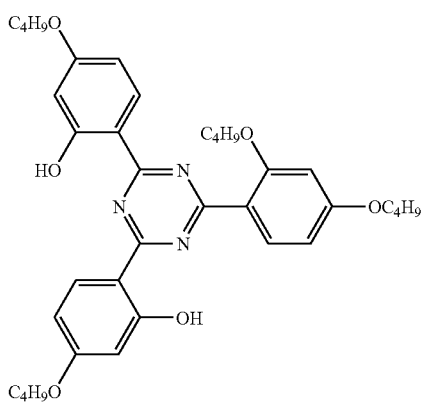

UV-21

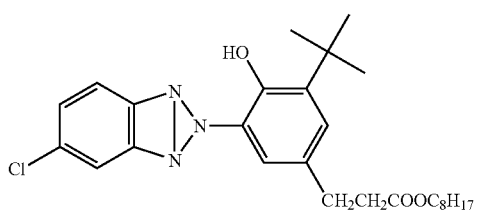

UV-22

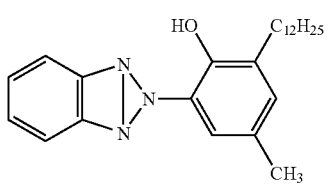

UV-23

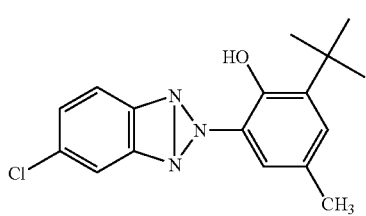

Among benzotriazole compounds shown above as examples, the compounds having a molecular-weight of greater than 320 are preferably used for producing the cellulose acylate film from the viewpoint of retention.

One of other preferable examples of the wavelength dispersion adjusting agent is a compound represented by the formula (4) below.

Formula (4)

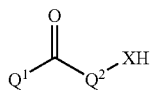

In the formula, $Q^1$ and $Q^2$ independently represent an aromatic ring, and X represents NR (R is a hydrogen atom or a substituent group), oxygen atom or sulfur atom.

The aromatic ring represented by $Q^1$ and $Q^2$ may be an aromatic hydrocarbon ring or may be an aromatic heterocycle. The aromatic ring may be monocycle, or may further form a condensed ring with other ring. The aromatic hydrocarbon ring represented by $Q^1$ and $Q^2$ is preferably a monocyclic or bicyclic aromatic hydrocarbon ring having the number of carbon atoms of 6 to 30 (e.g., benzene ring, naphthalene ring), more preferably an aromatic hydrocarbon ring having the number of carbon atoms of 6 to 20, still more preferably an aromatic hydrocarbon ring having the number of carbon atoms of 6 to 12, and further more preferably a benzene ring. The aromatic heterocycle represented by $Q^1$ and $Q^2$ may be an aromatic heterocycle preferably containing at least any one of an oxygen atom, nitrogen atom and sulfur atom. Specific examples of the heterocycle include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzthiazole, benzotriazole and tetrazaindene. The aromatic heterocycle is preferably pyridine, triazine or quinoline. Each of $Q^1$ and $Q^2$ preferably represents an aromatic hydrocarbon ring, more preferably an aromatic hydrocarbon ring having the number of carbon atoms of 6 to 10, and still more preferably a substituted or non-substituted benzene ring. Each of $Q^1$ and $Q^2$ may further have a substituent group. The substituent group may preferably be selected from the substituent group T listed above, but never contain carboxylic acid, sulfonic acid or quaternary ammonium salt. A plurality of the substituent group may bind with each other to produce a cyclic structure.

X is preferably NR (R represents a hydrogen atom or a substituent group. The above-described substituent group T is applicable to the substituent group), oxygen atom (O) or sulfur atom (S), wherein X is preferably NR (R is preferably an acyl group or sulfonyl group, and these substituent groups may further be substituted), or O, and particularly preferably O.

Among the compounds represented by the formula (4), the compounds represented by a formula (4-A) are preferred.

Formula (4-A)

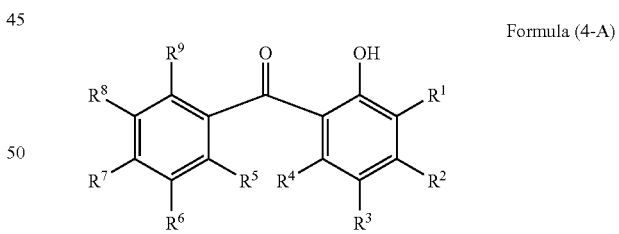

In the formula, $R^1$, $R^2$, $R^3$, $R^4$, $R^5$, $R^6$, $R^7$, $R^8$ and $R^9$ respectively represent a hydrogen atom or a substituent.

The substituent represented by $R^1$, $R^2$, $R^3$, $R^4$, $R^5$, $R^6$, $R^7$, $R^8$ or $R^9$ is selected from Substituent Group T described above. The substituent may be substituted with at least one substituent group or form a condensed ring by bonding each other.

It is preferred that $R^1$, $R^3$, $R^4$, $R^5$, $R^6$, $R^8$ and $R^9$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^1$, $R^3$, $R^4$, $R^5$, $R^6$, $R^8$ and $R^9$ respectively represent a hydrogen atom, an alkyl group, an aryl group, an alkoxy group, an aryloxy group or a halogen atom; it is much more preferred that $R^1$, $R^3$, $R^4$, $R^5$, $R^6$, $R^8$ and $R^9$ respectively represent a hydrogen atom or a $C_{1-12}$ alkyl group; it is further much more preferred that $R^1$, $R^3$, $R^4$, $R^5$, $R^6$, $R^8$ and $R^9$ respectively represent a hydrogen atom or methyl; and it is most preferred that $R^1$, $R^3$, $R^4$, $R^5$, $R^6$, $R^8$ and $R^9$ respectively represent a hydrogen atom.

It is preferred that $R^2$ represents a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^2$ represents a hydrogen atom, a $C_{1-20}$ alkyl group, a $C_{0-20}$ amino group, a $C_{1-20}$ alkoxy group, a $C_{6-12}$ aryloxy group or a hydroxy group; it is much more preferred that $R^2$ represents a $C_{1-20}$ alkoxy group; and it is further much more preferred that $R^2$ represents a $C_{1-12}$ alkoxy group.

It is preferred that $R^7$ represents a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^7$ represents a hydrogen atom, a $C_{1-20}$ alkyl group, a $C_{0-20}$ amino group, a $C_{1-20}$ alkoxy group, a $C_{6-12}$ aryloxy group or a hydroxy group; it is much more preferred that $R^7$ represents a hydrogen atom or a $C_{1-20}$ (desirably $C_{1-12}$, more desirably $C_{1-8}$ and much more desirably methyl) alkyl group; and it is further much more preferred that $R^7$ represents a hydrogen atom or methyl.

Among the compounds represented by the formula (4-A), the compounds represented by a formula (4-B) are preferred.

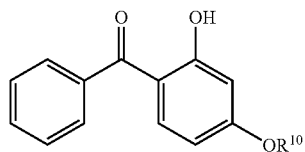

Formula (4-B)

In the formula, $R^{10}$ represents a hydrogen atom, a substituted or non-substituted alkyl group, a substituted or non-substituted alkenyl group, a substituted or non-substituted alkynyl group or substituted or non-substituted aryl group. The substituent represented by $R^{10}$ is selected from Substituent Group T shown above.

It is preferred that $R^{10}$ represents a substituted or non-substituted alkyl group; it is more preferred that $R^{10}$ represents a $C_{5-20}$ substituted or non-substituted alkyl group; it is much more preferred that $R^{10}$ represents $C_{5-12}$ substituted or non-substituted alkyl group such as n-hexyl, 2-ethylhexyl, n-octyl, n-decyl, n-dodecyl or benzyl; and it is further more preferred that $R^{10}$ represents a $C_{6-12}$ substitute or non-substituted alkyl group such as 2-ethylhexyl, n-octyl, n-decyl, n-dodecyl or benzyl.

The compounds represented by the formula (4) can be synthesized by a known method disclosed in Japanese Laid-Open Patent Publication "Tokkaihei" No. 11-12219.

Specific examples of the compounds represented by the formula (4) will be listed below, wherein the present invention is by no means limited to the specific examples listed below.

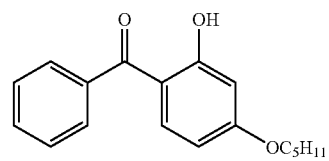
UV-101

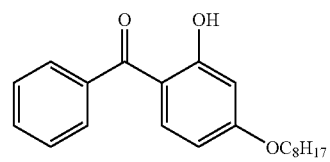
UV-102

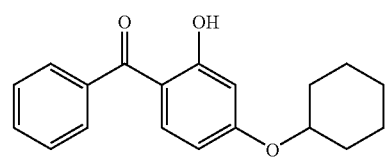
UV-103

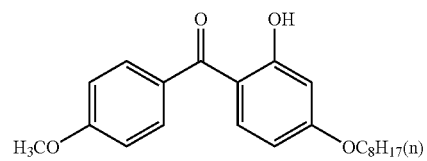
UV-104

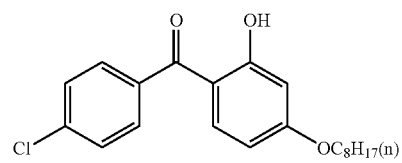
UV-105

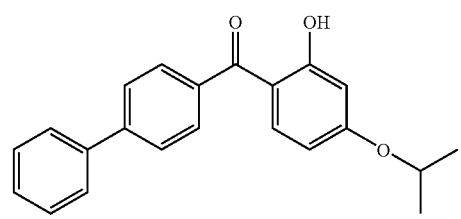
UV-106

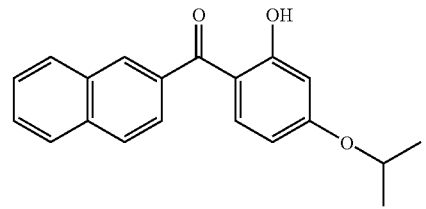
UV-107

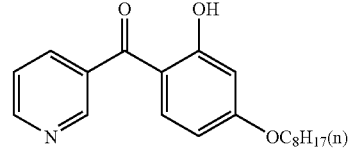
UV-108

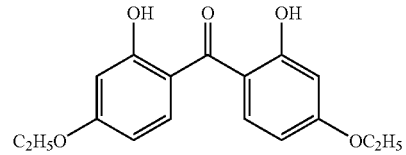
UV-109

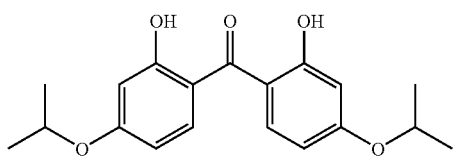
UV-110

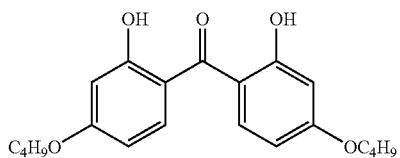
UV-111

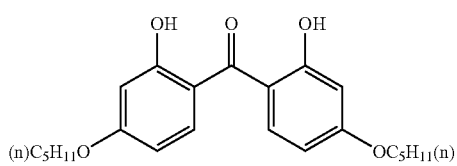
UV-112

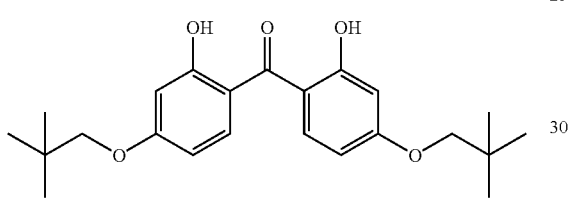
UV-113

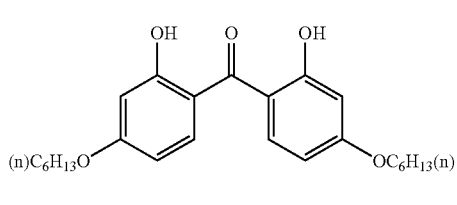
UV-114

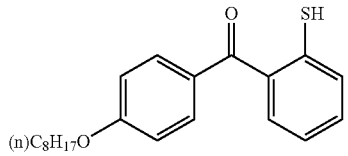
UV-115

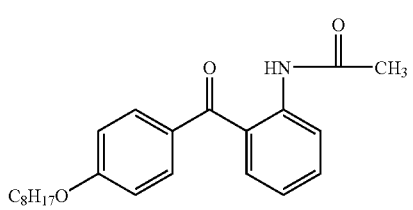
UV-116

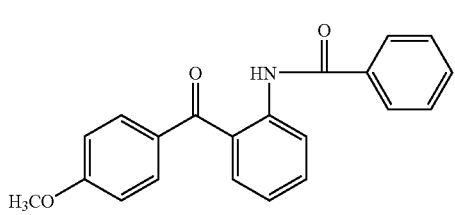
UV-117

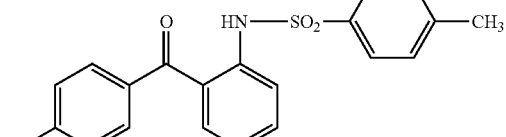
UV-118

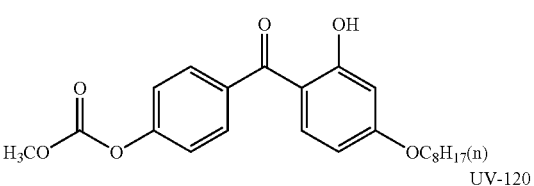
UV-119

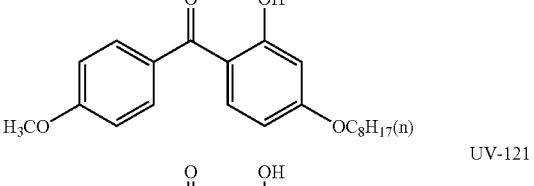
UV-120

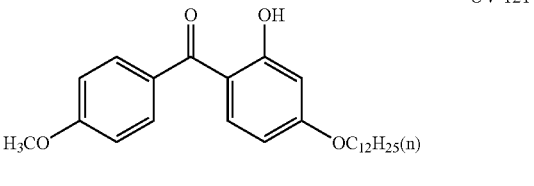
UV-121

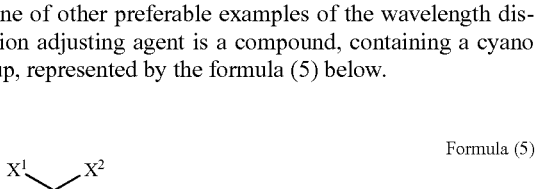

One of other preferable examples of the wavelength dispersion adjusting agent is a compound, containing a cyano group, represented by the formula (5) below.

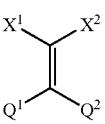

Formula (5)

In the formula, $Q^1$ and $Q^2$ independently represent an aromatic ring. Each of $X^1$ and $X^2$ represents a hydrogen atom or a substituent group, wherein at least either one of which represents a cyano group, carbonyl group, sulfonyl group or aromatic heterocycle. The aromatic ring represented by $Q^1$ and $Q^2$ may be an aromatic hydrocarbon ring or an aromatic heterocycle. These may be a monocycle, or may further form a condensed ring with other ring.

The aromatic hydrocarbon ring is preferably a monocyclic or bicyclic aromatic hydrocarbon ring having the number of carbon atoms of 6 to 30 (e.g., benzene ring, naphthalene ring), more preferably an aromatic hydrocarbon ring having the number of carbon atoms of 6 to 20, more preferably an aromatic hydrocarbon ring having the number of carbon atoms of 6 to 12, and still more preferably a benzene ring.

The aromatic heterocycle is preferably a nitrogen-atom-containing or sulfur-atom-containing aromatic heterocycle. Specific examples of the heterocycle include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole and tetrazaindene. The aromatic heterocycle is preferably pyridine, triazine or quinoline.

Each of $Q^1$ and $Q^2$ preferably represents an aromatic hydrocarbon ring, and more preferably a benzene ring. Each of $Q^1$ and $Q^2$ may further have a substituent group, wherein the substituent group is preferably selected from the above-described substituent group T.

Each of $X^1$ and $X^2$ represents a hydrogen atom or a substituent group, wherein at least either one of which represents a cyano group, carbonyl group, sulfonyl group or aromatic heterocycle. The above-described substituent group T is applicable to the substituent group represented by $X^1$ and $X^2$. The substituent group represented by $X^1$ and $X^2$ may further be substituted with other substituent group, or $X^1$ and $X^2$ may be condensed with each other to thereby form a ring structure.

Each of $X^1$ and $X^2$ is preferably a hydrogen atom, alkyl group, aryl group, cyano group, nitro group, carbonyl group, sulfonyl group or aromatic heterocycle, more preferably a cyano group, carbonyl group, sulfonyl group or aromatic heterocycle, still more preferably a cyano group or carbonyl group, and particularly preferably a cyano group or alkoxycarbonyl group (—C(═O)OR, where R is an alkyl group having the number of carbon atoms of 1 to 20, aryl group having the number of carbon atoms of 6 to 12, and combinations thereof).

Among the compounds represented by the formula (5), the compounds represented by a formula (5-A) are preferred.

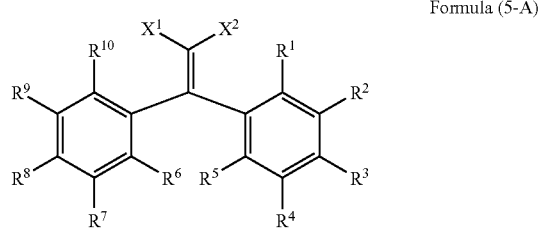

Formula (5-A)

In the formula, $R^1$, $R^2$, $R^3$, $R^4$, $R^5$, $R^6$, $R^7$, $R^8$, $R^9$ and $R^1$ respectively represent a hydrogen atom or a substituent group. The substituent is selected from Substituent Group T shown above. The substituent may be substituted with at least one substituent group or form a condensed ring by bonding each other. $X^1$ and $X^2$ are respectively same as those in the formula (5) and the preferred scopes are also same.

It is preferred that $R^1$, $R^2 R^4$, $R^5$, $R^6$, $R^7 R^9$ and $R^{10}$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^1$, $R^2 R^4$, $R^5$, $R^6$, $R^7$, $R^9$ and $R^{10}$ respectively represent a hydrogen atom, an alkyl group, an aryl group, an alkoxy group, an aryloxy group or a halogen atom; it is much more preferred that $R^1$, $R^2$, $R^4$, $R^5$, $R^6$, $R^7$, $R^9$ and $R^{10}$ respectively represent a hydrogen atom or a $C_{1-12}$ alkyl group; it is further much more preferred that $R^1$, $R^2$, $R^4$, $R^5$, $R^6$, $R^7$, $R^9$ and $R^{10}$ respectively represent a hydrogen atom or methyl; and it is most preferred that $R^1$, $R^2$, $R^4$, $R^5$, $R^6$, $R^7$, $R^9$ and $R^{10}$ respectively represent a hydrogen atom.

It is preferred that $R^3$ and $R^8$ respectively represent a hydrogen atom, an alkyl group, an alkenyl group, an alkynyl group, an aryl group, a substituted or non-substituted amino group, an alkoxy group, an aryloxy group, a hydroxy group or a halogen atom; it is more preferred that $R^3$ and $R^8$ respectively represent a hydrogen atom, a $C_{1-20}$ alkyl group, a $C_{0-20}$-amino group, a $C_{1-20}$ alkoxy group, a $C_{6-12}$ aryloxy group or a hydroxy group; it is much more preferred that $R^3$ and $R^8$ respectively represent a hydrogen atom, a $C_{1-12}$ alkyl group or a $C_{1-12}$ alkoxy group; and it is most preferred that $R^3$ and $R^8$ respectively represent a hydrogen atom.

Among the compounds represented by the formula (5-A), the compounds represented by a formula (5-B) are more preferred.

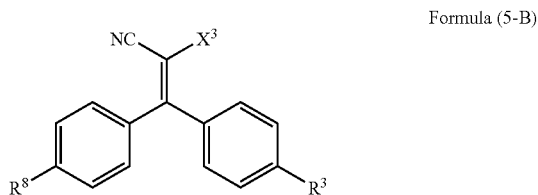

Formula (5-B)

In the formula, $R^3$ and $R^3$ are respectively same as those in the formula (5-A), and the preferred scopes are also same. $X^3$ represents a hydrogen atom or a substituent group. The substituent is selected from Substituent Group T shown above. The substituent may be substituted with at least one substituent group or form a condensed ring by bonding each other.

It is preferred that $X^3$ represents a hydrogen atom, an alkyl group, an aryl group, a cyano group, a nitro group, a carbonyl group, a sulfonyl group or an aryl hetecycle group; it is more preferred that $X^3$ represents a cyano group, a carbonyl group, a sulfonyl group or an aryl heterocycle group; it is much more preferred that $X^3$ represents a cyano group or a carbonyl group; and it is further much more preferred that $X^3$ represents a cyano group or an alkoxycarbonyl group, or in other words —C(═O)OR where R represents a $C_{1-20}$ alkyl group, a $C_{6-12}$ aryl group or a combination thereof.

Among the compounds represented by the formula (5-B), the compounds represented by a formula (5-C) are more preferred.

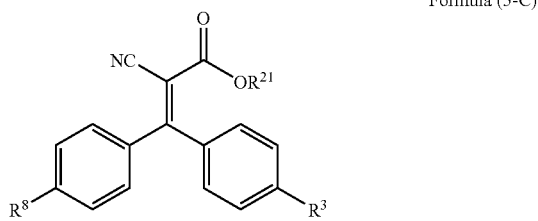

Formula (5-C)

In the formula, $R^3$ and $R^8$ are respectively same as those in the formula (5-A), and the preferred scopes are also same. $R^{21}$ represents a $C_{1-20}$ alkyl group.

When both of $R^3$ and $R^8$ are hydrogen atoms, $R^{21}$ preferably represents a $C_{2-12}$ alkyl group, more preferably represents a $C_{4-12}$ alkyl group, much more preferably represents a $C_{6-12}$ alkyl group, further much more preferably n-octyl, tert-octyl, 2-ethylhexyl, n-decyl or n-dodecyl, and most preferably represents 2-ethylhexyl.

When neither $R^3$ nor $R^8$ are hydrogen atoms, $R^{21}$ is preferably selected from alkyl groups having 20 or less carbon atoms such that the molecular weight of the compound represented by the formula (5-C) is not less than 300.

The compounds represented by the formula (5) can be synthesized by a method described in Journal of American Chemical Society, Vol. 63, p. 3452, (1941).

Specific examples of the compounds represented by the formula (5) will be listed below, wherein the present invention is by no means limited to the specific examples listed below.
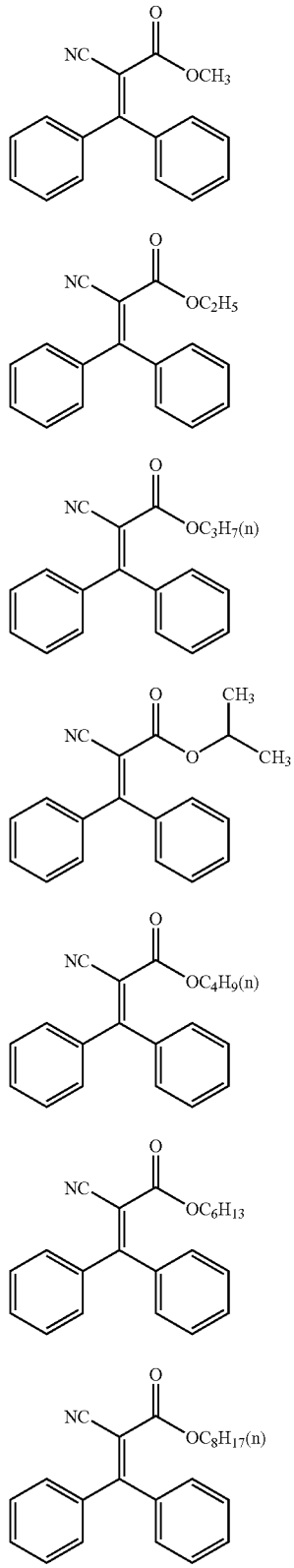
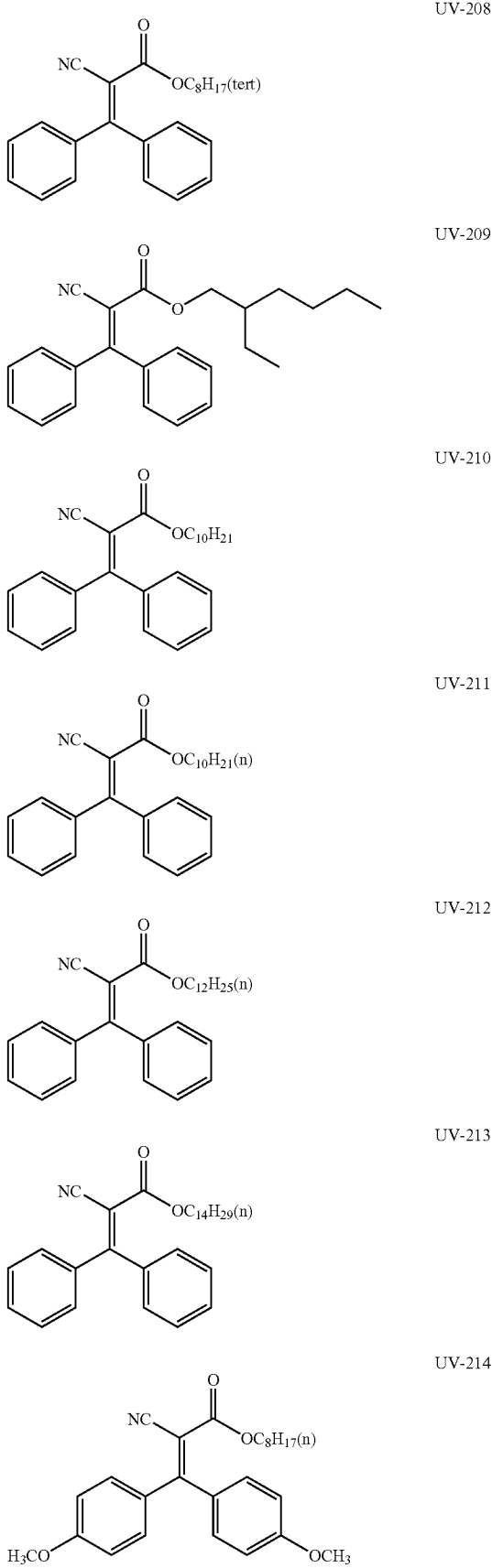

-continued
UV-215
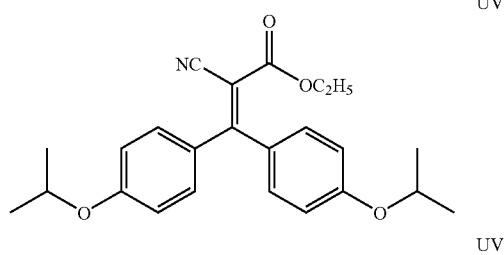
UV-216
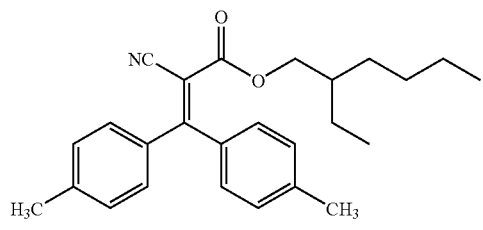
UV-217
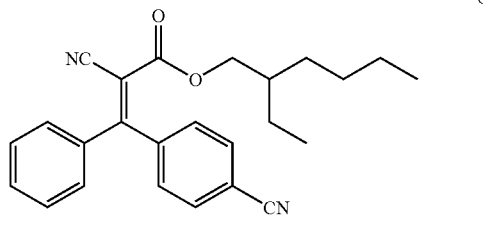
UV-218
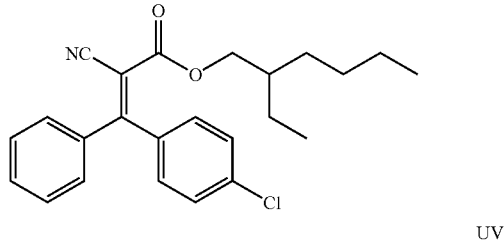
UV-219
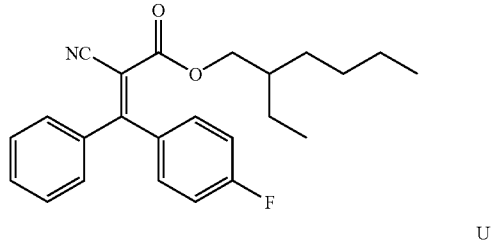
UV-220
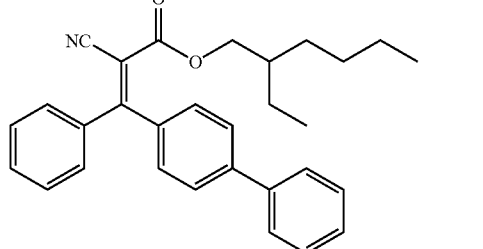
UV-221
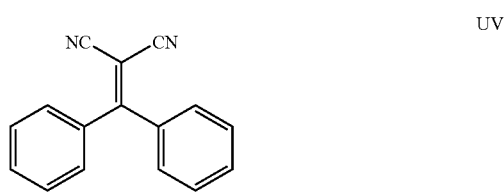
-continued
UV-222
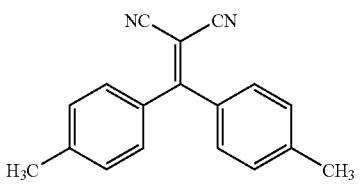
UV-223
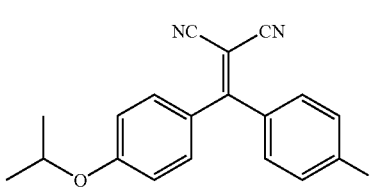
UV-224
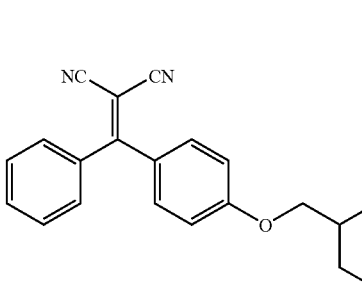
UV-225
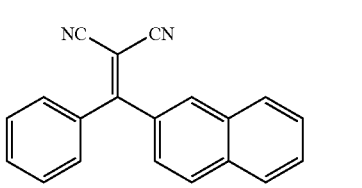
UV-226
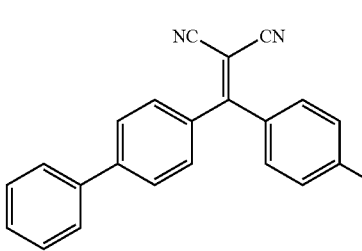
UV-227
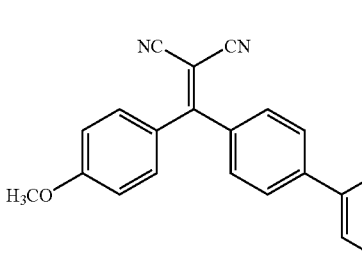
UV-228
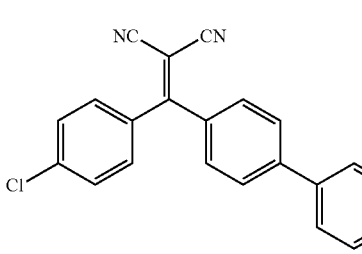

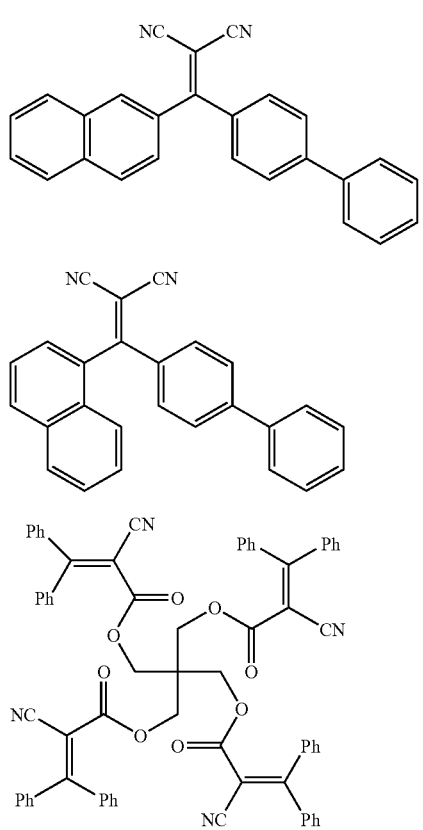

《Preparation of Cellulose Acylate Film》

The cellulose acylate film is preferably prepared by the solvent cast process. In the solvent cast process, a film is produced using a solution (dope) obtained by dissolving cellulose acylate in an organic solvent. The organic solvent preferably contains a solvent selected from ether having the number of carbon atoms of 3 to 12, ketone having the number of carbon atoms of 3 to 12, ester having the number of carbon atoms of 3 to 12, and halogenated hydrocarbon having the number of carbon atoms of 1 to 6. The ether, ketone and ester may have a cyclic structure. Any compounds having two or more functional groups of ether, ketone and ester (i.e., —O—, —CO— and —COO—) are also available as the organic solvent. The organic solvent may have other functional group such as alcoholic hydroxyl group. The organic solvent having two or more functional groups is acceptable if the number of carbon atoms thereof falls within range specified for a compound having any of these functional groups.

Examples of the ether having the number of carbon atoms of 3 to 12 include diisopropyl ether, dimethoxy methane, dimethoxy ethane, 1,4-dioxane, 1,3-dioxolane, tetrahydrofuran, anisole and phenetole. Examples of the ketone having the number of carbon atoms of 3 to 12 include acetone, methyl ethyl ketone, diethyl ketone, diisobutyl ketone, cyclohexanone and methyl cyclohexanone. Examples of the ester having the number of carbon atoms of 3 to 12 include ethyl formate, propyl formate, pentyl formate, methyl acetate, ethyl acetate and pentyl acetate. Examples of the organic solvent having two or more functional groups include 2-ethoxyethyl acetate, 2-methoxy ethanol and 2-butoxy ethanol. The number of carbon atoms of the halogenated hydrocarbon is preferably 1 or 2, and most preferably 1. Halogen in the halogenated hydrocarbon is preferably chlorine. Ratio of substitution of hydrogen atoms with halogen in the halogenated hydrocarbon is preferably 25 to 75 mol %, more preferably 30 to 70 mol %, still more preferably 35 to 65 mol %, and most preferably 40 to 60 mol %. Methylene chloride is a representative halogenated hydrocarbon. It is also allowable to mix two or more species of the organic solvents.

A cellulose acylate solution can be prepared by a general method. The general method means a treatment at a temperature of 0° C. or above (normal temperature or high temperature). The solvent can be prepared using a method and an apparatus of preparing a dope in the general solvent cast process. In the general method, it is preferable to use halogenated hydrocarbon (in particular, methylene chloride) as the organic solvent.

Amount of cellulose acylate is adjusted so that it is contained in an amount of 10 to 40 weight % in the obtained solution. It is further preferable to adjust the amount of cellulose acylate to 10 to 30 weight %. The organic solvent (main solvent) may preliminarily be added with any arbitrary additives described later. The solution can be prepared by stirring cellulose acylate and the organic solvent at normal temperature (0 to 40° C.). The solvent of a higher concentration may be stirred under pressurized and heated conditions. More specifically, cellulose acylate and the organic solvent are placed in a pressure vessel, tightly closed, and stirred under pressure while heating the mixture at a temperature not lower than the boiling point of the solvent at normal pressure, but so as not to allow the solvent to boil. The heating temperature is generally 40° C. or above, more preferably 60 to 200° C., and still more preferably 80 to 110° C.

The individual components may otherwise be placed in the vessel after being preliminarily and roughly mixed, or may serially be placed into the vessel. The vessel must be configured so as to allow stirring. The vessel can be pressurized by injecting an inert gas such as nitrogen gas. It is also allowable to make use of rise in the vapor pressure of the solvent under heating. It is still also allowable to tightly close the vessel, and then to add the individual components under pressure. The heating is preferably effected outside of the vessel. It is allowable to use a jacket-type heating device. It is also allowable to dispose a plate heater outside the vessel, and to heat the entire portion of the vessel by allowing a fluid to flow through a piping provided thereto. It is preferable to provide a stirring propeller inside the vessel, and to use it for the stirring. The stirring propeller preferably has a length which is long enough to reach the wall of the vessel. It is preferable to attach a scraping blade at the end of the stirring propeller, for the convenience of refreshing the liquid film on the vessel wall. It is also allowable to equip the vessel with measuring instruments such as a pressure gauge, a thermometer, and so forth. The individual components are dissolved into the solvent within the vessel. The prepared dope is taken out from the vessel after cooled, or first taken out and then cooled using a heat-exchanger or the like.

It is also allowable to prepare the solution by the cooled solubilization process. The cooled solubilization process makes it possible to solubilize cellulose acylate into an organic solvent which is hard to solubilize it with the aid of the general solubilization process. The cooled solubilization process is also advantageous in rapidly obtaining a homogeneous solution even if a solvent is capable of dissolving cellulose acylate with the aid of the general solubilization process. In the cooled solubilization process, first cellulose acylate is gradually added into the organic solvent under stirring at room temperature. Amount of cellulose acylate is preferably adjusted so that the resultant mixture will contain it in an amount of 10 to 40 weight %. The amount of cellulose acylate is more preferably 10 to 30 weight %. The mixture may preliminarily be added with any arbitrary additives described later.

Next, the mixture is cooled to −100 to −10° C. (more preferably −80 to −10° C., still more preferably −50 to −20° C., and most preferably −50 to −30° C.). The cooling can be effected typically in a diethyleneglycol solution (−30 to −20° C.) cooled on a dry ice/methanol bath (−75° C.). The cooling allows the mixture of cellulose acylate and organic solvent to solidify.

Rate of cooling is preferably 4° C./minute or above, more preferably 8° C./minute or above, and most preferably 12° C./minute or above. The faster the better, wherein a theoretical upper limit of the rate of cooling is 10,000° C./second, a technical upper limit thereof is 1,000° C./second, and a practical upper limit is 100° C./second. It is to be understood herein that the rate of cooling refers to a value obtained by dividing a difference between a start temperature before the cooling and a final temperature after the cooling, with a time required from the start of cooling to the end of cooling where the final cooling temperature is attained.

Next, heating of the mixture to 0 to 200° C. (more preferably 0 to 150° C., still more preferably 0 to 120° C., and most preferably 0 to 50° C.) allows cellulose acylate to dissolve into the organic solvent. The temperature rise may be attained simply by allowing the mixture to stand in room temperature, or by heating on a hot bath.

Rate of heating is preferably 4° C./minute or above, more preferably 8° C./minute or above, and most preferably 12° C./minute or above. The faster the better, wherein a theoretical upper limit of the rate of heating is 10,000° C./second, a technical upper limit thereof is 1,000° C./second, and a practical upper limit is 100° C./second. It is to be understood herein that the rate of heating refers to a value obtained by dividing a difference between a start temperature before the heating and a final temperature after the heating, with a time required from the start of heating to the end of heating where the final heating temperature is attained.

The homogeneous solution can thus be obtained. Any insufficient solubilization may resolved by repetitive cooling and heating. Whether the solubilization is sufficient or not can be judged simply by visual observation of an appearance of the solution.

In the cooled solubilization process, it is preferable to use an air-tight vessel in order to prevent water from み entering, which is possibly caused by dewing during the cooling. In the cooling and heating operations, pressurization during the cooling and reduction in the pressure during the heating are successful in reducing the solubilization time. Use of a pressure vessel is preferable in view of carrying out the pressurization and pressure reduction.

Differential scanning calorimetry (DSC) of a 20 weight % solution of cellulose acylate (degree of acetylation: 60.9%, viscosity mean degree of polymerization: 299) dissolved into methyl acetate reveals that the solution shows a pseudo phase transition point between the sol state and gel state at around 33° C., wherein the solution can exist in a gel form below this temperature. It is therefore necessary to store the solution at a temperature not lower than the pseudo phase transition temperature, and more preferably at a temperature higher by 10° C. or around than the pseudo phase transition temperature. It is to be noted herein that the pseudo phase transition temperature will differ by degree of acetylation and viscosity mean degree of polymerization of cellulose acylate, concentration of the solution, and organic solvent used herein.

The cellulose acylate film is produced using thus-prepared cellulose acylate solution (dope) by the solvent cast process. The dope is cast and spread on a drum or a band, and the solvent is allowed to vaporize so as to form a film. Concentration of the dope before the casting is preferably adjusted so as to have a solid content of 18 to 35%. The surface of the drum or band is preferably mirror-finished. Methods of the casting and drying for the solvent cast process are described in the individual patent specifications of U.S. Pat. Nos. 2,336,310, 2,367,603, 2,492,078, 2,492,977, 2,492,978, 2,607,704, 2,739,069, 2,739,070, British Patent No. 640731 and ditto No. 736892, and in the individual published patent specifications of Japanese Examined Patent Publication "Tokkosho" No. 45-4554 and ditto No. 49-5614, Japanese Laid-Open Patent Publication "Tokkaisho" No. 60-176834, ditto No. 60-203430 and ditto No. 62-115035.

The dope is preferably cast and spread on the drum or band conditioned to have a surface temperature of 10° C. or below. It is preferable to dry the cast dope under an air blow for 2 seconds or longer. It is also allowable to separate the obtained film from the drum or band, and to vaporize the residual solvent by blowing a hot air at temperatures sequentially varied from 100 to 160° C. This method is described in Examined Japanese Patent Publication "Tokkohei" No. 5-17844. This method makes it possible to shorten the time required from the casting to the separation. In order to make effect of this method, it is necessary for the dope to gellate at the surface temperature of the drum or band during the casting and spreading.

The cellulose acylate film may be added with a plasticizer in order to improve the mechanical characteristics or rate of drying. Phosphoric acid ester or carboxilic acid ester is used as the plasticizer. Examples of the phosphoric acid ester include triphenyl phosphate (TPP) and tricresyl phosphate (TCP). As the carboxilic acid ester, phthalic ester and citric acid ester are representative. Examples of the phthalic acid ester include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric acid ester include triethyl O-acetyl citrate (OACTE) and tributyl O-acetyl citrate (OACTB). Other examples of the carboxilic acid ester include butyl oleate, methylacetyl ricinoleate, dibutyl sebacate, and various trimellitic acid esters. Preferably used are phthalic acid ester-base plasticizers (DMP, DEP, DBP, DOP, DPP, DEHP). DEP and DPP are particularly preferable.

Amount of addition of the plasticizer is preferably adjusted to 0.1 to 25 weight % of amount of cellulose ester, more preferably 1 to 20 weight %, and most preferably 3 to 15 weight %.

The cellulose acylate film may be added with an anti-degradation agent (e.g., antioxidant, peroxide decomposing agent, radical inhibitor, metal inactivator, acid capture agent, amine). The anti-degradation agent is described in Japanese Laid-Open Patent Publication "Tokkaihei" No. 3-199201, ditto. ditto No. 5-1907073, ditto No. 5-194789, and ditto No. 5-271471, ditto No. 6-107854. Amount of addition of the anti-degradation agent is preferably adjusted to 0.01 to 1 weight % of the prepared solution (dope), and more preferably 0.01 to 0.2 weight %, in view of allowing the effect of addition to exhibit, and of suppressing the bleeding-out of the anti-degradation agent coming up to the film surface. Particularly preferable examples of the anti-degradation agent include butylated hydroxytoluene (BHT) and tribenzylamine (TBA).

《Stretching of Cellulose Acylate Film》

Retardation of the cellulose acylate film can be adjusted by stretching. Stretching ratio is preferably 3 to 100%.

There is no special limitation on the method of stretching, and any known methods are applicable. Tenter stretching is particularly preferable in view of in-plane uniformity. The cellulose acylate film used in the present invention preferably has a width of at least 100 cm, and a variation in the Re value over the width of ±5 nm, and more preferably ±3 nm. Variation in the Rth value is preferably ±10 nm, and more preferably ±5 nm. Also variations in the Re value and Rth value in the longitudinal direction preferably fall within the ranges same as those for the width-wise variations.

The stretching may be carried out during the film formation process, or the wound-up film after the formation may be stretched. In the former case, the film may be stretched as containing a certain amount of residual solvent, wherein the film is preferably stretched under an amount of residual solvent of 2 to 30%. In this case, it is preferable to transfer the film in the longitudinal direction thereof and to concomitantly stretch it in the direction normal to the longitudinal direction, to thereby align the slow axis of the film in the direction normal to the longitudinal direction thereof.

Stretching temperature can appropriately be selected depending on the amount of residual solvent during the stretching and the thickness. The film stretched as containing the residual solvent is preferably dried after the stretching. Methods of drying may be similar to those adopted in the production of the film described in the above.

Thickness of the stretched cellulose acylate film is preferably 110 μm or less, more preferably 40 to 110 μm, still more preferably 60 to 110 μm, and most preferably 80 to 110 μm.

《Surface Treatment of Cellulose Acylate Film》

For the case where an optical compensation film composed of the cellulose acylate film is used as a transparent protective film of the polarizing plate, the cellulose acylate film is preferably surface-treated. The surface treatment may be corona discharge treatment, glow discharge treatment, flame treatment, acid treatment, alkali treatment or ultraviolet irradiation treatment. It is particularly preferable to carry out the acid treatment or alkali treatment, which is a saponification treatment for cellulose acylate.

As described above, the cellulose acylate film, stretched as containing the rod-like compound having at least two aromatic rings and a linear structure, and having a thickness of 40 μm to 110 μm and the optical properties required for an optical compensation film in the present invention, can be used as an optical compensation film.

Figure 9:
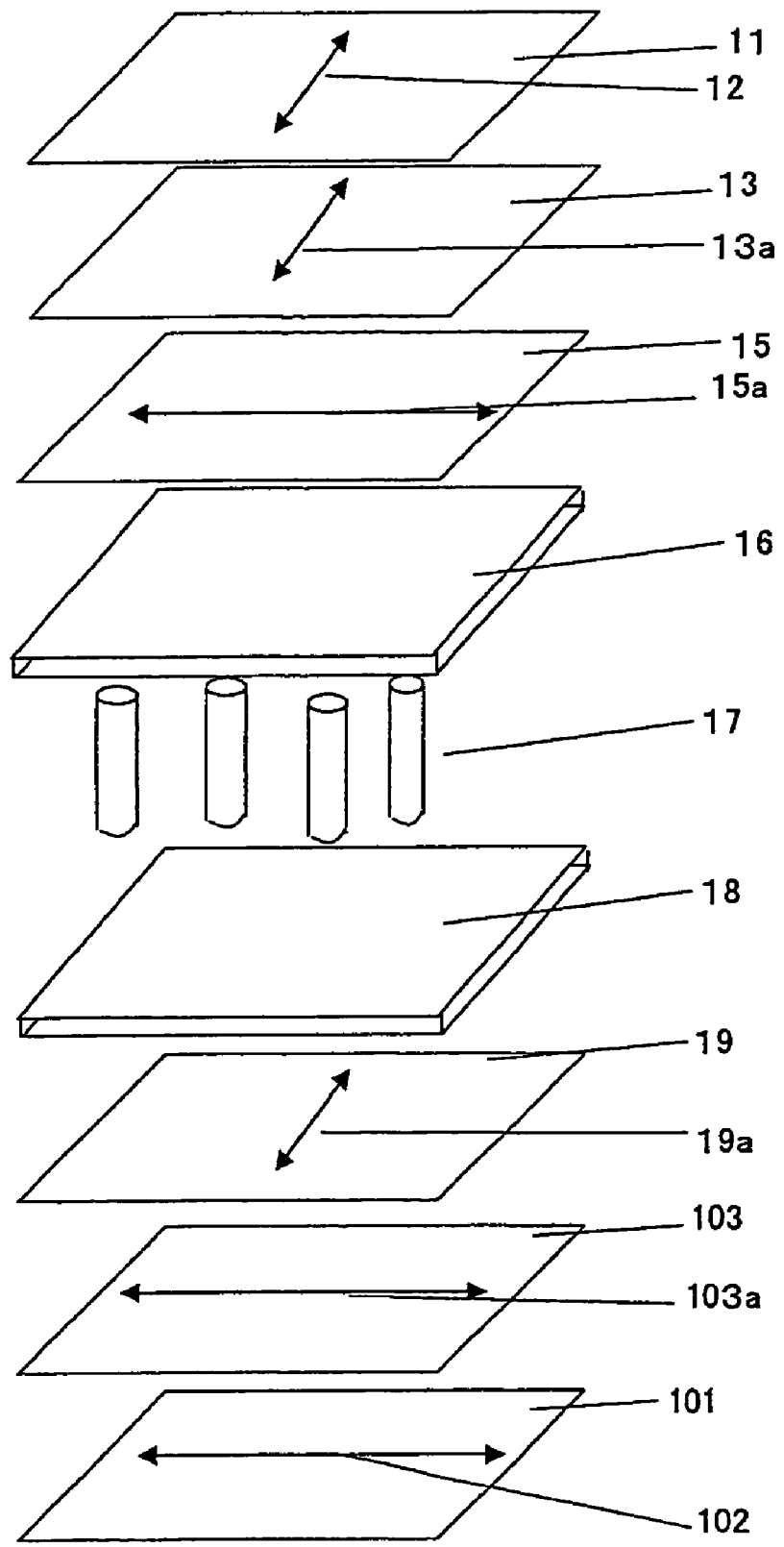
FIG. 9 is a schematic drawing of an exemplary configuration of the liquid crystal display device of the present invention.

Next paragraphs will describe embodiments of the VA-mode liquid crystal display device applied with the present invention, referring to FIG. 9.

[Liquid Crystal Display Device]

A liquid crystal display device shown in FIG. 9 comprises an upper polarizing film 11 and a lower polarizing film 101 disposed so as to hold a liquid crystal cell (16 to 18) in between, wherein an optical compensation film 15 is disposed between the upper polarizing film 11 and the liquid crystal cell (16 to 18), and an optical compensation film 19 is disposed between the upper polarizing film 101 and the liquid crystal cell (16 to 18). As described in the above, only either one of the optical compensation film 15 and the optical compensation film 19 may be used depending on the configuration. Each of the polarizing films 11 and 101 is protected by a pair of transparent films, of these FIG. 9 shows only transparent protective films 13 and 103 disposed on the sides closer to the liquid crystal cell, while omitting illustration of the transparent protective films disposed more distant from the liquid crystal cell. It is also allowable that only a single film has functions of both of the optical compensation film 15 and the transparent protective film 13. Similarly, it is also allowable that only a single film has functions of both of the optical compensation film 19 and the transparent protective film 103.

The liquid crystal cell comprises an upper substrate 16 and a lower substrate 18, and a liquid crystal layer held therebetween, comprising liquid crystal molecules 17. Each of the substrates 16 and 18 has an orientation film (not shown) formed on the surface thereof facing to the liquid crystal molecules 17 (occasionally referred to as "inner surface", hereinafter), thereby the liquid crystal molecules 17 are controlled to orient vertically under no applied voltage or under a low applied voltage. Each of the inner surfaces of the substrates 16 and 18 has, formed thereon, a transparent electrode (not shown) capable of applying voltage therethrough to the liquid crystal layer composed of the liquid crystal molecules 17. In the present invention, product of Δn·d of thickness d (μm) and refractive index anisotropy Δn of the liquid crystal layer is preferably adjusted to 0.1 to 1.0 μm. Optimum value of Δn·d is adjusted more preferably to 0.2 to 1.0 μm, and still more preferably to 0.2 to 0.5 μm. These ranges ensure a high luminance in the while-level display and a low luminance in a black state, and can provide a bright and high-contrast display device. There are no special limitations on the liquid crystal material to be employed, wherein any liquid crystal material having a negative dielectric anisotropy, causing response of the liquid crystal molecules 17 normal to the applied electric field, is used for embodiments in which electric field is applied between the upper and lower substrates 16, 18. It is also allowable to use a liquid crystal material having a positive dielectric anisotropy for the case where the electrode is formed on only either one of the substrates 16 and 18, and the electric field is applied in parallel with the substrate surface.

In an exemplary case where the liquid crystal cell is configured as a VA-mode liquid crystal cell, it is allowable to use, for example, a nematic liquid crystal material having a negative dielectric anisotropy, $\Delta\varepsilon=-4.6$ or around and $\Delta n=0.0813$ or around, between the upper and lower substrates 16 and 18. Thickness d of the liquid crystal layer is not specifically limited, but can be set to 3.5 μm or around for the case where the liquid crystal having properties of the above-described range is employed. Brightness of a white state varies depending on a value of product Δn-d of the thickness d and refractive index anisotropy Δn in a white state, so that in view of obtaining a maximum brightness, it is preferable to set Δn-d within a range from 0.2 to 0.5 μm.

It is not so often for VA-mode liquid crystal display devices to be added with a chiral material, which is generally used for TN-mode liquid crystal display devices, because it degrades the dynamic response characteristics, but may sometimes be added for the purpose of reducing orientation failure. Adoption of a multi-domain structure is advantageous in adjusting the orientation of the liquid crystal molecules at boundary regions of every adjacent domains. The multi-domain structure refers to a structure in which a single pixel of the liquid crystal display device is divided into a plurality of domains. For example, the VA mode cell has inclined liquid crystal molecules 17 in a white state, and this is causative of non-uniformity in the luminance and color tone when the display is observed in an inclined direction and its symmetric direction, due to difference in birefringence of the liquid crystal molecules 17 observed in the inclined directions, whereas adoption of the multi-domain structure is preferable in view of improving the viewing angle dependence of luminance and color tone. More specifically, averaging through configuration of each pixel with two or more (preferably 4 or 8)

domains, differing from each other in the initial orientation state of the liquid crystal molecules, makes it possible to reduce viewing-angle-dependent, non-uniformity in the luminance and color tone. Similar effect can be obtained also by configuring each pixel using two or more domains differing from each other, in which direction of orientation of the liquid crystal molecules can continuously vary under voltage application.

A plurality of domains differing in the direction of orientation of the liquid crystal molecules 7 within a single pixel can be formed typically by a method of providing slits or projections to the electrodes, so as to alter the direction of electric field or to produce non-uniformity in the electric field. It will be successful to increase the number of division in order to equalize the viewing angle in all directions, wherein quadrisection or octasection or more will be enough to obtain nearly equalized viewing angles. In particular, octasection is preferable because the absorption axis of the polarizing plate can be set to an arbitrary angle. The liquid crystal molecules 7 tend to be less responsive at the boundary regions of every adjacent domains. This raises a problem in lowering in the luminance in the normally-black mode such as the VA-mode in which a black state is maintained. It is therefore possible to add a chiral agent to the liquid crystal material so as to shrink the boundary regions between every adjacent domains. On the other hand, the normally-white mode causes lowering in the contrast in the front view because a white state is maintained. It is therefore preferable to provide a light interception layer covering the regions, such as a black matrix.

It is preferable that the slow axes 13 and 103 of the protective films of the polarizing film 11 and the polarizing film 101, placed on the side closer to the liquid crystal layer, are substantially in parallel with, or orthogonal to each other. The orthogonal arrangement of the slow axes 13a, 103a of the transparent protective films 13, 103 makes it possible to reduce degradation of optical characteristics of light normally incident on the liquid crystal display device, because birefringent properties of both optical films are canceled. The parallel arrangement of the slow axes 13a, 103a makes it possible to compensate any residual retardation of the liquid crystal layer, using the birefringent properties of these protective films.

Directions of the absorption axes 12, 102 of the polarizing films 11, 101, directions of the slow axes 13a, 103a of the protective films 13, 103, and direction of orientation of the liquid crystal molecules 17 can be adjusted within optimum ranges depending on materials used for composing the individual components, display mode and stacked structure of the components. That is, the absorption axis 12 of the polarizing film 11 and the absorption axis 102 of the polarizing film 101 are substantially perpendicular to each other. The liquid crystal display device of the present invention is, however, not limited to this configuration.

The optical compensation films 15 and 19 disposed between each of the polarizing films 11, 101 and the liquid crystal cell are optical compensation films, and as described in the above, typically composed of a birefringent polymer film, or of a stack of a transparent support and an optically anisotropic layer, comprising liquid crystal molecules, formed on the support. It is preferable that the in-plane slow axis 15a of the optical compensation film 15 is substantially perpendicular to the absorption axis 12 of the polarizing film 11 placed more closer thereto. Similarly, it is preferable that the in-plane slow axis 19a of the optical compensation film 19 is substantially perpendicular to the absorption axis 102 of the polarizing film 101 placed more closer thereto. In the arrangement conforming to these relations, the optical compensation films 15, 19 cause retardation with respect to a normal incident light, without causing light leakage, and make it possible to fully exhibit the effects of the present invention with respect to an oblique incident light.

For the case where both of Re and Rth values of the protective film 13 or 15 of the polarizing plate are not 0 nm, the protective film may have an optical compensation ability. In this case, it is also possible to make up for Re and Rth of the optical compensation film.

In a non-operating state under no drive voltage applied to the individual transparent electrodes (not shown) of the liquid crystal cell substrates 16, 18, the liquid crystal molecules 17 in the liquid crystal layer are aligned almost vertically against the surfaces of the substrates 16, 18, so that polarization state of light passing therethrough hardly changes. Because the absorption axes 12 and 102 are orthogonal to each other, the light coming from the lower side (e.g., on the back electrode side) is polarized by the polarizing film 101, passes through the liquid crystal cell 16 to 18, while maintaining the polarization state, and is blocked by the polarizing film 11. That is, the liquid crystal display device shown in FIG. 9 can be in a black state with no or low voltage applied. In contrast, with a drive voltage applied to the transparent electrodes (not shown), the liquid crystal molecules 17 are tilted to the surfaces of the substrates 16, 18, so that light passing therethrough is changed in the polarization state thereof by thus-tilted liquid crystal molecules 17. The light coming from the lower side (e.g., from the back electrode side) is therefore polarized by the polarizing film 101, further altered in the polarization state thereof after being passed through the liquid crystal cell 16 to 18, and is allowed to pass through the polarizing film 11. That is, a white state is obtained with a voltage applied.

An advantage of the VA-mode resides in high contrast. The conventional VA-mode liquid crystal display device has, however, been suffering from a problem of low contrast in the oblique view, despite high contrast in the front view. The liquid crystal molecules 17 in a black state are aligned vertically against the surfaces of the substrates 16, 18, so that liquid crystal molecules 17 show almost no birefringence in the front view and gives a low transmittance, ensuring a high contrast. The liquid crystal molecules 17, however, show birefringence in the oblique view. In addition, the cross angle between the absorption axes 12, 102 of the upper and lower polarizing films 11, 101, which seems to be orthogonal at 90° in the front view, grows beyond 90° in the oblique view. Due to two these factors, the conventional display device has a problem of causing leakage light in oblique directions and lowered contrast. In contrast, the liquid crystal display device of the present invention configured as shown in FIG. 9 uses the optical compensation films 15, 19 having optical characteristics which satisfy specific conditions in relation with the optical characteristics of the liquid crystal layer 7, and thereby successfully reduces the light leakage in oblique directions in a black state, and improves the contrast.

The liquid crystal display device of the present invention is not limited to those having the configuration shown in FIG. 8, and may comprise other components. For example, a color filter may be disposed between the liquid crystal cell and the polarizing film. When the device is used as a transmissive device, it is also allowable to dispose, on the back side thereof, a back light using a cold-cathode or hot-cathode fluorescent tube, light emitting diode, field emission device, or electroluminescence device.

The liquid crystal display device of the present invention include those of direct image viewing type, image projection type and light modulation type. A particularly effective embodiment of the present invention is such that three-terminal or two-terminal semiconductor device such as TFT or MIM is applied to an active-matrix liquid crystal display device. Of course, also effective is an embodiment in which the device of the present invention is applied to a passive-matrix liquid crystal display device represented by STN type device based on time-sharing operation.

Next paragraphs will further detail optical characteristics, source materials, production methods and so forth of other various components used for the liquid crystal display device of the present invention.

[Polarizing Plate]

In the present invension, it is allowable to use a polarizing plate which comprises a polarizing film and a pair of protective films holding the polarizing film in between. For example, it is allowable to use the polarizing plate obtained by dying the polarizing film, typically made of a polyvinyl alcohol film or the like, with iodine, stretching the film, and being stacked with the protective films on both surfaces thereof. The polarizing plate is disposed external of the liquid crystal cell. It is preferable to dispose a pair of polarizing plates, respectively comprising a polarizing film and a pair of protective films holding the polarizing film in between, so as to hold the liquid crystal cell in between.

《Protective Film》

The polarizing plate applicable to the present invention is such as having a pair of protective films stacked on both surfaces of the polarizing film. There are no specific limitations on species of the protective film, wherein applicable examples of which include cellulose esters such as cellulose acetate, cellulose acetate butylate and cellulose propionate; polycarbonate; polyolefin, polystyrene and polyester. As described in the above, it is also allowable to use a polymer film satisfying the optical characteristics required for the optical compensation film, so as to allow it to function as both of the optical compensation film and the protective film.

The protective film is generally supplied in a roll form, so that it is preferable to continuously bond it to a long polarizing film while keeping agreement between the longitudinal directions of the both. The orientation axis (slow axis) of the protective films may be aligned to any directions, wherein it is preferably aligned in parallel with the longitudinal direction for the convenience of operation.

The protective films holding the polarizing film in between may be configured also by using those having the slow axes substantially agree with the direction maximizing in-plane mean refractive index. More specifically, at least one of the protective films may be a film having three mean refractive indices nx, ny and nz respectively in directions of the x-, y- and z-axes orthogonal to each other, nx and ny being in-plane mean refractive indices, and nz being thickness-wise mean refractive index, satisfying relations of nx, ny=nz, nx>ny; or may be a film satisfying relations of nx=ny, nz, nx>nz. For the case where the protective film is given with an optical compensation function as described in the above, it is preferable that a ratio Re/Rth(450 nm) of Re and Rth at 450 nm is 0.4 to 0.95 times as large as Re/Rth(550 nm) at 550 nm, and that Re/Rth(650 nm) at 650 nm is 1.05 to 1.9 times as large as Re/Rth(550 nm), and thickness-wise retardation Rth at 550 nm ranges from 70 nm to 400 nm.

On the other hand, retardation of the transparent protective film is preferably small in an embodiment not allowing the protective film to function as an optical compensation film. In an embodiment wherein the transmission axis of the polarizing film and the orientation axis of the transparent protective film are not in parallel, it is generally believed that a retardation value of the transparent protective film larger than a predetermined value undesirably converts linear polarization into elliptic polarization due to oblique misalignment of the axis of polarization and the orientation axis (slow axis) of the transparent protective film. It is therefore preferable that retardation of the transparent protective film at 632.8 nm is typically 10 nm or less, and more preferably 5 nm or less. Polymer films having small retardation preferably applicable herein include polyolefins such as cellulose triacetate, Zeonex, Zeonor (both from Zeon Corporation) and ARTON (from JSR Corporation). Other preferable examples include non-birefringent optical resin materials as described, for example, in Japanese Laid-Open Patent Publication "Tokkaihei" No. 8-110402 or ditto No. 11-293116. For the case where a stack, comprising a support and an optically anisotropic layer composed of a liquid-crystalline compound formed on the support, is used as the optical compensation layer in this embodiment, the protective film may also function as the support of the optically anisotropic layer.

The protective film is preferably bonded to the polarizing film so that the slow axis (orientation axis) of at least one of the protective films (the one disposed closer to the liquid crystal cell when incorporated into the liquid crystal display device) crosses the absorption axis (axis of stretching) of the polarizing film. More specifically, angle between the absorption axis of the polarizing film and the slow axis of the protective film preferably falls in a range from 10° to 90°, more preferably from 20° to 70°, still more preferably from 40° to 50°, and particularly preferably from 43° to 47°. There is no special limitation on angle between the slow axis of the other protective film and the absorption axis of the polarizing film, and can appropriately be set depending on purpose of the polarizing plate, wherein it is preferable to satisfy the above-described ranges, and it is also preferable that the slow axes of the pair of the protective films coincide with each other.

Parallel arrangement of the slow axis of the protective film and the absorption axis of the polarizing film is advantageous in improving mechanical stability of the polarizing plate, such as prevention of dimensional changes and curling. The same effect can be obtained if at least two axes of three films of the polarizing film and a pair of protective films, that is, the slow axis of one protective film and the absorption axis of the polarizing film, or the slow axes of two protective films, are substantially in parallel with each other.

《Adhesive》

There is no special limitation on an adhesive used between the polarizing film and the protective films, wherein preferable examples thereof include PVA-base resins (including modified PVA modified by acetoacetyl group, sulfonic acid group, carboxyl group, oxyalkylene group and so forth) and aqueous boron compound solution, and among others, PVA-base resins are preferable. Dry film thickness of the adhesive is preferably 0.01 to 10 μm, and particularly preferably 0.05 to 5 μm.

《Consecutive Production Process of Polarizing Film and Transparent Protective Film》

The polarizing film applicable to the present invention is produced by stretching a film for producing the polarizing film and by allowing it to shrink so as to reduce volatile content, wherein it is preferable to be bonded with a transparent protective film at least on one surface thereof after or during the drying, and to subject the stack to post-heating. In an embodiment in which the transparent protective film also serves as the support of the optically anisotropic layer functioning as the optical compensation film, the post-heating is preferably carried out after the transparent protective film is bonded on one surface the polarizing film, and a transparent support having the optically anisotropic layer formed thereon is bonded on the opposite surface. Specific methods of bonding include a method of bonding the transparent protective film to the polarizing film using an adhesive during the drying process of the film, while being held at both edges thereof which are slit off after the drying; and a method of drying the film for producing the polarizing film, releasing the film from the edge holder after the drying, slitting both edges of the film off, and bonding the transparent protective film. Methods of slitting may be those generally applied, and include method of using a cutting edge, and laser-assisted cutting. After the bonding, the product is preferably heated in order to dry the adhesive and improve the polarizing properties. Condition of heating may vary depending on the adhesive, wherein a water-base adhesive prefers a temperature of 30° C. or above, 40° C. to 100° C. is more better, and 50° C. to 90° C. is still more better. These process steps are more preferably carried out in a consecutive line in view of product performance and production efficiency.

《 Performance of Polarizing Plate 》

Optical properties and durability (short-term and long-term storability) of the inventive polarizing plate comprising the transparent protective film, polarizer and transparent support are preferably equivalent to, or superior to performances of commercially-available super high contrast products (e.g., HLC2-5618 from Sanritz Corporation). More specifically, the polarizing plate preferably has a visible light transmittance of 42.5% or more, a degree of polarization of $\{(Tp-Tc)/(Tp+Tc)\}^{1/2} \geq 0.9995$ (where, Tp is parallel transmittance and Tc is orthogonal transmittance), a rate of change in the transmittance of light before and after being allowed to stand at 60° C., 90% RH for 500 hours and at 80° C. in a dry atmosphere for 500 hours of 3% or less, more preferably 1% or less on the absolute value basis, and a rate of change in the degree of polarization of 1% or less, more preferably 0.1% or less on the absolute value basis.

EXAMPLES

The following paragraphs will further specifically describe the present invention referring to Examples. It is to be noted that materials, reagents, amount and ratio of use, operations and so forth shown in the Examples below may properly be modified without departing from the spirit of the present invention. The present invention is therefore not limited to the specific examples described below.

Example 1

A liquid crystal display device having a configuration similar to that shown in FIG. 9 was produced. More specifically, the liquid crystal display device was configured as having, as viewed from the observer's side (top), an upper polarizing plate (protective film (not shown), polarizing film 11, protective film 13), an optical compensation film 15 (also serves as the protective film 13), a liquid crystal cell (an upper substrate 16, a liquid crystal layer 17, a lower substrate 18), an optical compensation film 19 (also serves as a protective film 103), a lower polarizing plate (a polarizing film 101, a protective film (not shown)) stacked therein in this order, and as additionally having a back light source (not shown) disposed thereto, and the device was subjected to an optical simulation so as to confirm the effects. The optical calculation was carried out using LCD Master Ver. 6.08 from Shintech, Inc. The liquid crystal cell, electrodes, substrate, polarizing plates and so forth are those conventionally used for liquid crystal display devices. Values for a liquid crystal cell, electrodes, substrate, polarizing plates and so forth used herein were those having conventionally been used, without modification. A liquid crystal material used herein was such as having a negative dielectric anisotropy of $\Delta\varepsilon=-4.2$. The liquid crystal cell used herein was such as having a nearly-vertical orientation with a pre-tilt angle of 89.9°, a cell gap between the substrates of 3.6 μm, and retardation values of the liquid crystal layer (i.e, values of product $\Delta n$-d of thickness d (μm) of the liquid crystal layer and refractive index anisotropy $\Delta n$) of 318 nm at 450 nm, 300 nm at 550 nm, and 295 nm at 650 nm. Values of Re and Rth of the optical compensation films 15 and 19 at the individual wavelengths were set to those listed in Table 1. A light source used herein was a C light attached to LCD Master.

It is to be noted that the liquid crystal display device configured as shown in FIG. 9 can give completely same effects if the positional relation between the back light and the observer is inverted upside down.

As a Comparative Example, a liquid crystal display device was configured similarly to as described in the above, except for using the optical compensation films 15 and 19 having Re and Rth kept constant irrespective of wavelength, and the device was similarly subjected to the optical simulation. The Comparative Example can be considered as the prior art, because the conventional optical compensation technique does not take wavelength dispersion of Re and Rth of the optical compensation films into account.

<Measurement of Leakage Light from Liquid Crystal Display Device>

Calculated results of the leakage light based on the optical simulation using the above-described values are shown in Table 1. In Table 1, liquid crystal display device No. 1 corresponds to the above-described Comparative Example, and liquid crystal display device Nos. 2 to 6 correspond to the Examples.

TABLE 1

| | | | | | | | | |
|---|---|---|---|---|---|---|---|---|
| transmittance (%) in a black state at a viewing angle with azimuth angle = 45° and polar angle = 60° | | | | | | | | |
| | | | wavelength 450 nm | | | | | |
| Liquid crystal display | liquid crystal layer | | | optical compensation film B = −0.0567, D = 0.0939 | | | | |
| No. | $\Delta n d$ (nm) | $\Delta n d/\lambda$ | $Re_{450}$(nm) | $Rth_{450}$(nm) | $Re/\lambda$ | $Rth/\lambda$ | A | C |
| 1 | 318 | 0.707 | 52 | 128 | 0.116 | 0.284 | 0.483 | 0.0153 |
| 2 | 318 | 0.707 | 51 | 131 | 0.113 | 0.291 | 0.492 | 0.0137 |
| 3 | 318 | 0.707 | 39 | 135 | 0.087 | 0.300 | 0.505 | −0.005 |

TABLE 1-continued

| | transmittance (%) in a black state at a viewing angle with azimuth angle = 45° and polar angle = 60° | | | | | | | |
|---|---|---|---|---|---|---|---|---|
| 4 | 318 | 0.707 | 33 | 140 | 0.073 | 0.311 | 0.520 | −0.015 |
| 5 | 318 | 0.707 | 29 | 144 | 0.064 | 0.320 | 0.533 | −0.021 |
| 6 | 318 | 0.707 | 25 | 148 | 0.056 | 0.329 | 0.546 | −0.027 |

| | | | wavelength 550 nm | | | | | |
|---|---|---|---|---|---|---|---|---|
| Liquid crystal display | liquid crystal layer | | optical compensation film B = −0.0567, D = 0.0939 | | | | | |
| No. | Δnd (nm) | Δnd/λ | Re$_{550}$(nm) | Rth$_{550}$(nm) | Re/λ | Rth/λ | A | C |
| 1 | 300 | 0.545 | 52 | 128 | 0.095 | 0.233 | 0.531 | 0.0004 |
| 2 | 300 | 0.545 | 52 | 128 | 0.095 | 0.233 | 0.531 | 0.0004 |
| 3 | 300 | 0.545 | 52 | 128 | 0.095 | 0.233 | 0.531 | 0.0004 |
| 4 | 300 | 0.545 | 52 | 128 | 0.095 | 0.233 | 0.531 | 0.0004 |
| 5 | 300 | 0.545 | 52 | 128 | 0.095 | 0.233 | 0.531 | 0.0004 |
| 6 | 300 | 0.545 | 52 | 128 | 0.095 | 0.233 | 0.531 | 0.0004 |

| | | | wavelength 650 nm | | | | | |
|---|---|---|---|---|---|---|---|---|
| Liquid crystal display | liquid crystal layer | | optical compensation film B = −0.0567, D= 0.0939 | | | | | |
| No. | Δnd (nm) | Δnd/λ | Re$_{650}$(nm) | Rth$_{650}$(nm) | Re/λ | Rth/λ | A | C |
| 1 | 295 | 0.454 | 52 | 128 | 0.080 | 0.197 | 0.559 | −0.006 |
| 2 | 295 | 0.454 | 58 | 123 | 0.089 | 0.189 | 0.542 | −0.002 |
| 3 | 295 | 0.454 | 64 | 119 | 0.098 | 0.183 | 0.528 | 0.0021 |
| 4 | 295 | 0.454 | 70 | 115 | 0.108 | 0.177 | 0.515 | 0.0063 |
| 5 | 295 | 0.454 | 76 | 111 | 0.117 | 0.171 | 0.501 | 0.0104 |
| 6 | 295 | 0.454 | 84 | 107 | 0.129 | 0.165 | 0.488 | 0.016 |

| Liquid crystal display No. | transmittance (%) | color shift Δxy |
|---|---|---|
| 1 | 0.025 | 0.094 |
| 2 | 0.019 | 0.07 |
| 3 | 0.015 | 0.051 |
| 4 | 0.012 | 0.041 |
| 5 | 0.016 | 0.053 |
| 6 | 0.02 | 0.051 |

It is understandable from the results shown in Table 1, that all of the liquid crystal display device Nos. 2 to 6 of the present invention, comprising a liquid crystal layer with Δnd/λ=0.707 and the optical compensation film with Re/λ=0.056 to 0.113 and Rth/λ=0.291 to 0.329 at 450 nm, and comprising a liquid crystal layer with Δnd/λ=0.454 and the optical compensation film with Re/λ=0.089 to 0.129 and Rth/λ=0.165 to 0.189 at 650 nm, exhibited smaller transmittance in a black state at polar angle=60° as compared with the liquid crystal display device No. 1 corresponded to Comparative Example. It is also understandable from the results shown in Table 1, that a minimum transmittance was achieved under Re/λ=0.073 and Rth/λ=0.311 at 450 nm, Re/λ=0.095 and Rth/λ=0.233 at 550 nm, and Re/λ=0.108 and Rth/λ=0.177 at 650 nm.

From the results of the simulation shown in Table 1, it is also understandable that all of the liquid crystal display device Nos. 2 to 6 satisfying the relations (I) to (IV) exhibited smaller transmittance in a black state at polar angle=60 as compared with the liquid crystal display device No. 1 not satisfying the relations.

Example 2

Optical characteristics of the liquid crystal display devices were calculated using LCD Master, under the conditions similar to those in Example 1, except that the retardation values were altered to 371 nm at 450 nm, 350 nm at 550 nm and 344 nm at 650 nm. Re and Rth of the optical compensation films 15 and 19 are listed in Table 2.

As a Comparative Example, a liquid crystal display device was configured similarly to as described in the above, except for using the optical compensation films 15 and 19 having Re and Rth kept constant irrespective of wavelength, and the device was similarly subjected to the optical simulation. The Comparative Example can be considered as the prior art, because the conventional optical compensation technique does not take wavelength dispersion of Re and Rth of the optical compensation films into account.

<Measurement of Leakage Light from Liquid Crystal Display Device>

Calculated results of the leakage light based on the optical simulation using the above-described values are shown in Table 2. In Table 2, liquid crystal display device No. 7 corresponds to the above-described Comparative Example, and liquid crystal display device Nos. 8 to 12 correspond to the Examples.

TABLE 2 transmittance (%) in a black state at a viewing angle with
azimuth angle = 45° and polar angle = 60° wavelength 450 nm

| Liquid crystal display No. | liquid crystal layer | | optical compensation film B = −0.0567, D = 0.0939 | | | | | |
|---|---|---|---|---|---|---|---|---|
| | $\Delta$nd (nm) | $\Delta$nd/$\lambda$ | $Re_{450}$(nm) | $Rth_{450}$(nm) | Re/$\lambda$ | Rth/$\lambda$ | A | C |
| 7 | 371 | 0.824 | 45 | 154 | 0.100 | 0.342 | 0.484 | 0.005 |
| 8 | 371 | 0.824 | 40 | 160 | 0.089 | 0.355 | 0.499 | −0.004 |
| 9 | 371 | 0.824 | 35 | 165 | 0.078 | 0.367 | 0.514 | −0.013 |
| 10 | 371 | 0.824 | 30 | 171 | 0.067 | 0.380 | 0.530 | −0.022 |
| 11 | 371 | 0.824 | 25 | 177 | 0.056 | 0.393 | 0.545 | −0.032 |
| 12 | 371 | 0.824 | 20 | 182 | 0.044 | 0.405 | 0.560 | −0.041 | wavelength 550 nm

| Liquid crystal display No. | liquid crystal layer | | optical compensation film B = −0.0567, D = 0.0939 | | | | | |
|---|---|---|---|---|---|---|---|---|
| | $\Delta$nd (nm) | $\Delta$nd/$\lambda$ | $Re_{550}$(nm) | $Rth_{550}$(nm) | Re/$\lambda$ | Rth/$\lambda$ | A | C |
| 7 | 350 | 0.636 | 45 | 154 | 0.082 | 0.280 | 0.529 | −0.008 |
| 8 | 350 | 0.636 | 45 | 154 | 0.082 | 0.280 | 0.529 | −0.008 |
| 9 | 350 | 0.636 | 45 | 154 | 0.082 | 0.280 | 0.529 | −0.008 |
| 10 | 350 | 0.636 | 45 | 154 | 0.082 | 0.280 | 0.529 | −0.008 |
| 11 | 350 | 0.636 | 45 | 154 | 0.082 | 0.280 | 0.529 | −0.008 |
| 12 | 350 | 0.636 | 45 | 154 | 0.082 | 0.280 | 0.529 | −0.008 | wavelength 650 nm

| Liquid crystal display No. | liquid crystal layer | | optical compensation film B = −0.0567, D = 0.0939 | | | | | |
|---|---|---|---|---|---|---|---|---|
| | $\Delta$nd (nm) | $\Delta$nd/$\lambda$ | $Re_{650}$(nm) | $Rth_{650}$(nm) | Re/$\lambda$ | Rth/$\lambda$ | A | C |
| 7 | 344 | 0.529 | 45 | 154 | 0.069 | 0.237 | 0.555 | −0.013 |
| 8 | 344 | 0.529 | 51 | 151 | 0.078 | 0.233 | 0.547 | −0.008 |
| 9 | 344 | 0.529 | 57 | 149 | 0.088 | 0.229 | 0.539 | −0.003 |
| 10 | 344 | 0.529 | 63 | 146 | 0.097 | 0.225 | 0.531 | 0.0016 |
| 11 | 344 | 0.529 | 69 | 143 | 0.106 | 0.221 | 0.524 | 0.0065 |
| 12 | 344 | 0.529 | 75 | 141 | 0.115 | 0.216 | 0.516 | 0.0114 |

| Liquid crystal display No. | transmittance (%) | color shift $\Delta$xy |
|---|---|---|
| 7 | 0.03 | 0.1 |
| 8 | 0.023 | 0.08 |
| 9 | 0.017 | 0.062 |
| 10 | 0.012 | 0.045 |
| 11 | 0.018 | 0.064 |
| 12 | 0.022 | 0.077 |

It is understandable from the results shown in Table 2, that all of the liquid crystal display device Nos. 8 to 12 of the present invention, comprising a liquid crystal layer with $\Delta$nd/$\lambda$=0.824 and the optical compensation film with Re/$\lambda$=0.044 to 0.089 and Rth/$\lambda$=0.355 to 0.405 at 450 nm, and comprising a liquid crystal layer with $\Delta$nd/$\lambda$=0.529 and the optical compensation film with Re/$\lambda$=0.078 to 0.115 and Rth/$\lambda$=0.216 to 0.233 at 650 nm, exhibited smaller transmittance in a black state at polar angle=60° as compared with the liquid crystal display device No. 7 corresponded to Comparative Example. It is also understandable from the results shown in Table 2, that a minimum transmittance is achieved under Re/$\lambda$=0.067 and Rth/$\lambda$=0.38 at 450 nm, Re/$\lambda$=0.082 and Rth/$\lambda$=0.28 at 550 nm, and Re/$\lambda$=0.097 and Rth/$\lambda$=0.225 at 650 nm.

From the results of the simulation shown in Table 2, it is also understandable that all of the liquid crystal display device Nos. 8 to 12 satisfying the relations (I) to (IV) exhibited smaller transmittance in a black state at polar angle=60° as compared with the liquid crystal display device No. 7 not satisfying the relations.

Example 3

Optical characteristics of the liquid crystal display devices, configured similarly to as shown in FIG. 9, except that the optical film 15 was not used, were calculated using LCD Master. More specifically, disposed were, as viewed from the observer's side (top), an upper polarizing plate (protective film (not shown), polarizing film 11, protective film 13), a liquid crystal cell (upper substrate 16, liquid crystal layer 17, lower substrate 18), an optical compensation film 19 (also used as a protective film 103), and a lower polarizing plate (polarizing film 101, protective film (not shown)) in this order, and additionally disposed was a back light source (not shown). Re and Rth of the optical compensation film 19 are as listed in Table 3. The protective film 3 of the upper polarizing plate was adjusted to have Rth=38 nm and Re=0 nm. It is to be noted that Example 3, having the optical compensation film disposed on the back light side, can give completely same effects if the positional relation between the back light and the observer is inverted upside down. Other conditions are same as those in Example 1.

As a Comparative Example, a liquid crystal display device was configured similarly to as described in the above, except for using the optical compensation film 19 having Re and Rth kept constant irrespective of wavelength, and the device was similarly subjected to the optical simulation. The Comparative Example can be considered as the prior art, because the conventional optical compensation technique does not take wavelength dispersion of Re and Rth of the optical compensation film into account.

<Measurement of Leakage Light from Liquid Crystal Display Device>

Calculated results of the leakage light based on the optical simulation using the above-described values are shown in Table 3. In Table 3, liquid crystal display device No. 13 corresponds to the above-described Comparative Example, and liquid crystal display device Nos. 14 to 18 correspond to the Examples.

TABLE 3 transmittance (%) in a black state at viewing angle with azimuth angle = 45° and polar angle = 60° wavelength 450 nm

| Liquid crystal display No. | liquid crystal layer | | optical compensation film G = 0.032 | | | | | |
|---|---|---|---|---|---|---|---|---|
| | $\Delta nd$ (nm) | $\Delta nd/\lambda$ | $Re_{450}$(nm) | $Rth_{450}$(nm) | $Re/\lambda$ | $Rth/\lambda$ | E | F |
| 13 | 318 | 0.707 | 69 | 233 | 0.153 | 0.518 | 0.733 | 0.0857 |
| 14 | 318 | 0.707 | 60 | 239 | 0.133 | 0.531 | 0.752 | 0.0716 |
| 15 | 318 | 0.707 | 54 | 245 | 0.120 | 0.544 | 0.770 | 0.0622 |
| 16 | 318 | 0.707 | 48 | 243 | 0.107 | 0.540 | 0.764 | 0.0528 |
| 17 | 318 | 0.707 | 43 | 237 | 0.096 | 0.527 | 0.745 | 0.0449 |
| 18 | 318 | 0.707 | 37 | 231 | 0.082 | 0.513 | 0.726 | 0.0355 | wavelength 550 nm

| Liquid crystal display No. | liquid crystal layer | | optical compensation film G = 0.032 | | | | | |
|---|---|---|---|---|---|---|---|---|
| | $\Delta nd$ (nm) | $\Delta nd/\lambda$ | $Re_{550}$(nm) | $Rth_{550}$(nm) | $Re/\lambda$ | $Rth/\lambda$ | E | F |
| 13 | 300 | 0.545 | 69 | 233 | 0.125 | 0.424 | 0.777 | 0.051 |
| 14 | 300 | 0.545 | 69 | 233 | 0.125 | 0.424 | 0.777 | 0.051 |
| 15 | 300 | 0.545 | 69 | 233 | 0.125 | 0.424 | 0.777 | 0.051 |
| 16 | 300 | 0.545 | 69 | 233 | 0.125 | 0.424 | 0.777 | 0.051 |
| 17 | 300 | 0.545 | 69 | 233 | 0.125 | 0.424 | 0.777 | 0.051 |
| 18 | 300 | 0.545 | 69 | 233 | 0.125 | 0.424 | 0.777 | 0.051 | wavelength 650 nm

| Liquid crystal display No. | liquid crystal layer | | optical compensation film G = 0.032 | | | | | |
|---|---|---|---|---|---|---|---|---|
| | $\Delta nd$ (nm) | $\Delta nd/\lambda$ | $Re_{650}$(nm) | $Rth_{650}$(nm) | $Re/\lambda$ | $Rth/\lambda$ | E | F |
| 13 | 295 | 0.454 | 69 | 233 | 0.106 | 0.358 | 0.790 | 0.0337 |
| 14 | 295 | 0.454 | 80 | 232 | 0.123 | 0.357 | 0.786 | 0.0413 |
| 15 | 295 | 0.454 | 89 | 230 | 0.137 | 0.354 | 0.780 | 0.0476 |
| 16 | 295 | 0.454 | 95 | 228 | 0.146 | 0.351 | 0.773 | 0.0518 |
| 17 | 295 | 0.454 | 100 | 222 | 0.154 | 0.342 | 0.753 | 0.0553 |
| 18 | 295 | 0.454 | 106 | 216 | 0.163 | 0.332 | 0.732 | 0.0595 |

| Liquid crystal display No. | transmittance (%) | color shift $\Delta xy$ |
|---|---|---|
| 13 | 0.024 | 0.13 |
| 14 | 0.021 | 0.09 |
| 15 | 0.017 | 0.05 |
| 16 | 0.012 | 0.036 |
| 17 | 0.018 | 0.06 |
| 18 | 0.022 | 0.08 |

It is understandable from the results shown in Table 3, that all of the liquid crystal display device Nos. 14 to 18 of the present invention, comprising a liquid crystal layer with $\Delta nd/\lambda=0.707$ and the optical compensation film with $Re/\lambda=0.082$ to 0.133 and $Rth/\lambda=0.513$ to 0.531 at 450 nm, and comprising a liquid crystal layer with $\Delta nd/\lambda=0.454$ and the optical compensation film with $Re/\lambda=0.123$ to 0.163 and $Rth/\lambda=0.332$ to 0.357 at 650 nm, exhibited smaller transmittance in a black state at polar angle=60° as compared with the liquid crystal display device No. 13 corresponded to Comparative Example. It is also understandable from the results shown in Table 3, that a minimum transmittance is achieved under $Re/\lambda=0.107$ and $Rth/\lambda=0.54$ at 450 nm, $Re/\lambda=0.125$ and $Rth/\lambda=0.424$ at 550 nm, and $Re/\lambda=0.146$ and $Rth/\lambda=0.351$ at 650 nm.

From the results of the simulation shown in Table 3, it is also understandable that all of the liquid crystal display device Nos. 14 to 18 satisfying the relations (V) to (VIII) exhibited smaller transmittance in a black state at polar angle=60° as compared with the liquid crystal display device No. 13 not satisfying the relations.

Example 4

Optical characteristics of the liquid crystal display devices were calculated using LCD Master, under the conditions similar to those in Example 3, except that the retardation values were altered to 371 nm at 450 nm, 350 nm at 550 nm and 344 nm at 650 nm. Re and Rth of the optical compensation film 9 are listed in Table 4.

As a Comparative Example, a liquid crystal display device was configured similarly to as described in the above, except for using the optical compensation film 19 having Re and Rth kept constant irrespective of wavelength, and the device was similarly subjected to the optical simulation. The Comparative Example can be considered as the prior art, because the conventional optical compensation technique does not take wavelength dispersion of Re and Rth of the optical compensation film into account.

<Measurement of Leakage Light from Liquid Crystal Display Device>

Calculated results of the leakage light based on the optical simulation using the above-described values are shown in Table 4. In Table 4, liquid crystal display device No. 19 corresponds to the above-described Comparative Example, and liquid crystal display device Nos. 20 to 24 correspond to the Examples.

TABLE 4 transmittance (%) in a black state at viewing angle with azimuth angle = 45° and polar angle = 60°

| Liquid crystal display No. | liquid crystal layer | | optical compensation film G = 0.032 | | | | | |
|---|---|---|---|---|---|---|---|---|
| | $\Delta nd$ (nm) | $\Delta nd/\lambda$ | $Re_{450}$(nm) | $Rth_{450}$(nm) | $Re/\lambda$ | $Rth/\lambda$ | E | F | wavelength 450 nm

| No. | $\Delta nd$ (nm) | $\Delta nd/\lambda$ | $Re_{450}$(nm) | $Rth_{450}$(nm) | $Re/\lambda$ | $Rth/\lambda$ | E | F |
|---|---|---|---|---|---|---|---|---|
| 19 | 371 | 0.824 | 58 | 279 | 0.129 | 0.620 | 0.752 | 0.0799 |
| 20 | 371 | 0.824 | 52 | 285 | 0.115 | 0.634 | 0.769 | 0.0683 |
| 21 | 371 | 0.824 | 45 | 292 | 0.101 | 0.648 | 0.786 | 0.0567 |
| 22 | 371 | 0.824 | 39 | 298 | 0.087 | 0.662 | 0.803 | 0.0451 |
| 23 | 371 | 0.824 | 33 | 304 | 0.073 | 0.676 | 0.820 | 0.0335 |
| 24 | 371 | 0.824 | 26 | 311 | 0.059 | 0.690 | 0.837 | 0.0219 | wavelength 550 nm

| No. | $\Delta nd$ (nm) | $\Delta nd/\lambda$ | $Re_{550}$(nm) | $Rth_{550}$(nm) | $Re/\lambda$ | $Rth/\lambda$ | E | F |
|---|---|---|---|---|---|---|---|---|
| 19 | 350 | 0.636 | 58 | 279 | 0.105 | 0.507 | 0.797 | 0.0467 |
| 20 | 350 | 0.636 | 58 | 279 | 0.105 | 0.507 | 0.797 | 0.0467 |
| 21 | 350 | 0.636 | 58 | 279 | 0.105 | 0.507 | 0.797 | 0.0467 |
| 22 | 350 | 0.636 | 58 | 279 | 0.105 | 0.507 | 0.797 | 0.0467 |
| 23 | 350 | 0.636 | 58 | 279 | 0.105 | 0.507 | 0.797 | 0.0467 |
| 24 | 350 | 0.636 | 58 | 279 | 0.105 | 0.507 | 0.797 | 0.0467 | wavelength 650 nm

| No. | $\Delta nd$ (nm) | $\Delta nd/\lambda$ | $Re_{650}$(nm) | $Rth_{650}$(nm) | $Re/\lambda$ | $Rth/\lambda$ | E | F |
|---|---|---|---|---|---|---|---|---|
| 19 | 344 | 0.529 | 58 | 279 | 0.089 | 0.429 | 0.811 | 0.0303 |
| 20 | 344 | 0.529 | 65 | 277 | 0.099 | 0.427 | 0.806 | 0.0357 |
| 21 | 344 | 0.529 | 71 | 276 | 0.110 | 0.424 | 0.801 | 0.0412 |
| 22 | 344 | 0.529 | 78 | 274 | 0.120 | 0.422 | 0.796 | 0.0466 |
| 23 | 344 | 0.529 | 85 | 272 | 0.130 | 0.419 | 0.791 | 0.052 |
| 24 | 344 | 0.529 | 91 | 271 | 0.141 | 0.416 | 0.786 | 0.0575 |

TABLE 4-continued transmittance (%) in a black state at viewing angle with azimuth
angle = 45° and polar angle = 60°

| Liquid crystal display No. | transmittance (%) | color shift Δxy |
|---|---|---|
| 19 | 0.026 | 0.15 |
| 20 | 0.024 | 0.11 |
| 21 | 0.02 | 0.08 |
| 22 | 0.015 | 0.05 |
| 23 | 0.021 | 0.07 |
| 24 | 0.025 | 0.1 |

It is understandable from the results shown in Table 4, that all of the liquid crystal display device Nos. 20 to 24 of the present invention, comprising a liquid crystal layer with $\Delta nd/\lambda=0.824$ and the optical compensation film with $Re/\lambda=0.059$ to 0.115 and $Rth/\lambda=0.634$ to 0.69 at 450 nm, and comprising a liquid crystal layer with $\Delta nd/\lambda=0.529$ and the optical compensation film with $Re/\lambda=0.099$ to 0.141 and $Rth/\lambda=0.416$ to 0.427 at 650 nm, exhibited smaller transmittance in a black state at polar angle=60° as compared with the liquid crystal display device No. 19 corresponded to Comparative Example. It is also understandable from the results shown in Table 4, that a minimum transmittance is achieved under $Re/\lambda=0.087$ and $Rth/\lambda=0.662$ at 450 nm, $Re/\lambda=0.105$ and $Rth/\lambda=0.507$ at 550 nm, and $Re/\lambda=0.12$ and $Rth/\lambda=0.422$ at 650 nm.

From the results of the simulation shown in Table 4, it is also understandable that all of the liquid crystal display device Nos. 20 to 24 satisfying the relations (V) to (VIII) exhibited smaller transmittance in a black state at polar angle=60° as compared with the liquid crystal display device No. 19 not satisfying the relations.

Example 5

Optical characteristics of the liquid crystal display devices, configured similarly to as shown in FIG. 9, except that the optical film 15 was not used, were calculated using LCD Master. More specifically, disposed were, as viewed from the observer's side (top), the upper polarizing plate (protective film (not shown), polarizing film 11), the liquid crystal cell (upper substrate 16, liquid crystal layer 17, lower substrate 18), an optical compensation film 19 (also used as a protective film 103), and the lower polarizing plate (polarizing film 101, protective film (not shown)) in this order, and additionally disposed was a back light source (not shown). Re and Rth of the optical compensation film 19 are as listed in Table 5. Other components are same as those described in Example 1, wherein the protective film 3 of the upper polarizing plate is provided as a film having an extremely small retardation, with Rth and Re almost 0 nm.

As a Comparative Example, a liquid crystal display device was configured similarly to as described in the above, except for using the optical compensation film 19 having Re and Rth kept constant irrespective of wavelength, and the device was similarly subjected to the optical simulation. The Comparative Example can be considered as the prior art, because the conventional optical compensation technique does not take wavelength dispersion of Re and Rth of the optical compensation film into account.

<Measurement of Leakage Light from Liquid Crystal Display Device>

Calculated results of the leakage light based on the optical simulation using the above-described values are shown in Table 5. In Table 5, liquid crystal display device No. 25 corresponds to the above-described Comparative Example, and liquid crystal display device Nos. 26 to 30 correspond to the Examples.

TABLE 5 transmittance (%) in a black state at viewing angle with azimuth
angle = 45° and polar angle = 60°

| | | | wavelength 450 nm | | | | | |
|---|---|---|---|---|---|---|---|---|
| Liquid crystal display No. | liquid crystal layer | | optical compensation film G = 0.032 | | | | | |
| | Δnd (nm) | Δnd/λ | Re$_{450}$(nm) | Rth$_{450}$(nm) | Re/λ | Rth/λ | E | F |
| 25 | 318 | 0.707 | 57 | 275 | 0.127 | 0.611 | 0.865 | 0.0669 |
| 26 | 318 | 0.707 | 52 | 281 | 0.116 | 0.624 | 0.884 | 0.059 |
| 27 | 318 | 0.707 | 46 | 287 | 0.102 | 0.638 | 0.903 | 0.0496 |
| 28 | 318 | 0.707 | 40 | 293 | 0.089 | 0.651 | 0.921 | 0.0402 |
| 29 | 318 | 0.707 | 35 | 297 | 0.078 | 0.660 | 0.934 | 0.0323 |
| 30 | 318 | 0.707 | 30 | 301 | 0.067 | 0.669 | 0.947 | 0.0245 |

TABLE 5-continued transmittance (%) in a black state at viewing angle with azimuth
angle = 45° and polar angle = 60° wavelength 550 nm

| Liquid crystal display No. | liquid crystal layer | | optical compensation film G = 0.032 | | | | | |
|---|---|---|---|---|---|---|---|---|
| | Δnd (nm) | Δnd/λ | Re$_{550}$(nm) | Rth$_{550}$(nm) | Re/λ | Rth/λ | E | F |
| 25 | 300 | 0.545 | 57 | 275 | 0.104 | 0.500 | 0.917 | 0.0391 |
| 26 | 300 | 0.545 | 57 | 275 | 0.104 | 0.500 | 0.917 | 0.0391 |
| 27 | 300 | 0.545 | 57 | 275 | 0.104 | 0.500 | 0.917 | 0.0391 |
| 28 | 300 | 0.545 | 57 | 275 | 0.104 | 0.500 | 0.917 | 0.0391 |
| 29 | 300 | 0.545 | 57 | 275 | 0.104 | 0.500 | 0.917 | 0.0391 |
| 30 | 300 | 0.545 | 57 | 275 | 0.104 | 0.500 | 0.917 | 0.0391 | wavelength 650 nm

| Liquid crystal display No. | liquid crystal layer | | optical compensation film G = 0.032 | | | | | |
|---|---|---|---|---|---|---|---|---|
| | Δnd (nm) | Δnd/λ | Re$_{650}$(nm) | Rth$_{650}$(nm) | Re/λ | Rth/λ | E | F |
| 25 | 295 | 0.454 | 57 | 275 | 0.088 | 0.423 | 0.932 | 0.0253 |
| 26 | 295 | 0.454 | 64 | 274 | 0.098 | 0.422 | 0.929 | 0.0302 |
| 27 | 295 | 0.454 | 71 | 271 | 0.109 | 0.417 | 0.919 | 0.0351 |
| 28 | 295 | 0.454 | 78 | 270 | 0.120 | 0.415 | 0.915 | 0.0399 |
| 29 | 295 | 0.454 | 85 | 268 | 0.131 | 0.412 | 0.908 | 0.0448 |
| 30 | 295 | 0.454 | 92 | 267 | 0.142 | 0.411 | 0.905 | 0.0497 |

| Liquid crystal display No. | transmittance (%) | color shift Δxy |
|---|---|---|
| 25 | 0.025 | 0.11 |
| 26 | 0.02 | 0.08 |
| 27 | 0.016 | 0.04 |
| 28 | 0.012 | 0.035 |
| 29 | 0.017 | 0.05 |
| 30 | 0.021 | 0.075 |

It is understandable from the results shown in Table 5, that all of the liquid crystal display device Nos. 26 to 30 of the present invention, comprising a liquid crystal layer with Δnd/λ=0.707 and the optical compensation film with Re/λ=0.067 to 0.116 and Rth/λ=0.624 to 0.669 at 450 nm, and comprising a liquid crystal layer with Δnd/λ=0.454 and the optical compensation film with Re/λ=0.098 to 0.142 and Rth/λ=0.411 to 0.422 at 650 nm, exhibited smaller transmittance in a black state at polar angle=60° as compared with the liquid crystal display device No. 25 corresponded to Comparative Example. It is also understandable from the results shown in Table 5, that a minimum transmittance is achieved under Re/λ=0.089 and Rth/λ=0.651 at 450 nm, Re/λ=0.104 and Rth/λ=0.5 at 550 nm, and Re/λ=0.12 and Rth/λ=0.415 at 650 nm.

From the results of the simulation shown in Table 5, it is also understandable that all of the liquid crystal display device Nos. 26 to 30 satisfying the relations (V) to (VIII) exhibited smaller transmittance in a black state at polar angle=60° as compared with the liquid crystal display device No. 25 not satisfying the relations.

Example 6

Optical characteristics of the liquid crystal display devices were calculated using LCD Master, under the conditions similar to those in Example 5, except that the retardation values were altered to 371 nm at 450 nm, 350 nm at 550 nm and 344 nm at 650 nm. Re and Rth of the optical compensation film 19 are listed in Table 6.

As a Comparative Example, a liquid crystal display device was configured similarly to as described in the above, except for using the optical compensation film 19 having Re and Rth kept constant irrespective of wavelength, and the device was similarly subjected to the optical simulation. The Comparative Example can be considered as the prior art, because the conventional optical compensation technique does not take wavelength dispersion of Re and Rth of the optical compensation film into account.

<Measurement of Leakage Light from Liquid Crystal Display Device>

Calculated results of the leakage light based on the optical simulation using the above-described values are shown in Table 6. In Table 6, liquid crystal display device No. 31 corresponds to the above-described Comparative Example, and liquid crystal display device Nos. 32 to 36 correspond to the Examples.

TABLE 6 transmittance (%) in a black state at viewing angle with azimuth
angle = 45° and polar angle = 60° wavelength 450 nm

| Liquid crystal display No. | liquid crystal layer | | optical compensation film G = 0.032 | | | | | |
|---|---|---|---|---|---|---|---|---|
| | $\Delta nd$ (nm) | $\Delta nd/\lambda$ | $Re_{450}$(nm) | $Rth_{450}$(nm) | $Re/\lambda$ | $Rth/\lambda$ | E | F |
| 31 | 371 | 0.824 | 52 | 322 | 0.116 | 0.716 | 0.868 | 0.0689 |
| 32 | 371 | 0.824 | 47 | 329 | 0.104 | 0.730 | 0.886 | 0.0592 |
| 33 | 371 | 0.824 | 41 | 335 | 0.092 | 0.745 | 0.904 | 0.0496 |
| 34 | 371 | 0.824 | 36 | 342 | 0.080 | 0.760 | 0.922 | 0.04 |
| 35 | 371 | 0.824 | 31 | 349 | 0.069 | 0.775 | 0.940 | 0.0303 |
| 36 | 371 | 0.824 | 26 | 355 | 0.057 | 0.790 | 0.958 | 0.0207 | wavelength 550 nm

| Liquid crystal display No. | liquid crystal layer | | optical compensation film G = 0.032 | | | | | |
|---|---|---|---|---|---|---|---|---|
| | $\Delta nd$ (nm) | $\Delta nd/\lambda$ | $Re_{550}$(nm) | $Rth_{550}$(nm) | $Re/\lambda$ | $Rth/\lambda$ | E | F |
| 31 | 350 | 0.636 | 52 | 322 | 0.095 | 0.585 | 0.920 | 0.0398 |
| 32 | 350 | 0.636 | 52 | 322 | 0.095 | 0.585 | 0.920 | 0.0398 |
| 33 | 350 | 0.636 | 52 | 322 | 0.095 | 0.585 | 0.920 | 0.0398 |
| 34 | 350 | 0.636 | 52 | 322 | 0.095 | 0.585 | 0.920 | 0.0398 |
| 35 | 350 | 0.636 | 52 | 322 | 0.095 | 0.585 | 0.920 | 0.0398 |
| 36 | 350 | 0.636 | 52 | 322 | 0.095 | 0.585 | 0.920 | 0.0398 | wavelength 650 nm

| Liquid crystal display No. | liquid crystal layer | | optical compensation film G = 0.032 | | | | | |
|---|---|---|---|---|---|---|---|---|
| | $\Delta nd$ (nm) | $\Delta nd/\lambda$ | $Re_{650}$(nm) | $Rth_{650}$(nm) | $Re/\lambda$ | $Rth/\lambda$ | E | F |
| 31 | 344 | 0.529 | 52 | 322 | 0.080 | 0.495 | 0.936 | 0.0254 |
| 32 | 344 | 0.529 | 58 | 320 | 0.089 | 0.493 | 0.931 | 0.0303 |
| 33 | 344 | 0.529 | 64 | 319 | 0.098 | 0.491 | 0.926 | 0.0351 |
| 34 | 344 | 0.529 | 70 | 317 | 0.107 | 0.488 | 0.922 | 0.04 |
| 35 | 344 | 0.529 | 76 | 316 | 0.117 | 0.486 | 0.917 | 0.0448 |
| 36 | 344 | 0.529 | 82 | 314 | 0.126 | 0.483 | 0.913 | 0.0497 |

| Liquid crystal display No. | transmittance (%) | color shift $\Delta xy$ |
|---|---|---|
| 31 | 0.027 | 0.15 |
| 32 | 0.022 | 0.1 |
| 33 | 0.018 | 0.06 |
| 34 | 0.014 | 0.05 |
| 35 | 0.019 | 0.08 |
| 36 | 0.025 | 0.1 |

It is understandable from the results shown in Table 6, that all of the liquid crystal display device Nos. 32 to 26 of the present invention, comprising a liquid crystal layer with $\Delta nd/\lambda=0.824$ and the optical compensation film with $Re/\lambda=0.057$ to 0.104 and $Rth/\lambda=0.73$ to 0.79 at 450 nm, and comprising a liquid crystal layer with $\Delta nd/\lambda=0.529$ and the optical compensation film with $Re/\lambda=0.089$ to 0.126 and $Rth/\lambda=0.483$ to 0.493 at 650 nm, exhibited smaller transmittance in a black state at polar angle=60° as compared with the liquid crystal display device No. 31 corresponded to Comparative Example. It can be understood from the results shown in Table 6, that a minimum transmittance is achieved under $Re/\lambda=0.08$ and $Rth/\lambda=0.76$ at 450 nm, $Re/\lambda=0.095$ and $Rth/\lambda=0.585$ at 550 nm, and $Re/\lambda=0.107$ and $Rth/\lambda=0.488$ at 650 nm.

From the results of the simulation shown in Table 6, it is also understandable that all of the liquid crystal display device Nos. 32 to 36 satisfying the relations (V) to (VIII) exhibited smaller transmittance in a black state at polar angle=60° as compared with the liquid crystal display device No. 31 not satisfying the relations.

CROSS-REFERENCE TO RELATED APPLICATIONS

This application claims benefit of priority to Japanese Patent Application No. 2004-274770 filed Sep. 22, 2004.

The invention claimed:
1. A liquid crystal display device comprising:
a liquid crystal cell comprising a pair of substrates disposed facing each other, at least one of said pair of substrates having an electrode thereon, and a liquid crystal layer held between said pair of substrates, comprising a nematic liquid crystal material, molecules of which being oriented nearly normal to the surfaces of said pair of substrates in a black state,
a first polarizing film and a second polarizing film disposed while placing said liquid crystal cell in between; and at least two optical compensation films, each of them disposed respectively between said liquid crystal layer and each of said first and said second polarizing films, wherein, assuming thickness of said liquid crystal layer as d (nm), refractive index anisotropy of said liquid crystal layer at wavelength λ(nm) as Δn(λ), in-plane retardation of said at least two optical compensation films at wavelength λ as Re(λ), and a retardation in a thickness-direction of said at least two optical compensation films at wavelength λ as Rth(λ), relations (I) to (IV) below are satisfied at least at two different wavelengths in a wavelength range from 380 nm to 780 nm:

$$200 \leq \Delta n(\lambda) \times d \leq 1000; \quad (I)$$

$$Rth(\lambda)/\lambda = A \times \Delta n(\lambda) \times d/\lambda + B; \quad (II)$$

$$Re(\lambda)/\lambda = C \times \lambda/\{\Delta n(\lambda) \times d\} + D; \quad (III) \text{ and}$$

$$0.488 \leq A \leq 0.56, B = -0.0567, -0.041 \leq C \leq 0.016; \text{ and } D = 0.0939; \quad (IV)$$

Re (λ)/λ values of said at least two optical compensation films are from 0.06 to 0.09; and wherein said at least two optical compensation films satisfy the condition of Re(450)<Re(550), and wherein an in-plane slow axis of said optical compensation film and a transmission axis of either of said first and said second polarizing films disposed closer to said optical compensation film are substantially parallel to each other.

2. The liquid crystal display device of claim 1, employing a VA-mode.

3. The liquid crystal display device of claim 1, wherein said relations (I) to (IV) are satisfied at least at two wavelengths of which a difference is 50 nm or more.

4. The liquid crystal display device of claim 1, wherein said relations (I) to (IV) are satisfied at all wavelengths of 450 nm, 550 nm and 650 nm.

5. A liquid crystal display device comprising:

a liquid crystal cell comprising a pair of substrates disposed facing each other, at least one of said pair of substrates having an electrode thereon, and a liquid crystal layer held between said pair of substrates, comprising a nematic liquid crystal material, molecules of which being oriented nearly normal to the surfaces of said pair of substrates in a black state, a first polarizing film and a second polarizing film disposed while placing said liquid crystal cell in between; and an optical compensation film disposed between said liquid crystal layer and one of said first and said second polarizing films, wherein, assuming thickness of said liquid crystal layer as d (nm), refractive index anisotropy at wavelength λ (nm) as Δn(λ), in-plane retardation of said optical compensation film at wavelength λ as Re(λ), and a retardation in a thickness-direction of said optical compensation film at wavelength λ as Rth(λ), the relations (V) to (VIII) below are satisfied at least at two different wavelengths in a wavelength range from 380 nm to 780 nm:

$$200 \leq \Delta n(\lambda) \times d \leq 1000; \quad (V)$$

$$Rth(\lambda)/\lambda = E \times \Delta n(\lambda) \times d/\lambda, \quad (VI)$$

$$Re(\lambda)/\lambda = F \times \lambda/\{\Delta n(\lambda) \times d\} + G; \quad (VII) \text{ and}$$

$$0.726 \leq E \leq 0.958, 0.0207 \leq F \leq 0.0716; \text{ and } G = 0.032; \quad (VIII)$$

Re (λ)/λ value of said optical compensation film is from 0.05 to 0.1, and wherein said at least two optical compensation films satisfy the condition of Re(450)<Re(550), and wherein an in-plane slow axis of said optical compensation film and a transmission axis of either of said first and said second polarizing films disposed closer to said optical compensation film are substantially parallel to each other.

6. The liquid crystal display device of claim 5, further comprising a transparent film between one of the first and second polarizing film not adjacent to said optical compensation film and said liquid crystal cell, said transparent film having a retardation Rth in the thickness-wise direction of 0 nm≤Rth<60 nm.

7. The liquid crystal display device of claim 5, employing a VA-mode.

8. The liquid crystal display device of claim 5, wherein Re (λ)/λ value of said optical compensation film is from 0.06 to 0.09.

9. The liquid crystal display device of claim 5, wherein said relations (IV) to (VIII) are satisfied at least at two wavelengths of which a difference is 50 nm or more.

10. The liquid crystal display device of claim 5, wherein said relations (V) to (VIII) are satisfied at all wavelengths of 450 nm, 550 nm and 650 nm.

* * * * *